(12) United States Patent
Jayawardena et al.

(10) Patent No.: US 12,204,499 B2
(45) Date of Patent: Jan. 21, 2025

(54) VIRTUAL SPACE PLATFORM FOR A CONTENT BLOCK BROWSER

(71) Applicant: Dropbox, Inc., San Francisco, CA (US)

(72) Inventors: Udara Jayawardena, Toronto (CA); Haishan Qian, Toronto (CA)

(73) Assignee: Dropbox, Inc., San Francisco, CA (US)

( * ) Notice: Subject to any disclaimer, the term of this patent is extended or adjusted under 35 U.S.C. 154(b) by 35 days.

(21) Appl. No.: 18/193,124

(22) Filed: Mar. 30, 2023

(65) Prior Publication Data

US 2024/0330248 A1    Oct. 3, 2024

(51) Int. Cl.
G06F 16/188    (2019.01)
(52) U.S. Cl.
CPC .................................. G06F 16/196 (2019.01)
(58) Field of Classification Search
CPC ...................................................... G06F 16/196
See application file for complete search history.

(56) References Cited

U.S. PATENT DOCUMENTS

| | | | |
|---|---|---|---|
| 5,838,323 A | 11/1998 | Rose et al. | |
| 5,867,164 A | 2/1999 | Bornstein et al. | |
| 7,864,758 B1 | 1/2011 | Lolayekar et al. | |
| 8,700,675 B2 | 4/2014 | Ishida | |
| 8,819,559 B2 | 8/2014 | Keng et al. | |
| 10,169,453 B2 | 1/2019 | Luo et al. | |
| 10,540,635 B2 | 1/2020 | Shtuchkin et al. | |
| 10,592,594 B2 | 3/2020 | Tiu, Jr. et al. | |
| 10,776,755 B2 | 9/2020 | Newhouse et al. | |
| 11,023,858 B2 | 6/2021 | Shtuchkin et al. | |
| 11,256,735 B2 | 2/2022 | Narth et al. | |

(Continued)

FOREIGN PATENT DOCUMENTS

| | | |
|---|---|---|
| CN | 108959313 | 12/2018 |
| CN | 111339566 | 6/2020 |

(Continued)

OTHER PUBLICATIONS

Notice of Allowance from U.S. Appl. No. 18/193,107, mailed May 22, 2024, 5 pages.

(Continued)

*Primary Examiner* — Angelica Ruiz
(74) *Attorney, Agent, or Firm* — Keller Preece PLLC

(57) ABSTRACT

The present disclosure is directed toward systems, methods, and non-transitory computer readable media for generating and managing multilocational data blocks, generating and summarizing content blocks within a virtual space interface, and generating and providing a content block browser as part of a virtual space platform. In some embodiments, the disclosed systems generate a multilocational data block that includes a block identifier that is tied to a source identifier for embedding digital content from a network location indicated by the source identifier. The disclosed systems can also generate block summaries from content blocks for presenting and modifying digital content embedded within the content blocks via block identifiers and source identifiers. In some embodiments, the content block system can provide a content-block-based web browser in the form of a virtual space that includes embedded content blocks that integrate webpage functionality.

20 Claims, 28 Drawing Sheets

(56) References Cited

U.S. PATENT DOCUMENTS

| | | | |
|---|---|---|---|
| 11,263,386 B1 | 3/2022 | Beals et al. | |
| 11,380,159 B2 | 7/2022 | Mares et al. | |
| 11,385,780 B2 | 7/2022 | Brown | |
| 11,416,799 B2 | 8/2022 | Tang et al. | |
| 11,500,897 B2 | 11/2022 | Goldberg et al. | |
| 11,557,121 B2 | 1/2023 | Cohen-Tidhar et al. | |
| 11,769,017 B1 | 9/2023 | Gray et al. | |
| 11,921,812 B2 | 3/2024 | Mancuso et al. | |
| 2007/0255715 A1 | 11/2007 | Li et al. | |
| 2009/0077158 A1* | 3/2009 | Riley | G06Q 30/02 709/202 |
| 2010/0169837 A1 | 7/2010 | Hyndman et al. | |
| 2011/0276881 A1 | 11/2011 | Keng et al. | |
| 2012/0198334 A1 | 8/2012 | Surin et al. | |
| 2013/0268357 A1* | 10/2013 | Heath | G06Q 10/10 726/26 |
| 2014/0162791 A1 | 6/2014 | Lam | |
| 2014/0243087 A1 | 8/2014 | Hong et al. | |
| 2014/0280614 A1 | 9/2014 | Alakuijala et al. | |
| 2014/0304384 A1 | 10/2014 | Varenhorst et al. | |
| 2016/0055162 A1 | 2/2016 | Woolf | |
| 2016/0173603 A1 | 6/2016 | Ainscow et al. | |
| 2017/0277668 A1 | 9/2017 | Luo et al. | |
| 2018/0011931 A1 | 1/2018 | Modani et al. | |
| 2018/0150905 A1 | 5/2018 | Lee et al. | |
| 2018/0188901 A1 | 7/2018 | Shtuchkin et al. | |
| 2018/0189693 A1 | 7/2018 | Newhouse et al. | |
| 2018/0189706 A1 | 7/2018 | Newhouse et al. | |
| 2018/0189733 A1 | 7/2018 | Newhouse et al. | |
| 2018/0357032 A1 | 12/2018 | Popovich et al. | |
| 2019/0042551 A1 | 2/2019 | Hwang | |
| 2019/0138583 A1 | 5/2019 | Silk et al. | |
| 2019/0266573 A1 | 8/2019 | Radhakrishnan et al. | |
| 2020/0066042 A1 | 2/2020 | Marsh | |
| 2020/0117850 A1 | 4/2020 | Amoli et al. | |
| 2020/0134090 A1 | 4/2020 | Mankovskii et al. | |
| 2020/0143327 A1 | 5/2020 | Shtuchkin et al. | |
| 2020/0143384 A1 | 5/2020 | Koontz et al. | |
| 2020/0175229 A1 | 6/2020 | Iwakura et al. | |
| 2020/0210521 A1 | 7/2020 | Hutchins | |
| 2021/0014287 A1 | 1/2021 | Kimball et al. | |
| 2021/0117681 A1 | 4/2021 | Poddar et al. | |
| 2021/0149933 A1 | 5/2021 | Chang et al. | |
| 2021/0192126 A1 | 6/2021 | Gehrmann et al. | |
| 2021/0209121 A1 | 7/2021 | Liu et al. | |
| 2021/0320592 A1 | 10/2021 | Danilak et al. | |
| 2021/0342785 A1 | 11/2021 | Mann et al. | |
| 2021/0382950 A1 | 12/2021 | Arnold et al. | |
| 2021/0383252 A1 | 12/2021 | Arnold et al. | |
| 2021/0390127 A1 | 12/2021 | Fox et al. | |
| 2022/0014580 A1 | 1/2022 | Shadfar et al. | |
| 2022/0092026 A1 | 3/2022 | Rice et al. | |
| 2022/0210217 A1 | 6/2022 | Jia et al. | |
| 2022/0239994 A1 | 7/2022 | Katsumata et al. | |
| 2022/0292543 A1* | 9/2022 | Henderson | G06Q 30/0252 |
| 2022/0309037 A1 | 9/2022 | Gutierrez et al. | |
| 2022/0317978 A1* | 10/2022 | Barik | G06F 8/34 |
| 2022/0318197 A1 | 10/2022 | Sarkis et al. | |
| 2022/0321374 A1 | 10/2022 | Lin et al. | |
| 2022/0334806 A1 | 10/2022 | Lin et al. | |
| 2022/0382436 A1 | 12/2022 | Tran | |
| 2022/0405343 A1 | 12/2022 | Thadani et al. | |
| 2023/0020886 A1 | 1/2023 | Mahapatra et al. | |
| 2023/0028716 A1 | 1/2023 | Arnold et al. | |
| 2023/0055241 A1* | 2/2023 | Zionpour | G06F 40/166 |
| 2023/0237349 A1* | 7/2023 | Donoho | G06N 5/04 706/46 |
| 2024/0037154 A1 | 2/2024 | Baek et al. | |
| 2024/0046318 A1* | 2/2024 | Muriqi | G06Q 20/389 |
| 2024/0256423 A1* | 8/2024 | Zhang | G06F 8/71 |

FOREIGN PATENT DOCUMENTS

| | | |
|---|---|---|
| CN | 114567814 | 5/2022 |
| CN | 114971591 | 8/2022 |
| WO | 2016120683 A1 | 8/2016 |

OTHER PUBLICATIONS

International Search Report and Written Opinion for Application No. PCT/US2023/079902, mailed on Apr. 30, 2024, 19 pages.

Huang P., et al., "Collaborative Haptic Play with Building Blocks," ACM, Oct. 29-31, 2009, pp. 277-280.

Keshavarzi M., et al., "Optimization and Manipulation of Contextual Mutual Spaces for Multi-User Virtual and Augmented Reality Interaction," IEEE Conference on Virtual Reality and 3D User Interfaces (VR), 2021, pp. 353-362.

Lam K.Y., et al., "A2W: Context-Aware Recommendation System for Mobile Augmented Reality Web Browser," ACM International Conference on Multimedia, Oct. 20-24, 2021, pp. 2447-2455.

Stein G., et al., "Enabling Collaborative Distance Robotics Education for Novice Programmers," IEEE, Oct. 10-13, 2021, 5 pages.

Zhao J., et al., "Using the Summarizing Strategy to Engage Learners: Empirical Evidence in an Immersive Virtual Reality Environment," ResearchGate, Jan. 2020, 32 pages.

Non-Final Office Action from U.S. Appl. No. 18/193,107, mailed Feb. 15, 2024, 29 pages.

Invitation to Pay Additional Fees for International Application No. PCT/US2023/079902 mailed Mar. 7, 2024, 12 pages.

Notice of Allowance from U.S. Appl. No. 18/193,097, mailed Jul. 24, 2024, 7 pages.

Notice of Allowance from U.S. Appl. No. 18/193,097, mailed Jun. 26, 2024, 10 pages.

Notice of Allowance from U.S. Appl. No. 18/193,107, mailed Jul. 31, 2024, 5 pages.

* cited by examiner

VIRTUAL SPACE PLATFORM FOR A CONTENT BLOCK BROWSER

BACKGROUND

Advancements in computing devices and networking technology have given rise to a variety of innovations in cloud-based digital content storage and access. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of flexibility and efficiency.

As just suggested, some existing digital content systems are inflexible. In particular, many existing systems are rigidly fixed to the conventional paradigm of storing and managing content items using files and folders which are often tied to specific applications or platforms. For example, some existing systems require accessing or modifying a certain file type (or another content item such as a website) using a corresponding application for the file type. In addition, existing systems often require different devices to store and maintain individual copies of a content item to view or interact with the content item. Even for cloud-based systems that store a centralized content item accessible by multiple devices, these systems nevertheless rigidly present the same representation of the content item across all accessing devices, irrespective of account-specific contextual data.

Due at least in part to their inflexible natures, many existing digital content systems are also inefficient. To elaborate, because many existing systems are reliant on conventional files and folders for interacting with content items, these systems often require generating and storing many copies of a single content item throughout the lifetime of the content item. For example, a single content item that is part of a collaborative effort across multiple devices in some existing systems requires copying versions of the content item to each collaborating device. While many existing systems use cloud-based storage to centralize access to content items, even some cloud-based systems require copying (the entire data contents of) a content item to each new location (e.g., new folder) where the content item is moved or accessed. The computational expense of moving and/or copying content items is especially pronounced in systems that store and manage many terabytes of content items across many devices and user accounts. Copying and storing such large numbers of content items consumes excessive amounts of computer processing power, memory, and storage that could otherwise be preserved with a more efficient system.

As another example of their inefficiencies, some existing digital content systems require running different computer applications to access and interact with different content items. More specifically, as suggested above, some systems require a specific application to access a specialized type of content item (e.g., a certain file type). Consequently, these existing systems often require excessive numbers of user interactions switching between interfaces and applications to interact with different content items. Processing such large numbers of interactions wastes computer resources that could otherwise be preserved with more efficient interfaces. Additionally, simultaneously running many applications for different types of content items also consumes excessive computer resources.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems generate and manage content items using a new data structure in the form of multilocational data blocks. In some embodiments, the disclosed systems generate a multilocational data block as a data entity or a data element that can exist in multiple computer locations (e.g., virtual spaces) concurrently, on a single device and/or across multiple devices. For example, the disclosed systems generate a multilocational data block to include a block identifier that is tied to a source identifier for embedding digital content from a network location indicated by the source identifier. The disclosed systems can also generate or determine (and store) one or more block configurations, block types, conversation threads, and/or task lists for (or as part of) each multilocational data block. Additionally, the disclosed systems can identify a content renderer for rendering digital content embedded within a multilocational data block (according to a block configuration) based on one or more application integrations.

The disclosed systems also provide systems, methods, and non-transitory computer readable storage media for generating and summarizing content blocks within a virtual space interface. For example, the disclosed systems can generate a virtual space interface that includes content blocks as modifiable sub-windows for presenting and modifying digital content embedded within the content blocks via block identifiers and source identifiers. The disclosed systems can also provide a summarization element for display within the virtual space interface, where the summarization element is selectable to generate a block summary from digital content embedded within a content block. For instance, the disclosed systems can generate a block summary using a large language model and can replace a presentation of content within a content block with a corresponding block summary.

In addition, the disclosed systems further provide systems, methods, and non-transitory computer readable storage media for generating and providing a content block browser as part of a virtual space platform. For example, the disclosed systems can provide a content-block-based web browser in the form of a virtual space that includes embedded content blocks that integrate webpage functionality. In some embodiments, the disclosed systems provide the virtual space to include some content blocks that integrate webpage functionality and other content blocks that integrate digital content from other (non-webpage) content items, such as content items stored within a content management system. To integrate digital content, including webpage functionality, the disclosed systems can utilize block identifiers for content blocks tied to source identifiers that reference respective network locations storing the content items (e.g., webpages) for the content blocks.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
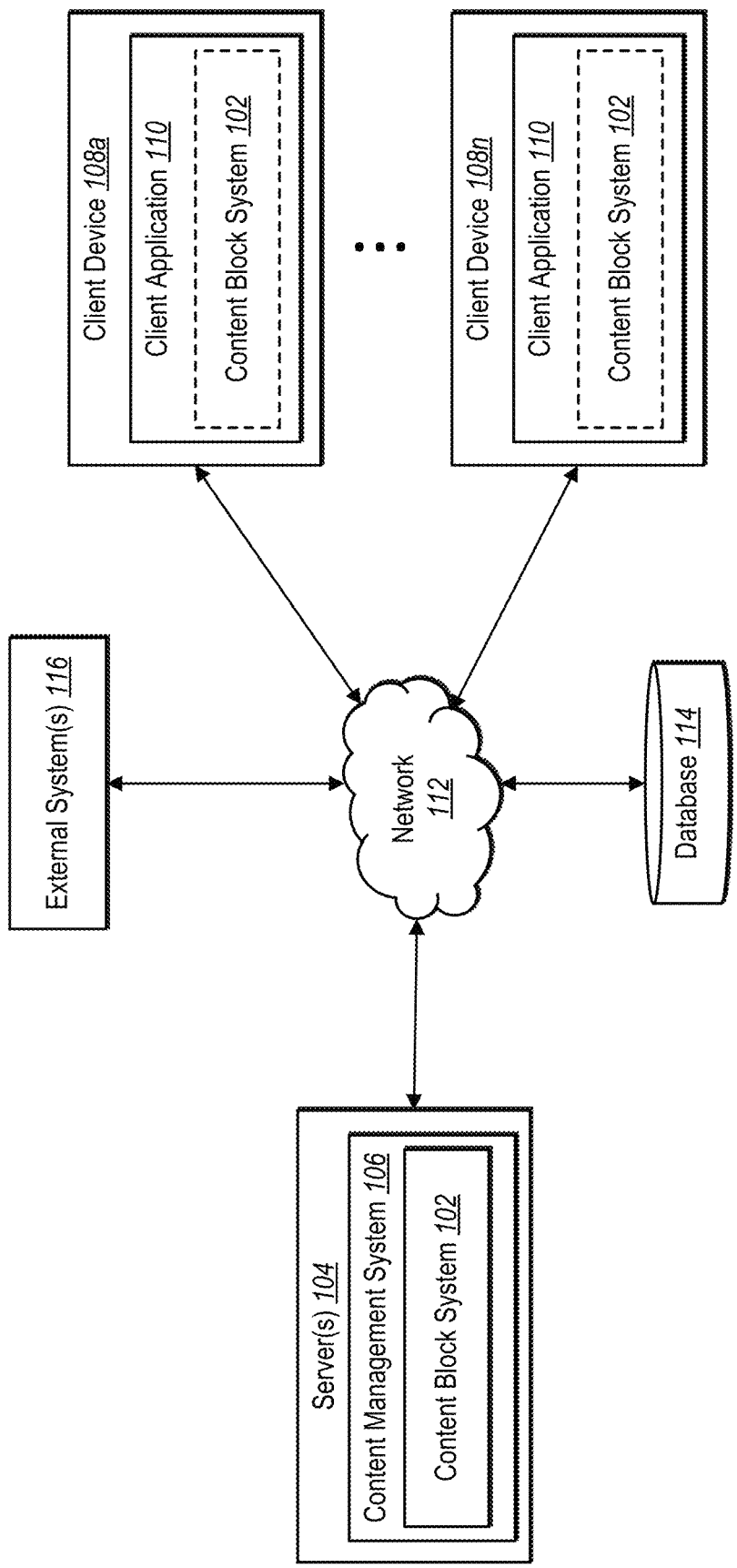
FIG. 1 illustrates a schematic diagram of an example environment of a content block system in accordance with one or more embodiments.

This disclosure describes one or more embodiments of a content block system that can utilize a novel data infrastructure for multilocational data blocks to generate and manage digital content through multilocational data blocks, generating and summarizing digital content of multilocational data blocks, and/or providing a virtual space platform for a content block web browser based on multilocational data blocks. While this disclosure separates the discussion into overarching topics according to various functions or capabilities of the content block system, the content block system can also combine functions from each (or a subset) of the topical discussions. The following paragraphs provide an overview or an introduction to each of the following concepts in order: i) generating and managing multilocational data blocks, ii) generating and summarizing content blocks within a virtual space interface, and iii) a virtual space platform for a content block browser. Thereafter, additional detail regarding each of the main topics is provided in relation to the figures.

Introduction to Generating and Managing Multilocational Data Blocks

To generate and manage multilocational data blocks, the content block system can generate a data entity or a data structure for a multilocational data block that includes a block identifier and a source identifier. For example, the content block system generates a block identifier (stored at a particular server location) that represents or indicates the multilocational data block and that is further linked or tied to a source identifier that references a server location storing a content item for embedding within the multilocational data block. Indeed, the content block system can generate a source identifier as a data element that ties a server location storing a content item to one or more a multilocational data blocks that include block identifiers which reference the source identifier. Through referencing the source identifier using the block identifier, the content block system can incorporate the stored digital content item from the server location into the multilocational data block (without copying or moving the actual data of the content item from its server location to the server location of the multilocational data block).

In some cases, the content block system generates a multilocational data block to include a block type in addition to a block identifier and a source identifier. For instance, the content block system determines a block type that indicates a particular type or format of content item incorporated or embedded within the multilocational data block. In some cases, the content block system defines the block type based on the server location indicated by the source identifier tied to the block identifier. In these or other cases, the content block system can also determine multiple block configurations for a single multilocational data block, where each block configuration may be defined via user interactions at respective client devices modifying visual characteristics (e.g., size, position, shape, and color) of the multilocational data block within a virtual space. In some embodiments, the content block system can further generate a multilocational data block to include a thread identifier referencing a (server location for a) stored communication thread associated with the multilocational data block and/or to include a task identifier referencing a (server location for a) stored task list associated with the multilocational data block.

In one or more embodiments, the content block system can embed a multilocational data block into multiple virtual spaces concurrently using a single block identifier (and without copying or moving a stored content item from its server location). More specifically, the content block system can utilize a single multilocational data block with its block identifier to incorporate a content item from a server location by tying, to the block identifier, a source identifier referencing the server location. Thus, the content block system can facilitate multiple client devices displaying respective virtual spaces presenting or displaying the content item within (their own visual representations of) the same multilocational data block without copying or moving the content item from its server location. In some cases, the content block system can further receive, from a client device, an indication of a user interaction modifying digital content presented via a multilocational data block and can propagate the modification to the corresponding content item stored at its server location.

Introduction to Generating and Summarizing Content Blocks within a Virtual Space Interface As mentioned above, in certain embodiments, the content block system can generate and summarize content blocks within a virtual space interface. In particular, the content block system can provide a virtual space interface that includes contextual data for content blocks and user accounts associated with the content blocks all within a single interface. For example, the content block system can provide tools within a virtual space interface for manipulating content blocks (e.g., multilocational data blocks) that incorporate content items from a variety of content sources or server locations (and/or for a variety of different computer applications), including webpages, device storage, and/or cloud-based storage of a content management system. Such manipulations include relocating the blocks, adding/removing blocks, resizing the blocks, changing the color of the blocks, adding/removing user accounts that can access the blocks, changing permission settings for the blocks.

In some embodiments, the content block system can further generate block summaries for content blocks. For example, the content block system can extract digital content from a content block (e.g., from a server location referenced by a source identifier) to provide to a large language model. In addition, the content block system can utilize the large language model to generate a block summary of the digital content included within the content block. In some cases, the content block system can further replace a presentation of the digital content with the block summary within the content block, as shown in a virtual space interface. In some embodiments, the content block system can also generate (e.g., using a large language model) a multi-block summary for multiple content blocks together, a space summary of content blocks within a particular virtual space, and/or a thread summary of a communication thread associated with one or more content blocks. In some cases, the content block system generates user-account-specific summaries (e.g., block summaries, multi-block summaries, space summaries, and/or thread summaries) based on interactions of user accounts.

In certain embodiments, the content block system can generate block suggestions. For example, the content block system can utilize a block suggestion machine learning model to generate a block suggestion and can provide a block suggestion element selectable to add a new content block for the suggested block within a virtual space interface. Indeed, the content block system can generate a block suggestion based on behavior or interactions associated with a user account, including shares, clicks, modifications, views, and other interactions with content blocks (or other content items).

The content block system can also set and determine block permissions. For instance, upon embedding a content block within a virtual space interface, the content block system can determine permission settings associated with the content item incorporated in the content block (e.g., from an external content source or an external application). The content block system can also incorporate and apply the external permission settings to the content block within the virtual space for enabling and restricting various access and functionality of the content block on per-account basis. In some cases, the content block system can also modify permission settings at an external content source or within an external application. For example, based on modifying permission settings for a content block via a virtual space interface, the content block system can propagate the permission modifications to the external application/content source where the content item originates.

Introduction to Virtual Space Platform for a Content Block Browser

As further mentioned above, the content block system can generate and provide a virtual space platform for a content block browser. More particularly, the content block system can generate a virtual space that includes content blocks (e.g., multilocational data blocks) referencing and incorporating content items from respective server locations (e.g., via block identifiers and source identifiers). For example, the content block system can embed a content block that integrates functionality of a webpage by including a block identifier tied to a source identifier for (or that references a server locating hosting) the webpage. Accordingly, the content block system can provide a content-block-based web browser where content blocks incorporate webpage functionality for accessing, navigating, modifying, or otherwise interacting with webpages directly within the content blocks. In some cases, the content block system provides a hybrid virtual space interface where some content blocks integrate webpage functionality (e.g., for different webpages) and others incorporate content items from other sources, such as a content management system or an external application (e.g., a messaging application, a photo editing application, a video call application, or a calendar application).

In one or more embodiments, the content block system can modify webpage content based on interactions with a content block. For example, the content block system can receive an indication of a user interaction modifying content displayed within a content block of a virtual space. Based on the interaction, the content block system can further propagate (e.g., via a two-way modification channel) modifications made to the block content to the corresponding webpage incorporated or integrated into the content block. In some cases, the content block system can also generate and provide a block preview for a content block, where the block preview includes modified content and/or modified functionality for distribution to external (e.g., third-party) client devices for reduced accessibility/privileges.

As suggested above, through one or more of the embodiments mentioned above (and described in further detail below), the content block system can provide several improvements or advantages over existing digital content systems. For example, the content block system can improve flexibility over prior systems. Indeed, while some prior systems are rigidly fixed to storing and managing content items using files and folder tied to specific applications or platforms, the content block system generates a virtual space platform that utilizes content blocks (e.g., multilocational data blocks) that can adapt, integrate, or incorporate content items across many systems, applications, and file types. In addition, contrary to prior systems that require client devices to store and maintain individual copies of a content item, the content block system generates and utilizes adaptive multilocational data blocks that are flexibly embeddable across multiple virtual spaces concurrently using a single block identifier. Even compared to cloud-based systems that present or depict a uniform visualization of a centralized content item, the content block system flexibly customizes visualizations of content items (e.g., within content blocks) according to contextual data, such as user-account-specific interactions with content items and visual characteristics specific to each device's virtual space.

Due at least in part to its improved flexibility, the content block system can also improve efficiency over existing digital content systems. For example, as opposed to prior systems that are reliant on conventional files and folders for interacting with content items, the content block system utilizes multilocational data blocks within a virtual space platform to alleviate the need for repeatedly copying and/or moving content items. Indeed, even in collaborative circumstances where a single content item is shared, modified, and commented on by multiple devices, the content block system can use a multilocational data block to integrate the content item within a virtual space without copying or moving the content item from its server location. Further, the multilocational data block is displayable, modifiable, and otherwise manipulable within multiple virtual spaces concurrently using a single block identifier (e.g., without needing to copy or create multiple versions of the multilocational data block). Consequently, by using multilocational data blocks with these capabilities, the content block system preserves computer resources expended by other systems in copying and/or moving content items between server locations. The computational savings are especially pronounced in systems that store and manage many terabytes of content items.

As another example of its improved efficiency, the content block system requires only a single computer application and/or a single user interface to view, modify, or otherwise interact with content items integrated from various server locations and/or external applications. Indeed, while some prior systems require running many different specialized applications for interacting with different types of content items, the content block system utilizes application integrations within a virtual space platform to embedding of content blocks that integrate the content and functionality of external applications. Thus, not only does the content block system reduce the navigational inefficiency and computational cost of (processing) excessive numbers of user interactions navigating between different applications and interfaces, but the content block system further reduces the computational cost of running all of the content-item-specific applications of prior systems as well.

As illustrated by the foregoing discussion, the present disclosure utilizes a variety of terms to describe features and benefits of the content block system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

In addition, as used herein, the term "virtual space" refers to a computer-based digital environment that includes embedded multilocational data blocks along with contextual data for the multilocational data blocks. For instance, a virtual space includes contextual data such as user account data for user accounts with access to multilocational data blocks, thread data for communication threads associated with multilocational data blocks, task data for task lists associated with multilocational data blocks, meeting data for virtual meetings associated with multilocational data blocks, summary data for block summaries of multilocational data blocks, and/or other contextual data blocks. In some cases, a virtual space refers to a "virtual space interface" that includes graphical elements representing multilocational data blocks and other interface elements described herein.

Relatedly, as used herein, the term "multilocational data block" refers to a data structure, a data entity, or a data element that is embeddable in multiple virtual spaces concurrently without moving or copying digital content presented within (or incorporated by) the multilocational data block. For example, a multilocational data block can refer to a data element that corresponds to (or represents) a "content block" that is presented for display within a virtual space interface. Indeed, a content block can refer to a visualization of a multilocational data block, where the multilocational data block includes the underlying data for defining the presentation of digital content within the content block. A multilocational data block can include multiple data identifiers that refer to data elements or computer code that define the digital content to present within a content block.

For example, a multilocational data block can include a "block identifier" that identifies or defines the multilocational data block (or the content block) itself. Indeed, the content block system can embed a multilocational data block (or a content block) within a virtual space by adding a block identifier for the content block to the virtual space. In addition, a multilocational data block can include a "source identifier" that indicates or references a network location or a server location where digital content is stored. In some cases, the block identifier of a multilocational data block is linked or tied to a source identifier (or multiple source identifiers) to integrated or embed the digital content referenced by the source identifier into the corresponding content block. By linking a block identifier to a source identifier for incorporating digital content into a content block, the content block system can embed a content block that presents a content item referenced by the source identifier without copying or moving the content item from its server location. Thus, a single multilocational data block can be embedded within multiple virtual spaces concurrently (using block identifiers) without copying or moving data for the presented content.

In some embodiments, the content block system can also determine or generate a thread identifier and/or a task identifier for a multilocational data block (or a content block). As used herein, a "thread identifier" refers to a data element that references a communication thread stored at a server location for incorporating within a multilocational data block (or a content block). In addition, the term "task identifier" refers to a data element that references a task list stored at a server location for incorporating within a multilocational data block (or a content block). In some cases, the content block system links a block identifier to a source identifier, a thread identifier, and/or a task identifier to incorporate the corresponding digital content within a multilocational data block (or a content block). In some embodiments, the content block system ties a thread identifier and/or a task identifier to a multilocational data block, to a virtual space, and/or to a section without a virtual space.

In certain embodiments, the content block system determines a block configuration for a multilocational data block (or a content block). As used herein, the term "block configuration" refers to computer code that defines visual characteristics for a multilocational data block (or a content block). For example, the content block system can define a virtual space to include one or more block identifiers for respective content blocks and/or to include block configurations corresponding to the content blocks. Relatedly, the content block system can determine a block type for a multilocational data block (or a content block). As used herein, the term "block type" refers to a type or a format for a multilocational data block (or a content block). For instance, a block type can refer to a server location hosting (and defining parameters of) a content item referenced by a block identifier. Indeed, the content block system can define a multilocational data block to include or reference a block type. Example block types include: i) a native block type that is native to the content block system (or to a virtual space platform) and does not integrate a content item from an external server location, ii) an external block type that includes a block identifier tied to a source identifier that references or incorporates a content item from an external server location, and/or iii) a browser block type that integrates digital content and functionality of a webpage into a multilocational data block (or a content block). In some cases, the content block system generates a JSON file to define the contents and behavior of a native content block.

In one or more embodiments, the content block system utilizes application integrations for rendering digital content and/or for incorporating functionality associated with external applications for viewing and modifying content items. As used herein, the term "application integration" refers to a computer application tied, linked, or integrated within a virtual space. For example, an application integration can include all or part of an external application (e.g., content editing portions or content viewing portions of an application) that is integrated within a virtual space for viewing and interacting with a content item (e.g., a content item specific to the external application). In some cases, the content block system utilizes an application integration in the form of a content renderer. Indeed, a "content renderer" can refer to a data entity or computer code integrated within (or added to) a virtual space for rendering a content item. Specifically, the content block system can identify a content renderer compatible with rendering a multilocational data block (or a content block) within a virtual space according to a block type (e.g., an external block manipulable via an external application) and/or a block configuration associated with the multilocational data block (or the content block).

As mentioned above, the content block system can generate block summaries and block suggestions using one or more machine learning models. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. As described in further detail below, the content block system utilizes a "block suggestion machine learning model" that can generate block suggestions based on user account behavior including interactions with content items.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., block summarizations) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a content clustering neural network.

As used herein, the term "application session" (or sometimes simply "session") refers to an instance of use within a client application or within a particular collection or folder or content item using a client application. For example, an application session refers a set of activities performed within a single login of a client application or an application of a content management system. As another example, an application session refers to a set of activities performed within a single visit of an application or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

Additional detail regarding the content block system will now be provided with reference to the figures. For example, FIG. 1 illustrates a schematic diagram of an example system environment for implementing a content block system 102 in accordance with one or more implementations. An overview of the content block system 102 is described in relation to FIG. 1. Thereafter, a more detailed description of the components and processes of the content block system 102 is provided in relation to the subsequent figures.

As shown, the environment includes server(s) 104, client devices 108a-108n, a database 114, external system(s) 116, and a network 112. Each of the components of the environment can communicate via the network 112, and the network 112 may be any suitable network over which computing devices can communicate. Example networks are discussed in more detail below in relation to FIGS. 25-26.

As mentioned above, the example environment includes client devices 108a-108n. The client devices 108a-108n can be one of a variety of computing devices, including a smartphone, a tablet, a smart television, a desktop computer, a laptop computer, a virtual reality device, an augmented reality device, or another computing device as described in relation to FIGS. 25-26. The client devices 108a-108n can communicate with the server(s) 104 and/or the database 114 via the network 112. For example, the client devices 108a-108n can receive user input from a user interacting with the client devices 108a-108n (e.g., via the client application 110) to, for instance, access, generate, modify, or share a content item, to collaborate with a co-user of a different client device, or to select a user interface element. In addition, the content block system 102 on the server(s) 104 can receive information relating to various interactions with content items and/or user interface elements based on the input received by the client devices 108a-108n (e.g., to access content items, interacting with content blocks, or perform some other action).

As shown, the client devices 108a-108n can include a client application 110. In particular, the client application 110 may be a web application, a native application installed on the client devices 108a-108n (e.g., a mobile application, a desktop application, etc.), or a cloud-based application where all or part of the functionality is performed by the server(s) 104. Based on instructions from the client application 110, the client devices 108a-108n can present or display information, including a user interface that includes a virtual space for presenting contents from external applications (e.g., from the external system(s) 116) and/or from the content management system 106.

As illustrated in FIG. 1, the example environment also includes the server(s) 104. The server(s) 104 may generate, track, store, process, receive, and transmit electronic data, such as digital content items, content blocks, interface elements, interactions with digital content items, interactions with interface elements, and/or interactions between user accounts or client devices. For example, the server(s) 104 may receive data from the client devices 108a-108n in the form of a selection of a particular content block integrating a content item. In addition, the server(s) 104 can transmit data to the client devices 108a-108n in the form of a content block, a block summary, a block suggestion, a virtual space interface, or some other information. Indeed, the server(s) 104 can communicate with the client devices 108a-108n to send and/or receive data via the network 112.

In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the content block system 102 as part of a content management system 106. The content management system 106 can communicate with the client devices 108a-108n to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts, including user accounts in collaboration with one another. In some embodiments, the content block system 102 and/or the content management system 106 utilize the database 114 to store and access information such as digital content items, block identifiers, source identifiers, thread identifiers, task identifiers, block types, and block configurations.

FIG. 1 further illustrates external system(s) 116. In particular, the external system(s) 116 can store or host content items embeddable within multilocational data blocks (or content blocks). For example, the external system(s) 116 can include a server location hosting a webpage and/or can include a computer application (e.g., a messaging application, a photo editing application, or a calendar application) that is external to the content block system 102. In some cases, the external system(s) 116 is external to the content block system 102 in the sense that the external system(s) 116 and the content block system 102 are located at different server locations and/or that the content block system 102 does not (natively) host or maintain the function of the external system(s) 116.

Although FIG. 1 depicts the content block system 102 located on the server(s) 104, in some implementations, the content block system 102 may be implemented by (e.g., located entirely or in part) on one or more other components of the environment. For example, the content block system 102 may be implemented by the client devices 108a-108n, and/or a third-party device. For example, the client devices 108a-108n can download all or part of the content block system 102 for implementation independent of, or together with, the server(s) 104.

In some implementations, though not illustrated in FIG. 1, the environment may have a different arrangement of components and/or may have a different number or set of components altogether. For example, the client devices 108a-108n may communicate directly with the content block system 102, bypassing the network 112. As another example, the environment can include the database 114 located external to the server(s) 104 (e.g., in communication via the network 112) or located on the server(s) 104, on the external system(s) 116, and/or on the client devices 108a-108n.

As mentioned above, the content block system 102 can perform methods or functions relating to: i) generating and managing multilocational data blocks, ii) generating and summarizing content blocks within a virtual space interface, iii) managing a virtual space platform for a content block browser. The following description separates the discussion and the corresponding figures for each of these four concepts into individual sections, each with its own heading. While these sections are divided for clarity, the content block system 102 is not limited in its functionality or performance according to such division or separation. Rather, the content block system 102 can perform all or some of the acts or methods associated with one or more of the following sections separately or in combination together. Indeed, some sections below may borrow from or rely on the descriptions of other sections.

Generating and Managing Multilocational Data Blocks

Figure 2:
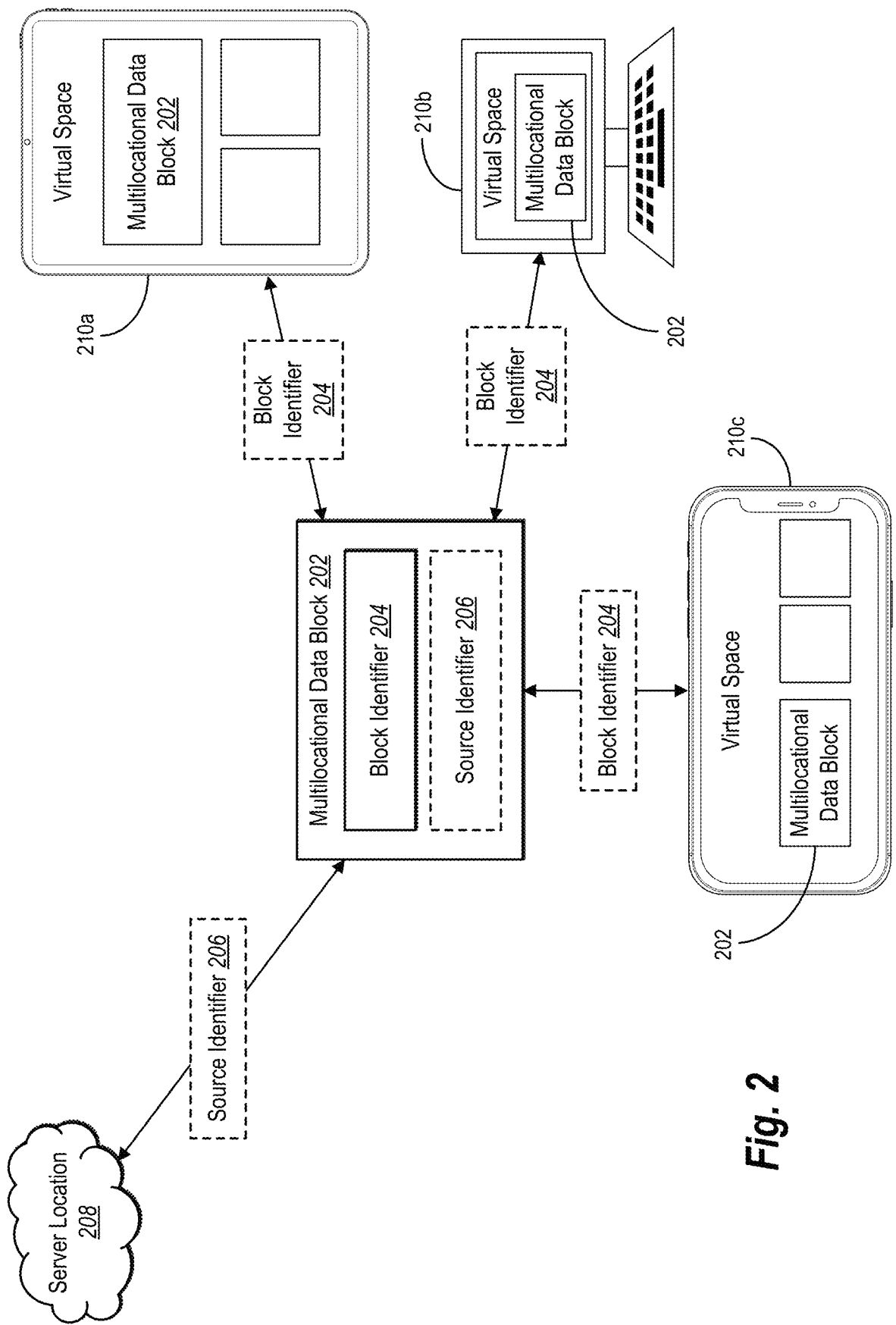
FIG. 2 illustrates an example overview of generating and managing a multilocational data block in accordance with one or more embodiments.

As mentioned above, in certain described embodiments, the content block system 102 generates and manages multilocational data blocks. More specifically, the content block system 102 can generate a multilocational data block that includes, or is represented by, a block identifier and/or one or more other identifiers that integrate content items within the multilocational data block. For instance, the content block system 102 can generate a multilocational data block to include a block identifier that references a source identifier of a server location hosting a content item to integrate. FIG. 2 illustrates an example overview of generating and managing multilocational data blocks in accordance with one or more embodiments. Additional detail regarding the various concepts of FIG. 2 is provided thereafter with reference to subsequent figures.

As illustrated in FIG. 2, the content block system 102 generates a multilocational data block 202. In particular, the content block system 102 generates the multilocational data block 202 to include a block identifier 204. For example, the content block system 102 generates the block identifier 204 and further ties or links the block identifier 204 to a source identifier 206. In some cases, the content block system 102 generates multilocational data block 202 to include the source identifier 206, while in other embodiments (e.g., embodiments where the multilocational data block 202 is a native block that does not reference a content item from an external server location), the content block system 102 generates the multilocational data block 202 without the source identifier 206. Indeed, for native blocks, such as communication thread blocks and task list blocks, the content block system 102 can generate the multilocational data block 202 to directly integrate digital content from within the content block system 102 (or from the content management system 106).

As shown, the content block system 102 generates the multilocational data block 202 to be embeddable within multiple virtual spaces concurrently. More specifically, the content block system 102 concurrently embeds the multilocational data block 202 within a first virtual space on the client device 210a, a second virtual space on the client device 210b, and a third virtual space on the client device 210c. Indeed, the content block system 102 requires only the single multilocational data block 202 and the single block identifier 204 to concurrently incorporate a content item within the virtual spaces on the respective client devices.

To embed the multilocational data block 202 within each virtual space, the content block system 102 utilizes the block identifier 204 to reference or designate the multilocational data block 202. For instance, the content block system 102 sends and/or receives the block identifier 204 to embed the multilocational data block 202 in response to a request. In some cases, the content block system 102 receives an embedding request from a client device (e.g., the client device 210a) that includes a request for the block identifier 204 indicating the multilocational data block 202. In turn, the content block system 102 provides the block identifier 204 which is tied to the source identifier 206. By tying or linking the block identifier 204 with the source identifier 206, the content block system 102 can incorporate a digital content item from the server location 208 within the multilocational data block 202 for display on client devices.

To elaborate, the content block system 102 analyzes the block identifier 204 to determine a source identifier 206 that is linked or tied to the block identifier 204. Specifically, the content block system 102 analyzes the source identifier 206 to determine or identify a server location 208 (e.g., a URL) that hosts or stores a content item. For example, the content block system 102 identifies the server location 208 as a webpage server or a server for an external application. The content block system 102 further provides the content item for display as part of the multilocational data block 202 through using the source identifier 206 to access and transmit the content item. In some cases, the content block system 102 requires internet access to maintain interactions and/or presentation of the content item from the server location 208. In other cases, the content block system 102 can download or provide the content item to a client device (e.g., the client device 210a) via the source identifier 206 to facilitate offline access.

Figure 3:
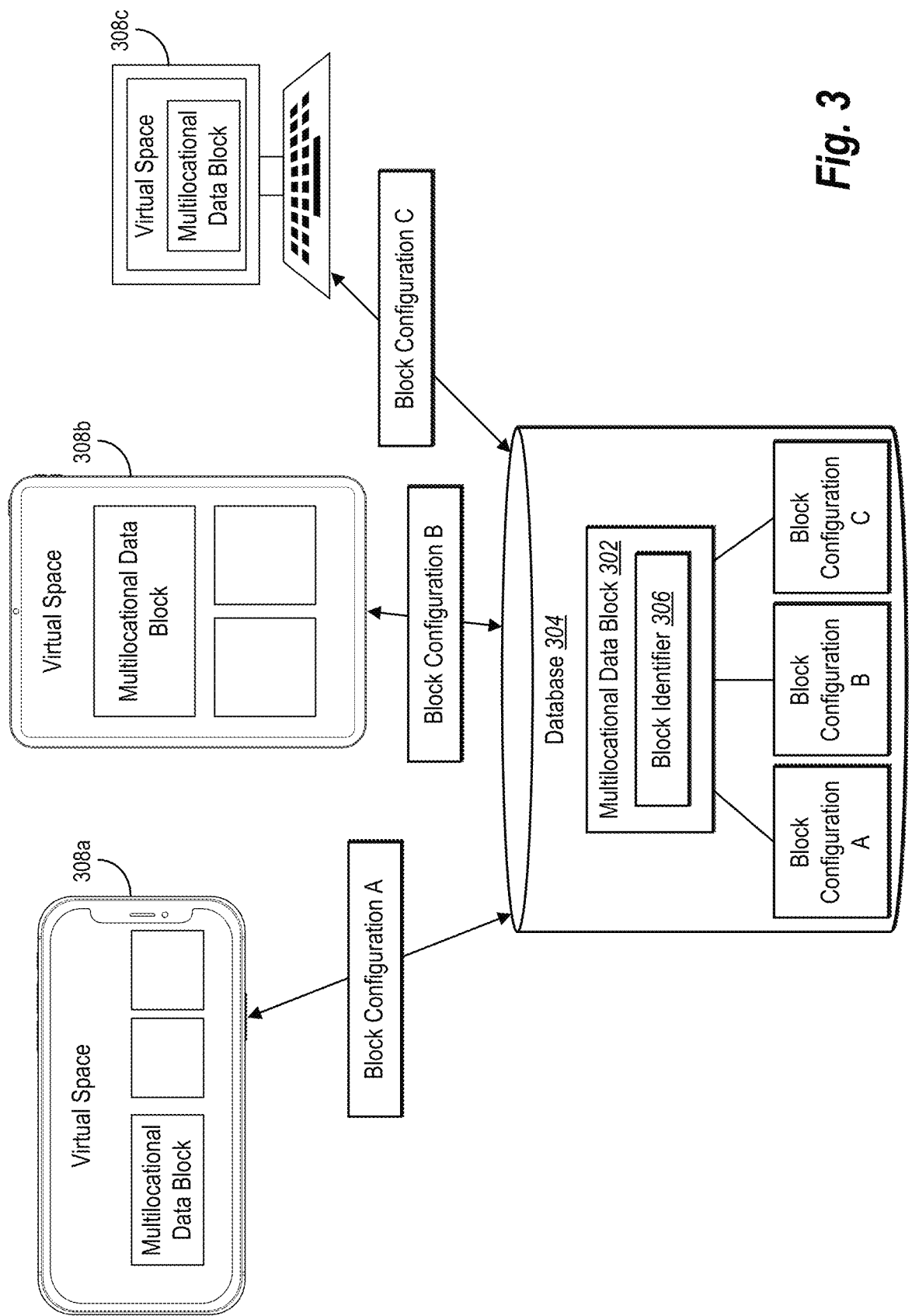
FIG. 3 illustrates an example multilocational data block embeddable within multiple virtual spaces in accordance with one or more embodiments.

As mentioned above, in certain described embodiments, the content block system 102 determines multiple block configurations for a multilocational data block. In particular, the content block system 102 determines different block configurations for the same multilocational data block based on user interactions defining visual characteristics for the multilocational data block within respective virtual spaces. FIG. 3 illustrates an example diagram for determining and accommodating different block configurations for a multilocational data block in accordance with one or more embodiments.

As illustrated in FIG. 3, the content block system 102 identifies or determines a multilocational data block 302 for embedding within virtual spaces of client devices. More particularly, the content block system 102 identifies the multilocational data block 302 stored within a server location of the content block system 102, such as the database 304. In some cases, the content block system 102 determines the multilocational data block 302 as a block requested or incorporated by a client device 308a, a client device 308b, and a client device 308c via a block identifier 306. In addition, the content block system 102 determines multiple block configurations for the multilocational data block 302, even though the multilocational data block 302 has only a single block identifier 306 (and/or a single source identifier). As shown, the content block system 102 determines block configuration A for the client device 308a, block configuration B for the client device 308b, and block configuration C for the client device 308c.

To determine a block configuration, the content block system 102 can receive or detect user interactions settings visual characteristics of the multilocational data block 302. For example, the content block system 102 receives an indication of a user interaction defining a size (e.g., height and width dimensions), a location, a color, and/or a shape of the multilocational data block 302. In some embodiments, the content block system 102 determines a block configuration by determining different sets of visual characteristics for the multilocational data block 302. In some cases, the content block system 102 receives or determines different visual characteristics for different block configurations. For instance, the content block system 102 receives interactions defining the block configuration A from the client device 308a, receives interactions defining the block configuration B from the client device 308b, and/or receives interactions defining the block configuration C from the client device 308c. Thus, the content block system 102 can store the multilocational data block 302 as a separate data entity from each of its virtual-space-specific (or account-specific or device-specific) block configurations, all within the database 304.

Figure 4:
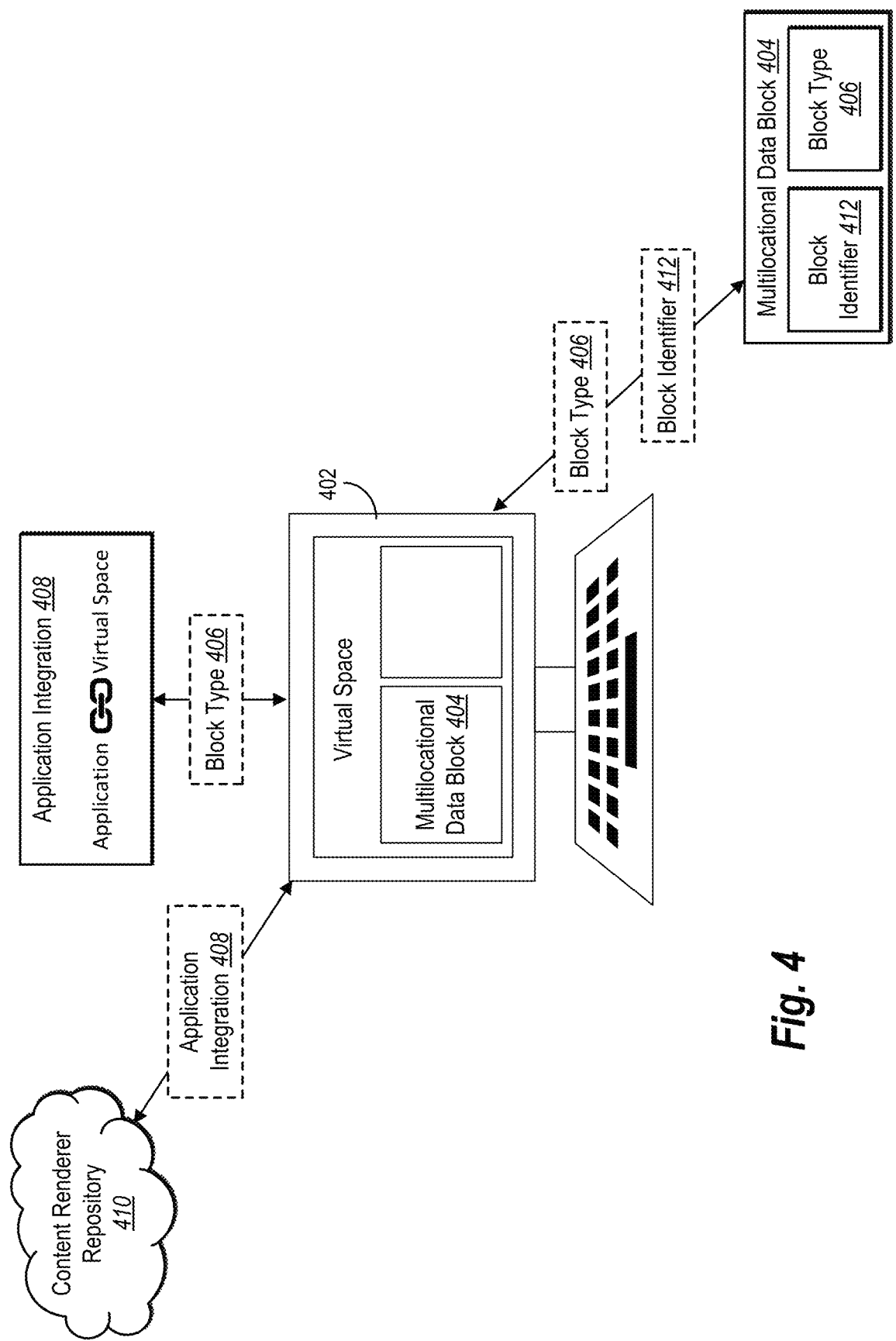
FIG. 4 illustrates an example diagram for determining an application integration and a content renderer for a multilocational data block in accordance with one or more embodiments.

As mentioned above, in certain embodiments, the content block system 102 determines and utilizes application integrations to facilitate rendering, modifying, or otherwise interacting with content items incorporated with a multilocational data block. In particular, the content block system 102 integrates (certain functions of) computer applications to facilitate interacting with multilocational data blocks associated with—or that are only compatible with—particular applications. FIG. 4 illustrates an example diagram for determining application integrations for a virtual space in accordance with one or more embodiments.

As illustrated in FIG. 4, the content block system 102 provides a multilocational data block 404 for display on a client device 402. Specifically, the content block system 102 embeds the multilocational data block 404 within a virtual space presented or displayed on the client device 402. In some embodiments, the content block system 102 embeds the multilocational data block 404 that includes a block identifier 412 and that includes (or is otherwise associated with) a block type 406. Indeed, the content block system 102 determines the block type 406 corresponding to the block identifier 412. For instance, the content block system 102 determines the block type 406 in response to receiving the block identifier 412 from the client device 402 (e.g., in response to receiving a request to present the multilocational data block 404).

Based on the block type 406, the content block system 102 determines or selects a compatible content renderer to render the multilocational data block 404 for display on the client device 402. To elaborate, the content block system 102 accesses a content renderer repository 410 that stores a plurality of content renderers for rendering multilocational data blocks of different types. In some cases, the content block system 102 determines content renderers as applications, application portions, or computer code segments that cause or provide content rendering capabilities for presenting content items (e.g., content items specific to certain applications) within virtual spaces. For instance, the content block system 102 can identify and integrate a content renderer using an application programming interface (API) associated with a particular computer application.

In one or more embodiments, the content block system 102 determines a content renderer from an application integration 408. In particular, the content block system 102 determines whether the virtual space of the client device 402 has linked or incorporated a particular application integration 408 that includes or defines a content renderer compatible with the block type 406 of the multilocational data block 404. In some cases, the content block system 102 can search for, download, and install (or otherwise incorporate) an application integration compatible with the block type 406 from a network location.

Based on identifying the application integration 408 for the block type 406, in some embodiments, the content block system 102 determines a compatible content renderer. Indeed, the content block system 102 can utilize the block type 406 to determine the application integration 408 and can utilize the application integration 408 to identify a content renderer. For example, the content block system 102 accesses a content renderer as a portion or a function of the application integration 408. In certain cases, the content block system 102 identifies a compatible content renderer from the content renderer repository 410 based on the application integration 408 (and/or the block type 406).

For instance, the content block system 102 identifies, from the content renderer repository 410 storing content renderers for different block types and/or different application integrations, a content renderer that is compatible with (or part of) the application integration 408. Accordingly, the content block system 102 can embed, incorporate, download, provide, or otherwise leverage the content renderer for the multilocational data block 404 to present the multilocational data block 404 within the virtual space on the client device 402. The content block system 102 can thus provide or present the multilocational data block 404 for display according to a block configuration using the block-type-specific content renderer.

Figure 5:
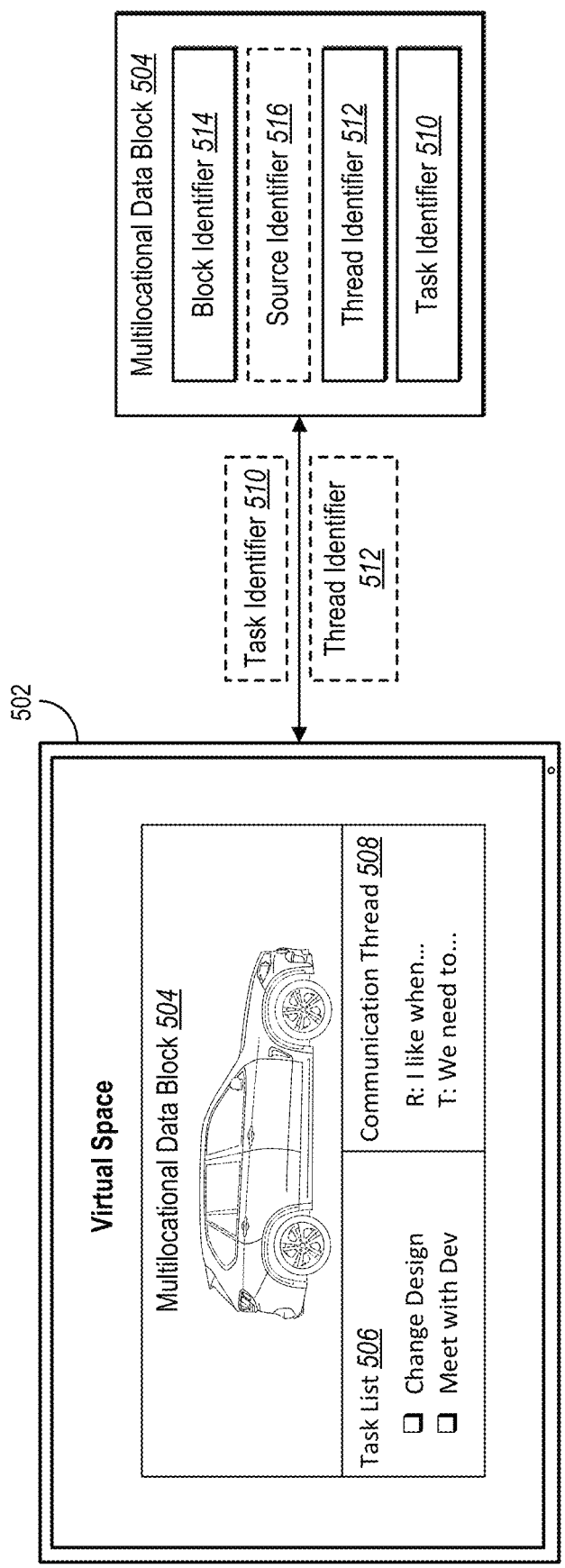
FIG. 5 illustrates an example multilocational data block that includes a task identifier and a thread identifier in accordance with one or more embodiments.

As mentioned above, in certain described embodiments, the content block system 102 generates and manages thread identifiers and task identifiers for a multilocational data block. In particular, the content block system 102 can generate a task identifier for a task thread linked to a multilocational data block and can generate a thread identifier for a communication thread linked to a multilocational data block. FIG. 5 illustrates an example diagram for generating and maintaining thread identifiers and task identifiers in accordance with one or more embodiments.

As illustrated in FIG. 5, the content block system 102 provides a multilocational data block 504 for display on a client device 502. In particular, the content block system 102 provides the multilocational data block 504 for display within a virtual space presented on the client device 502. In some embodiments, the content block system 102 generate the multilocational data block 504 to include information other than (or in addition to) pixels for a visualization of a content item (e.g., an image of a car). Indeed, as shown, the content block system 102 generates and provides a task list 506 and/or a communication thread 508 within or as part of (or to otherwise accompany) the multilocational data block 504.

For instance, the content block system 102 provides the task list 506 and the communication thread 508 as interactive components of the multilocational data block 504 that are associated with separate identifiers for independent storage and management. To elaborate, the content block system 102 generates the task list 506 that is interactive (independent of the displayed content item) via the client device 502 and/or other client devices that have access to the multilocational data block 504 in collaboration with the client device 502. In addition, the content block system 102 generates a task identifier 510 for the task list 506. In particular, based on receiving a request (e.g., an indication of a user interaction via the client device 502) to generate the task list 506, the content block system 102 generates the task identifier 510 as a data object to maintain the task list 506 and/or to update the task list 506 based on interactions with the task list 506.

In addition, the content block system 102 generates the communication thread 508 that is interactive (independent of the displayed content item) via the client device 502 and/or via other client devices with access to the multilocational data block 504 in collaboration with the client device 502. The content block system 102 further generates a thread identifier 512 for the communication thread 508. More specifically, the content block system 102 generates the thread identifier 512 as a data object to maintain the communication thread 508 separately from the task list 506 and/or the content item. The content block system 102 can further modify the communication thread 508 by updating the thread identifier 512 in response to user interactions with the communication thread 508.

Accordingly, as illustrated in FIG. 5, the content block system 102 can generate and maintain the multilocational data block 504 to include (be otherwise associated with) a block identifier 514 (for defining the multilocational data block 504 and linking to content item via the source identifier 516), a source identifier 516 (in the case where the multilocational data block 504 is a non-native block), a thread identifier 512, and a task identifier 510. In some cases, the content block system 102 links or ties the block identifier 514 to the source identifier 516, the thread identifier 512, and/or the task identifier 510. Accordingly, the content block system 102 can embed the multilocational data block 504 with a virtual space, along with its referenced content item, communication thread 508, and task list 506, by using (e.g., providing or transmitting) a single block identifier 514 (which includes computer code referencing the other identifiers for incorporating their respective digital content).

Figure 6:
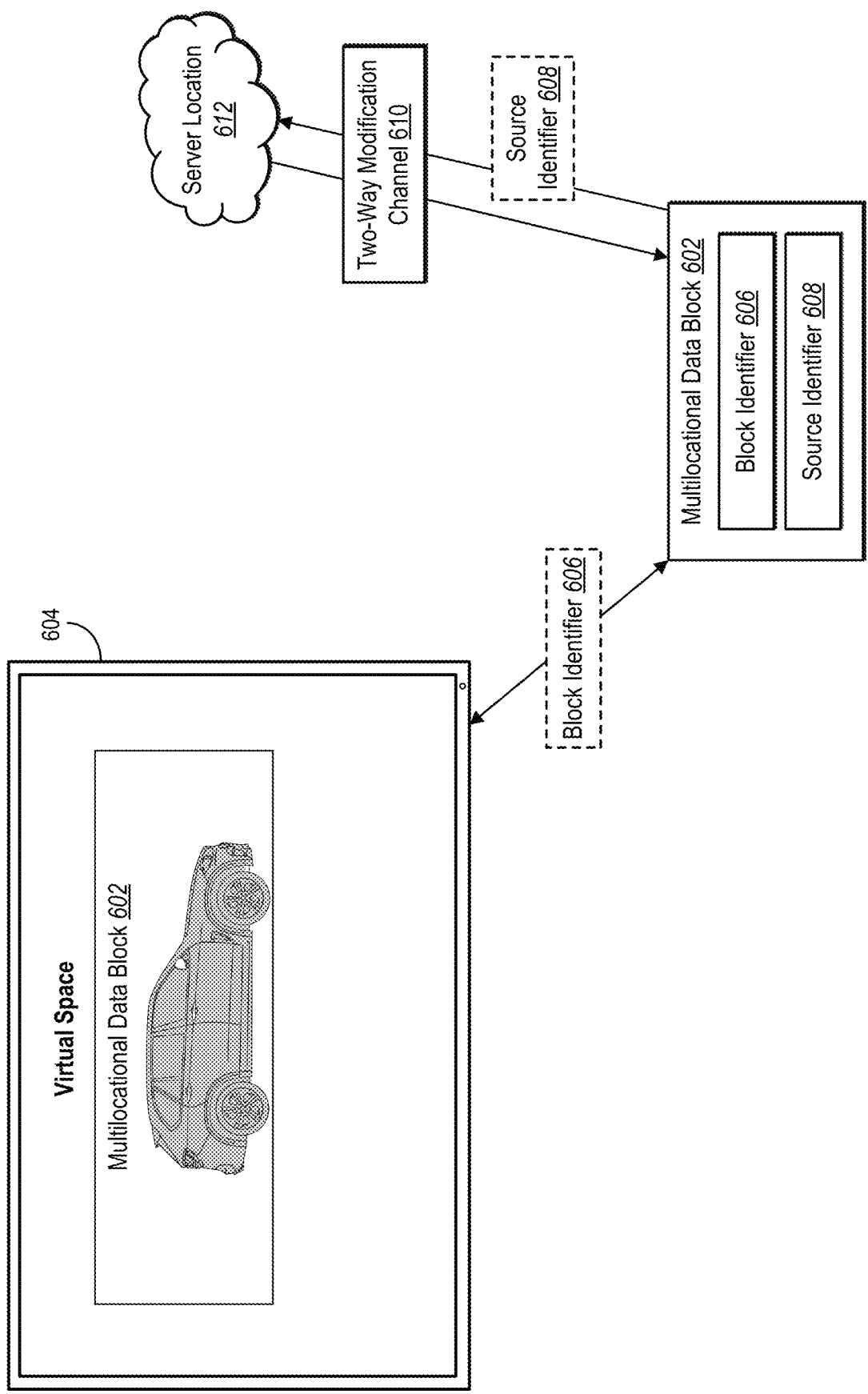
FIG. 6 illustrates an example diagram for modifying a content item at a server location using a two-way modification channel in accordance with one or more embodiments.

As mentioned above, in certain embodiments, the content block system 102 updates or modifies a content item at its server location based on an interaction with a multilocational data block. In particular, the content block system 102 can receive an indication of a user interaction with a multilocational data block to modify a displayed content item, and the content block system 102 can propagate the modification to the server location of the content item via a two-way modification channel. FIG. 6 illustrates an example diagram for modifying a content item at a server location using a two-way modification channel in accordance with one or more embodiments.

As illustrated in FIG. 6, the content block system 102 provides a multilocational data block 602 for display on a client device 604. More particularly, the content block system 102 provides a multilocational data block 602 by providing a block identifier 606 that is tied to a source identifier 608 which references a content item in the form of a digital image of a car (e.g., stored at the server location 612). Indeed, the content block system 102 accesses and incorporates the image of the car using the source identifier 608 to retrieve data from the server location 612 to render the pixels for the image of the car using a content renderer (e.g., from an application integration). Comparing the car to that illustrated in FIG. 5, the car of the multilocational data block 602 has a different color or shading. Indeed, the content block system 102 receives an indication of a user interaction via the client device 604 to modify the image of the car (e.g., to change the color/shading).

In response to the user interaction, the content block system 102 not only updates the visualization of the multilocational data block 602 within the virtual space of the client device 604, but the content block system 102 further propagates the modification to the server location 612. For example, the content block system 102 establishes or generates a two-way modification channel 610 (e.g., via a network connection) for transmitting or propagating changes to the content item to and from the server location 612. In some cases, the content block system 102 thus utilizes the two-way modification channel 610 to update the image of the car stored at the server location 612 according to modifications made via user interactions with the multilocational data block 602. In these or other cases, the content block system 102 further utilizes the two-way modification channel 610 to update the visualization of the image of the car within the multilocational data block 602 based on detecting a new version or an update to the content item as stored at the server location 612 (e.g., based on a modification made via another client device in collaboration with the client device 604).

FIGS. 1-6, the corresponding text, and the examples provide a number of different systems and methods for generating and managing a multilocational data block in accordance with one or more embodiments. In addition to the foregoing, implementations can also be described in terms of flowcharts comprising acts steps in a method for accomplishing a particular result. For example, FIG. 7 illustrates an example series of acts for generating and managing a multilocational data block in accordance with one or more embodiments.

Figure 7:
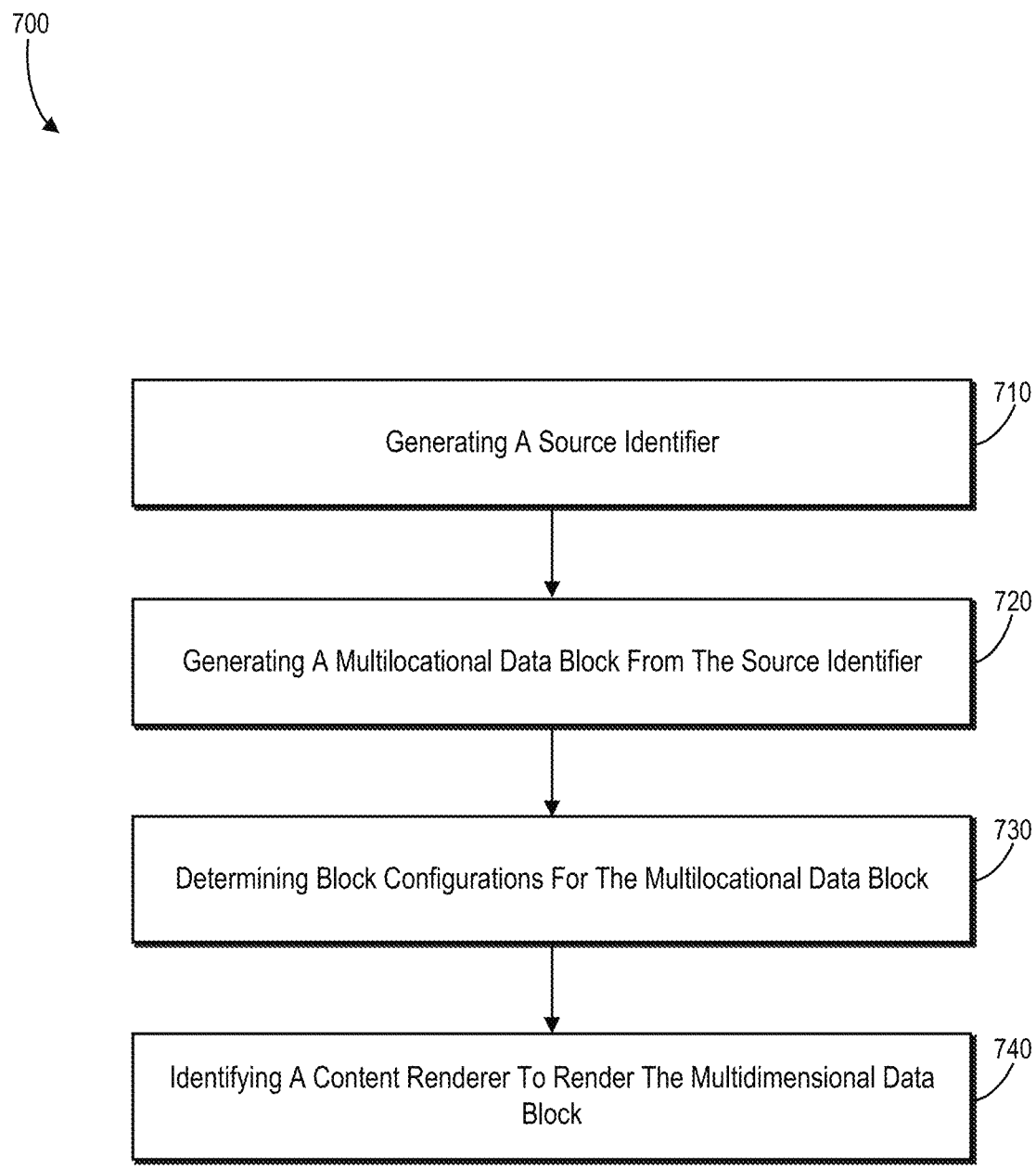
FIG. 7 illustrates an example flowchart of a series of acts for generating and managing a multilocational data block in accordance with one or more embodiments.

While FIG. 7 illustrates acts according to certain implementations, alternative implementations may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further implementations, a system can perform the acts of FIG. 7.

As illustrated in FIG. 7, the series of acts 700 may include an act 710 of generating a source identifier. For example, the act 710 involves generating a source identifier indicating a server location storing a content item. In addition, the series of acts 700 includes an act 720 of generating a multilocational data block from the source identifier. For example, the act 720 involves generating, from the source identifier, a multilocational data block referencing the content item stored at the server location of the source identifier, wherein the multilocational data block is embeddable within multiple virtual spaces concurrently using a single block identifier. Further, the series of acts 700 includes an act 730 of determining block configurations for the multilocational data block. For example, the act 730 involves determining, for the multilocational data block, a plurality of block configurations indicating different visual characteristics (e.g., set by different client devices) for displaying the multilocational data block within respective virtual spaces. Additionally, the series of acts 700 includes an act 740 of identifying a content renderer to render the multilocational data block. For example, the act 740 involves identifying, for the multilocational data block and from a repository of content renderers (associated with application integrations for a virtual space platform), a content renderer compatible with visualizing the multilocational data block according to a block configuration from among the plurality of block configurations.

In some embodiments, the series of acts 700 includes an act of generating the source identifier by generating a data element that ties (or references) the server location storing the content item to (or for incorporating within) multilocational data blocks that include block identifiers which reference the source identifier (without copying the content item). In these or other embodiments, the series of acts 700 includes an act of generating the multilocational data block by generating a data element stored in a single server location, wherein the data element incorporates at least a portion of the content item by tying the single block identifier to the source identifier. Further, the series of acts 700 can include an act of determining the plurality of block configurations by determining visual characteristics set by different client devices for presenting different visual representations of the multilocational data block within the respective virtual spaces.

In some embodiments, the series of acts 700 includes an act of identifying the content renderer compatible with visualizing the multilocational data block by identifying an application integration that is associated with a block type of the multilocational data block. In addition, the series of acts 700 can include an act of determining the content renderers within the repository of content renderers by receiving, from a client device, indications for a plurality of application integrations to incorporate within a virtual space platform using respective application programming interfaces. Further, the series of acts 700 can include an act of generating an additional multilocational data block that is native to a virtual space platform and that includes a block identifier that is not associated with a corresponding source identifier.

In some embodiments, the series of acts 700 includes an act of identifying the content renderer compatible with visualizing the multilocational data block by: determining a block type associated with the multilocational data block and identifying an application integration that is associated with the block type. The series of acts 700 can also include an act of identifying the content renderer from among the repository of content renderers including segments of computer code generated, from corresponding application integrations, for rendering content items within multilocational data blocks. In certain cases, the series of acts 700 includes an act of providing the multilocational data block for display within a first virtual space according to a first block configuration set by a first client device and/or further includes an act of providing the multilocational data block for display within a second virtual space according to a second block configuration set by a second client device.

In some embodiments, the series of acts 700 includes an act of generating the multilocational data block by generating a data element stored in a single server location that incorporates the content item by tying the single block identifier to the source identifier without storing the content item at the single server location of the data element. The series of acts 700 can also include an act of determining the plurality of block configurations by determining locations and dimensions associated with versions of the multilocational data block displayed with the respective virtual spaces.

In certain embodiments, the series of acts 700 includes an act of determining a task list associated with the multilocational data block. Further, the series of acts 700 can include an act of generating, for the task list, a task identifier comprising a data element tied to the single block identifier of the multilocational data block. In some cases, the series of acts 700 includes an act of determining a communication thread associated with the multilocational data block. In these or other cases, the series of acts 700 includes an act of generating, for the communication thread, a thread identifier including a data element tied to the single block identifier of the multilocational data block. In addition, the series of acts 700 can include an act of receiving an indication of a user interaction with the multilocational data block for modifying content presented within the multilocational data block. Further, the series of acts 700 can include an act of, based on the indication of the user interaction, utilizing a two-way modification channel to propagate a modification made to the content presented within the multilocational data block to the content item stored at the server location associated with the source identifier.

Generating and Summarizing Content Blocks within a Virtual Space Interface

Figure 8:
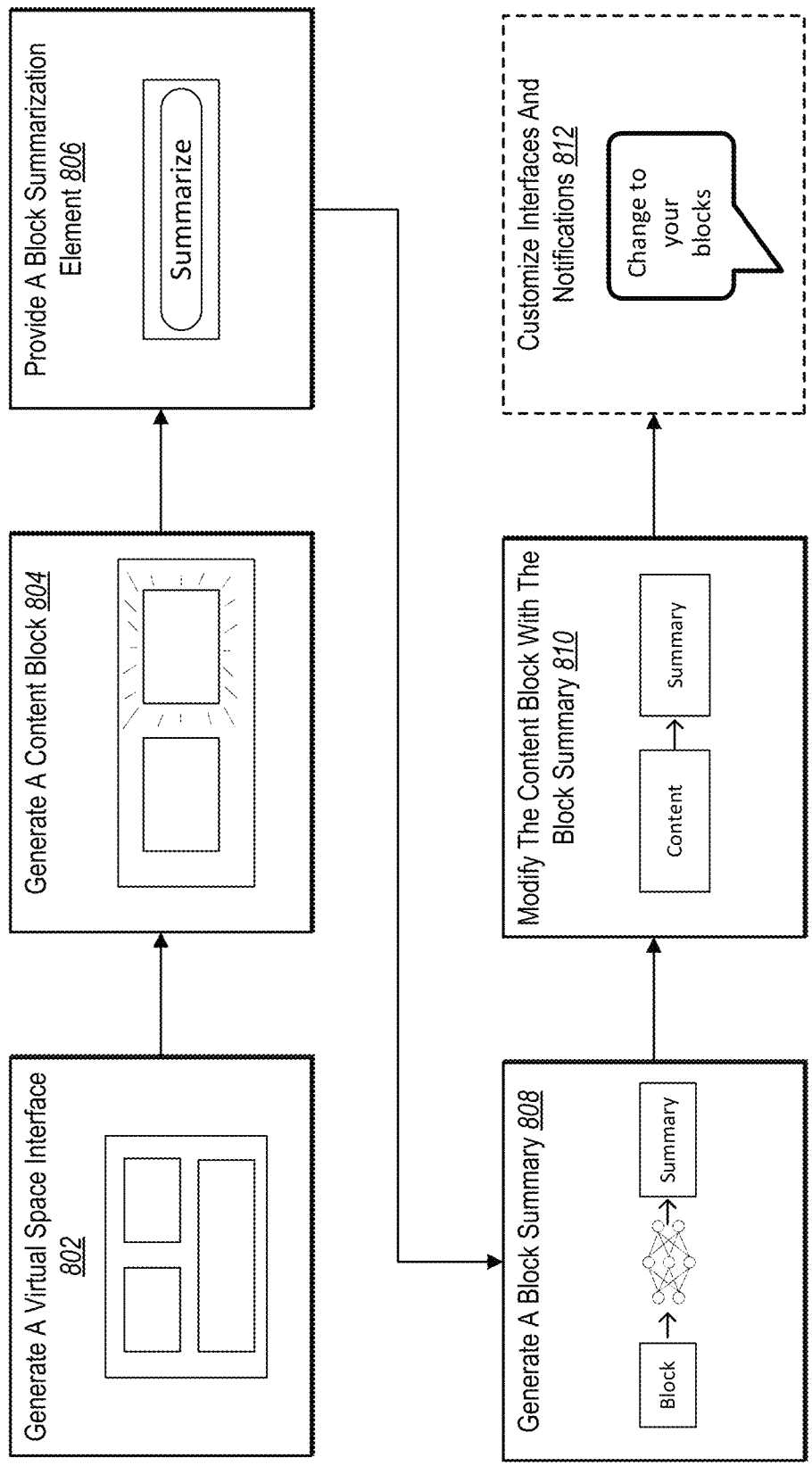
FIG. 8 illustrates an example overview of generating block summary for a content block in accordance with one or more embodiments.

As mentioned above, in certain embodiments, the content block system 102 generates and provides customized virtual spaces for display on client devices. Indeed, the content block system 102 can generate multilocational data blocks described above in relation to FIGS. 1-7. From the multilocational data blocks, the content block system 102 can further provide visualizations of the multilocational data blocks (in the form of content blocks) for display within virtual spaces, where the content blocks incorporate content items from respective server locations and/or include native content for a virtual space. FIG. 8 illustrates an example overview of generating and providing content blocks for display within a virtual space in accordance with one or more embodiments. Thereafter, additional detail regarding the various acts of FIG. 8 is provided with reference to subsequent figures.

As illustrated in FIG. 8, the content block system 102 performs an act 802 to generate a virtual space interface. In particular, the content block system 102 generates a virtual space interface as part of a virtual space platform (e.g., a web-based or standalone virtual space application) that provides an environment for viewing and interacting with content items. Within the environment of a (single) virtual space interface, the content block system 102 provides contextual data surrounding the displayed content items, including user accounts associated with the content items, task lists associated with the content items, calendar events associated with the content items, virtual meetings associated with the content items, communication threads associated with the content items, and/or other contextual data.

As further illustrated in FIG. 8, the content block system 102 performs an act 804 to generate a content block. In particular, the content block system 102 generates a content block to present or display a visualization of data (e.g., a content item) incorporated within a multilocational data block. Indeed, the content block system 102 can generate a content block that visualizes a content item stored at an external server location (e.g., outside of the content management system 106) and/or that incorporates data native to a virtual space platform of the content block system 102, such as a communication thread block or a task list block. The content block system 102 can further generate a content block as an interface element that has modifiable visual characteristics, such as size, position, color, and shape. Indeed, based on receiving a user interaction to modify a height or width of a content block, the content block system 102 can adjust the presentation of digital content within the content block to show more or less content, depending on an increase or decrease in dimension. For instance, based on detecting a request for a full-screen view of a content block, the content block system 102 can provide more of the content item for display than for a smaller-sized content block. In some cases, a content block can be interactive to modify a depicted content item as well.

As also illustrated in FIG. 8, the content block system 102 performs an act 806 to provide a block summarization element. In particular, the content block system 102 can generate and provide a block summarization element for display within a virtual space, where the block summarization element is a selectable interface element for generating a block summary from a content block. In some cases, the content block system 102 provides a block summarization element for display within a content block, while in other cases the content block system 102 provides a block summarization element for display in other locations of a virtual space interface.

Additionally, the content block system 102 performs an act 808 to generate a block summary. To elaborate, the content block system 102 receives an indication of a user interaction selecting a block summarization element, and in response, the content block system 102 generates a block summary from the digital content of a content block. For example, the content block system 102 utilizes a block summarization neural network (e.g., a large language model such as ChatGPT) to generate a block summary from a content block. In some cases, the content block system 102 generates a block summary in the form of a description of a digital image, a description of a digital video, a shortened version of a digital video, and/or a concise description of a digital document or spreadsheet explaining the contents.

As further illustrated in FIG. 8, the content block system 102 performs an act 810 to modify the content block with the block summary. More specifically, the content block system 102 updates or modifies the content block from which the block summary is generated by replacing the visualization of the content item with a visualization of the block summary within the content block. Indeed, the content block system 102 can modify the content block to display the block summary while still retaining the same block identifier tied to the same source identifier referencing the same content item. The content block system 102 may only change the visual presentation of the content block while maintaining the underlying data structures linking the content block to a content item at a server location. In some cases, the content block system 102 generates a block summary identifier and ties the block summary identifier to the block identifier of the content block to reference the block summary stored at a server location (e.g., within the content management system 106).

As also illustrated in FIG. 8, the content block system 102 performs an act 812 to customize interfaces and notifications. In particular, the content block system 102 can provide notifications for display within a virtual space interface (or elsewhere on a client device) that indicate updates or modifications to content blocks (e.g., based on changes from other, collaborating client devices). In addition, the content block system 102 can customize various user interfaces, such as virtual space interfaces, space summary interfaces, and/or other user interfaces based on content blocks and/or block summaries within one or more virtual spaces. Indeed, the content block system 102 can customize space summary interfaces on a per-user-account basis and/or a per-device basis to present relevant content block information based on historical user account behavior (e.g., selections, views, scrolls, shares, downloads, receipts, modifications, and/or time spent interacting with content items).

Figure 9:
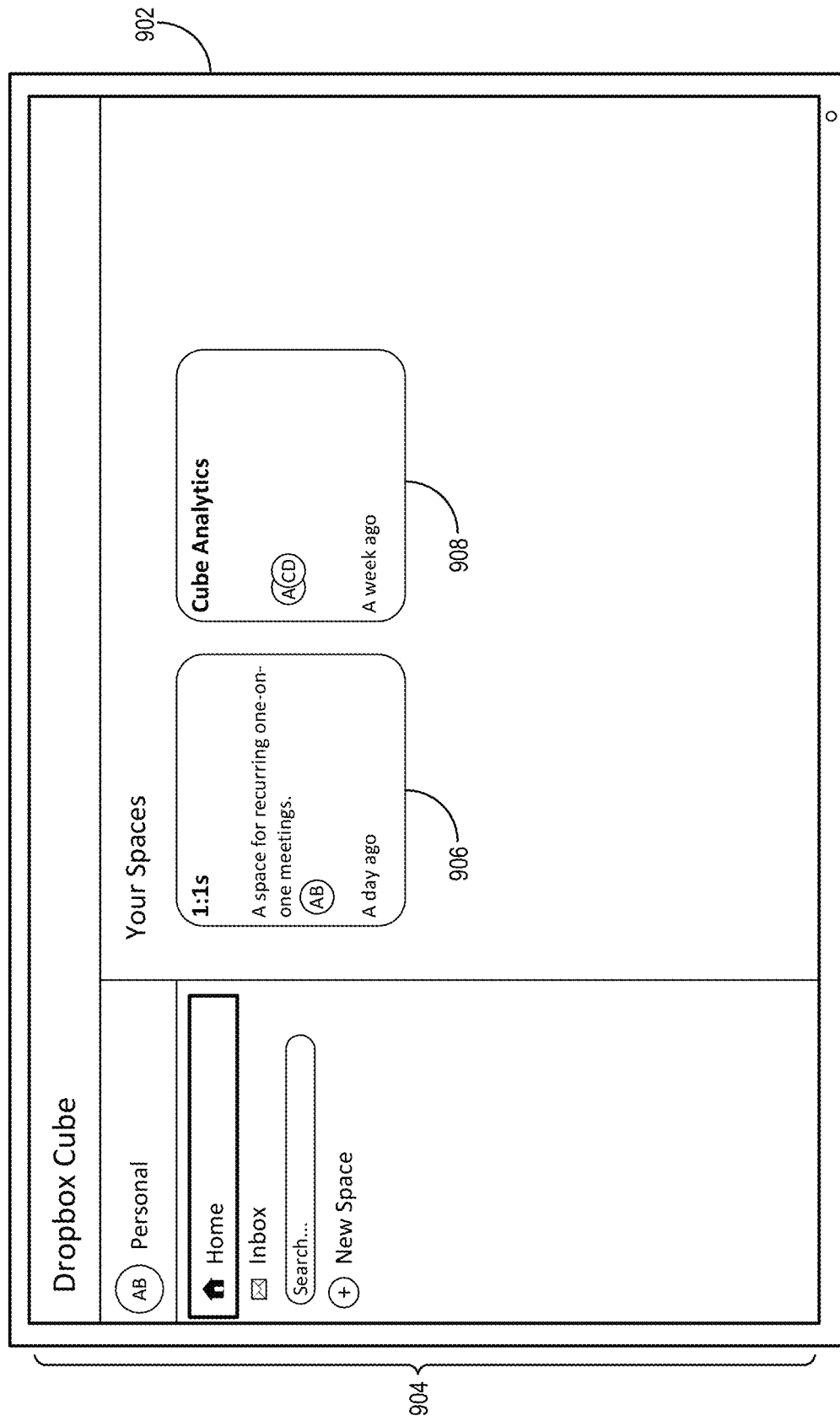
FIG. 9 illustrates an example space summary interface in accordance with one or more embodiments.

As mentioned, in certain described embodiments, the content block system 102 provides a space summary interface for display on a client device. In particular, the content block system 102 can provide a space summary interface that summarizes or includes selectable space elements for one or more virtual spaces associated with a user account. FIG. 9 illustrates an example space summary interface in accordance with one or more embodiments.

As illustrated in FIG. 9, the content block system 102 provides a space summary interface 904 for display on a client device 902. As shown, the space summary interface 904 is a "home" interface within a virtual space platform (e.g., within a "Dropbox Cube" application). As shown, the space summary interface 904 includes a left rail that indicates a user account for the space summary interface 904 and that further includes a search element and a selectable element for adding a new virtual space for the user account "AB." In addition, the space summary interface 904 includes a space element 906 and a space element 908 that are each selectable to access respective virtual space interfaces.

Indeed, based on a user interaction selecting the space element 906, the content block system 102 can provide a virtual space interface for the "1:1s" virtual space. Likewise, based on a user interaction selecting the space element 908, the content block system 102 can provide a virtual space interface for the "Cube Analytics" virtual space.

As shown, the space element 906 indicates that only the user account "AB" has access to the "1:1s" virtual space. In addition, the space element 906 includes a virtual space summary for the "1:1s" virtual space, summarizing the virtual space as "A space for recurring one-on-one meetings." Indeed, the content block system 102 can generate a virtual space summary based on content blocks included within the virtual space (e.g., using a summarization neural network such as a large language model or a vision-language model in the case of mixed content including images and text). For instance, the content block system 102 can automatically (e.g., without requiring user input to request or prompt) generate a virtual space summary for one or more virtual spaces for display within the space summary interface 904 (e.g., within respective virtual space elements). As further shown, the space element 908 indicates that the "Cube Analytics" virtual space is accessible by the "AB" user account as well as the "CD" user account. The content block system 102 can further indicate when a user account last accessed a virtual space within a corresponding virtual space element (e.g., "A day ago" or "A week ago").

Figure 10:
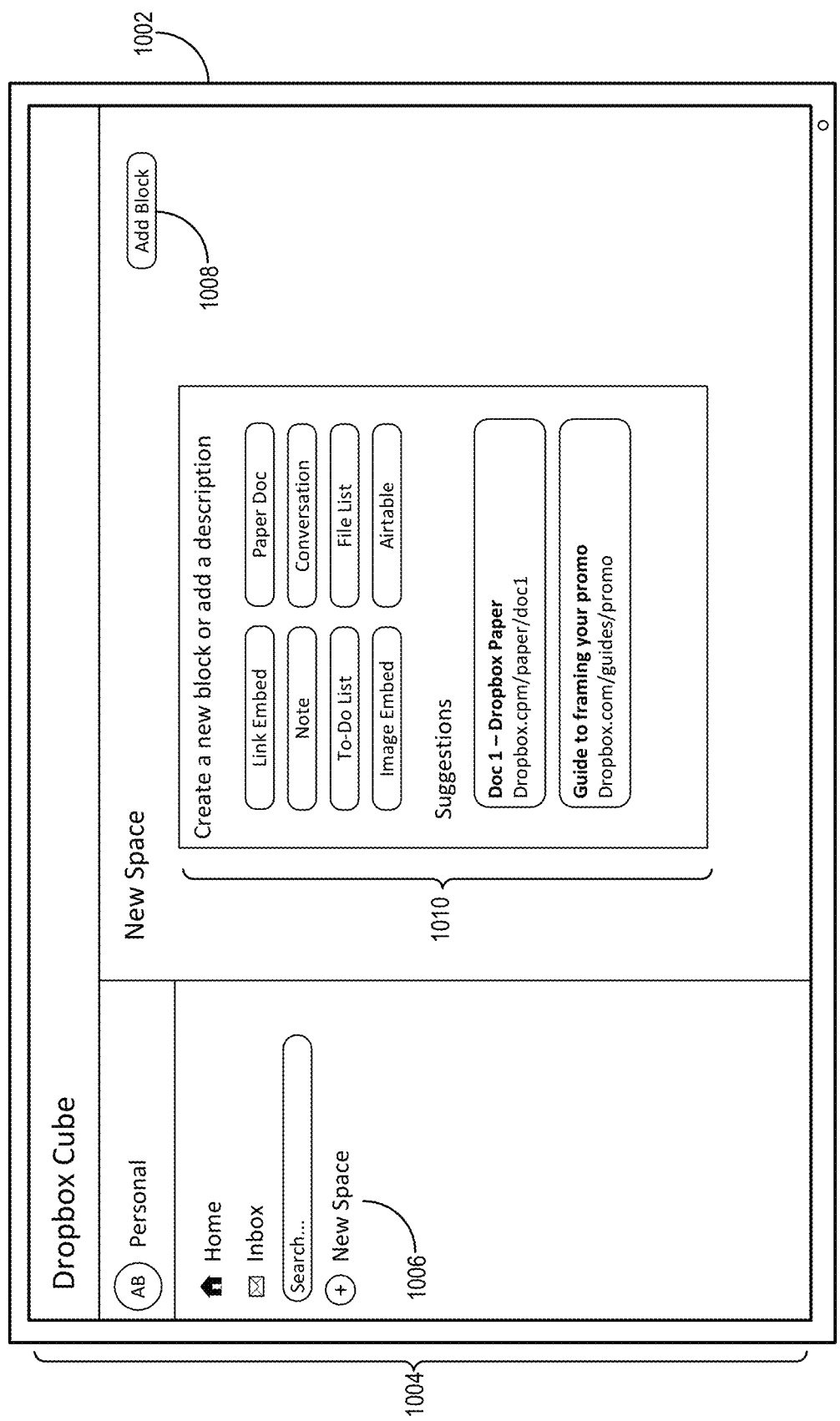
FIG. 10 illustrates an example virtual space interface for adding a new content block in accordance with one or more embodiments.

As mentioned above, in certain embodiments, the content block system 102 can provide a virtual space interface for display on a client device. In particular, the content block system 102 can provide a virtual space interface based on receiving a user interaction selecting a space element within a space summary interface. FIG. 10 illustrates an example virtual space interface in accordance with one or more embodiments.

As illustrated in FIG. 10, the content block system 102 provides a virtual space interface 1004 for display on a client device 1002. In particular, the content block system 102 generates and provides the virtual space interface 1004 in response to receiving an indication of a user interaction selecting the new space element 1006. Based on generating a new virtual space and providing the virtual space interface 1004, the content block system 102 further provides interface elements for creating a new content block to include within the virtual space interface 1004. For example, the content block system 102 provides an add block element 1008 within the virtual space interface 1004. In some cases, the content block system 102 provides the new block element 1010 in response to receiving an indication of a user interaction selecting the add block element 1008 for adding a new block to the virtual space interface 1004.

As shown, the content block system 102 generates the new block element 1010 to include a number of elements for creating a content block of a particular block type. To elaborate, the content block system 102 can provide a number of block type elements corresponding to respective block types for a new content block. In some cases, the content block system 102 can determine application integrations integrated or incorporated with the virtual space platform and can populate the list of block type elements based on the application integrations (e.g., to include a block type element for each application integration).

In addition, the content block system 102 can provide block type elements for native content blocks, including communication thread blocks and/or task list blocks that do not require application integrations but whose functionality is instead built in to the virtual space platform. As shown, the content block system 102 provides block type elements for block types such as "Note," "Paper Doc," and "Airtable," among others. Indeed, in response to receiving an indication of a user interaction selecting a block type element, the content block system 102 generates a new content block of the corresponding block type, incorporating functionality of the associated application integration for rendering and interacting with a content item.

As also shown, the content block system 102 generates the new block element 1010 to include a list of block suggestions. For example, the content block system 102 generates a block suggestion using a block suggestion machine learning model (e.g., a neural network). Indeed, the content block system 102 can utilize a block suggestion machine learning model to generate a block suggestion from user account data, such as historical user account interactions with various content items. Indeed, the content block system 102 can generate a model input in the form of a user account dataset that includes indications of views, clicks, modifications, scrolls, shares, receipts, and/or interaction times associated with various content items including websites and/or content items stored within the content management system 106. In some cases, the content block system 102 can access web browser data to determine or generate block suggestions. For instance, the content block system 102 can identify a content item within an open tab of a web browser as a content item to suggest within block suggestion.

Accordingly, the content block system 102 can generate user-account-specific block suggestions differently for each user account of the content block system 102. As shown, the content block system 102 generates a first block suggestion for "Doc 1—Dropbox Paper" that is selectable to generate a new content block for the indicated content item (and to incorporate functionality from a Dropbox Paper application integration). As also shown, the content block system 102 generates a second block suggestion for "Guide to framing your promo," which, upon selection, prompts the content block system 102 to generate a new content block for the indicated content item for display within the virtual space interface 1004. Indeed, in some cases, based on selection of a block suggestion, the content block system 102: i) identifies a server location (e.g., a URL) of the suggested content item, ii) parses the URL to identify an application integration corresponding to the content item (e.g., by extracting a content identifier from the URL), iii) determines a source identifier for the content item (e.g., via an API), and iv) generates a content block to render the content item.

Figure 11A:
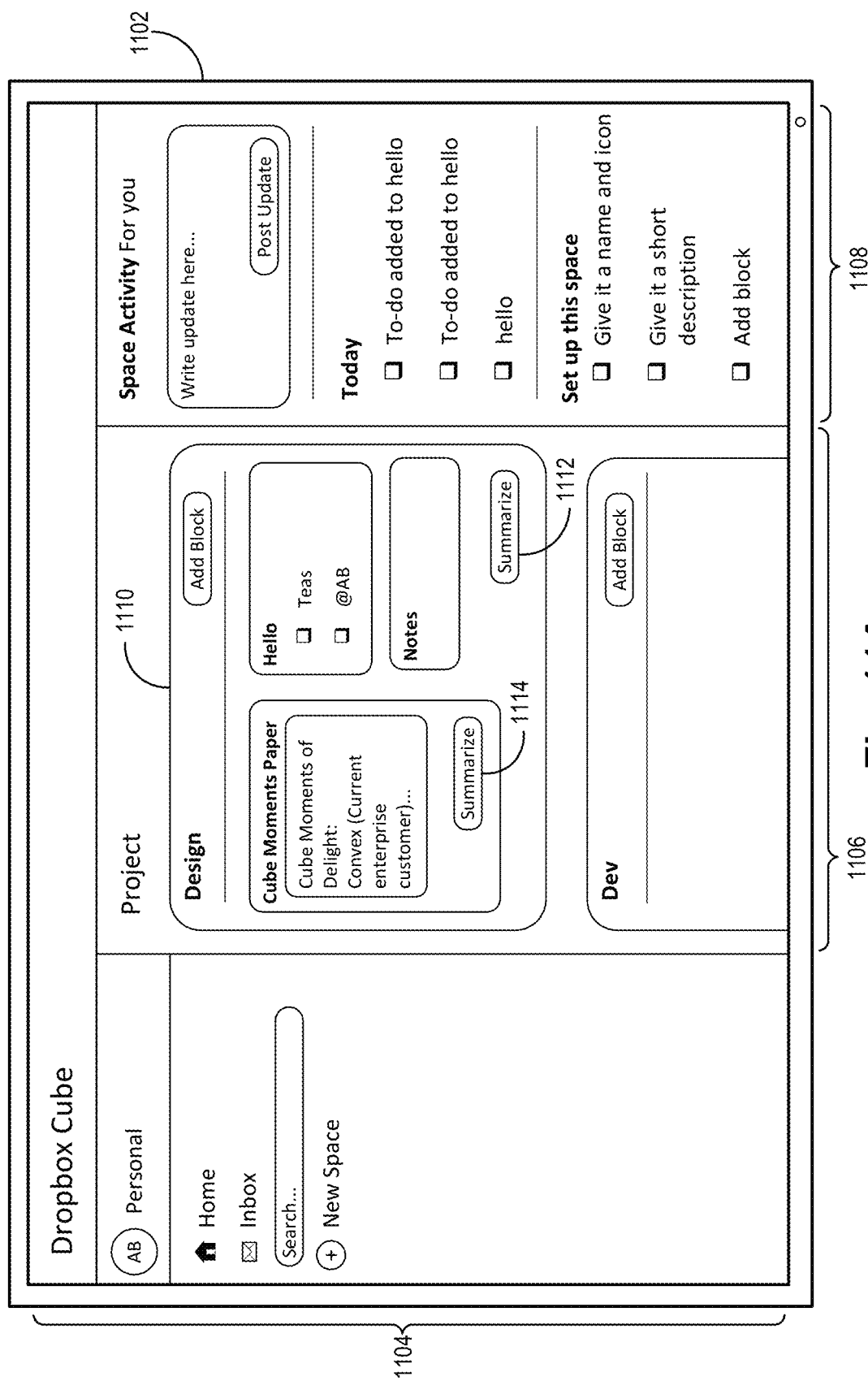
FIGS. 11A-11B illustrate example virtual space interfaces for modifying content blocks and generating block summaries in accordance with one or more embodiments.
Figure 11B:
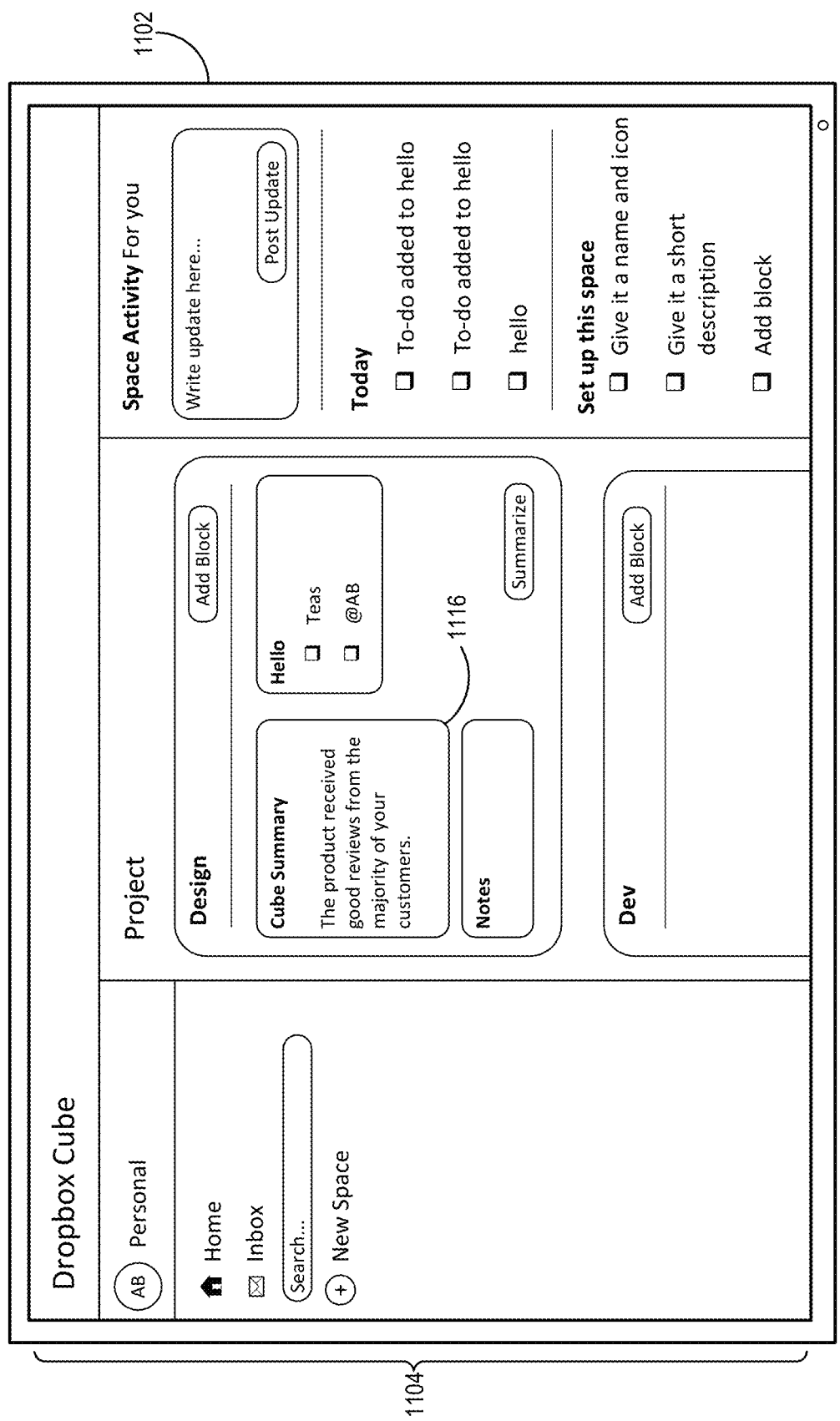

As mentioned above, in certain described embodiments, the content block system 102 generates and provides a virtual space interface for modifying or manipulating content blocks (and/or corresponding content items). In particular, the content block system 102 generates a virtual space interface that includes multiple content blocks arranged according to user input. The content block system 102 can further generate a block summary for a content block and can modify presentation of the content block to depict that block summary. FIGS. 11A-11B illustrate example virtual space interfaces, including an update of a content block from displaying a content item to displaying a block summary, in accordance with one or more embodiments.

As illustrated in FIG. 11A, the content block system 102 generates and provides a virtual space interface 1104 for display on a client device 1102. In particular, the content block system 102 generates the virtual space interface 1004 to include multiple sections and content blocks. As shown, the content block system 102 generates the virtual space interface 1104 to present content blocks for a virtual space named "Project." In addition, the content block system 102 generates the virtual space interface 1104 to include a virtual space portion 1106 depicting sections and content blocks for the virtual space and to include a right rail 1108 depicting contextual data associated with the virtual space.

To elaborate, the content block system 102 generates the right rail 1108 to include an activity feed ("Space Activity"). The content block system 102 can populate the activity feed with action summaries for activities performed by the client device 1102 with respect to content blocks or content items within the virtual space interface 1104. Indeed, based on detecting an interaction with a content block (e.g., a modification to a content item via a content block), the content block system 102 can update the activity feed with a summary of the interaction. In some cases, the content block system 102 can also receive text input with the activity feed to add manual updates or comments (e.g., within the "Write update here" bubble). Accordingly, the content block system 102 can update the activity feed as shown on multiple client devices presenting respective virtual space interfaces for the same "Project" virtual space. In some cases, the content block system 102 generates the activity feed to include activities for a particular time period (e.g., "Today").

Further, the content block system 102 generates the right rail 1108 to include block action suggestions ("Set up this space"). To elaborate, the content block system 102 can determine block action suggestions for a user account to set up the virtual space interface 1104. In some case, the content block system 102 generates block action suggestions based on determining historical user interactions for the "AB" user account (and/or other user accounts) and comparing the historical user interactions with interactions that have taken place within the virtual space interface 1104. For instance, the content block system 102 can determine that the "AB" user account (and/or other user accounts) perform one or more actions within a new virtual space interface (and/or in relation to particular content blocks) in at least a threshold percentage of virtual space interfaces (for the "AB" user account and/or other user accounts). Based on determining that the user account has not yet performed such actions within the virtual space interface 1104, the content block system 102 can further generate and provide block action suggestions for those actions.

As further illustrated in FIG. 11A, the content block system 102 generates the virtual space interface 1104 to include a virtual space portion 1106. Within the virtual space portion 1106, the content block system 102 generates and provides multiple block sections, such as a "Design" block section and a "Dev" block section. The content block system 102 can also provide various interface elements within the block sections, such as an "Add Block" option that is selectable to add a new content block within a block section (e.g., using the new block element described in relation to FIG. 10). Within the virtual space portion 1106, the block sections can be modifiable to adjust visual characteristics including size, position, shape, and color. For instance, the content block system 102 can receive a user interaction to move the "Dev" section above the "Design" section and/or to place them side-by-side, with one section larger than the other.

In addition, the content block system 102 can receive user interactions to adjust visual characteristics of content blocks. For example, the content block system 102 can receive an indication of a user interaction to adjust a width, a height, a position, a color, and/or a shape of a content block (e.g., within its block section or to move the block to another section or outside all block sections). In some cases, the content block system 102 propagates modifications made to visual characteristics of a content block (and/or a block section) to all other client devices with access to the same virtual space (so that all client devices accessing the same virtual space have virtual space interfaces with the same format/appearance).

In other cases, the content block system 102 does not propagate modifications made to visual characteristics of blocks and/or sections to other devices. In these cases, the content block system 102 can thus customize the appearance of a single virtual space differently for different client devices presenting their own virtual space interfaces. In some embodiments, the content block system 102 further customizes the appearance of content blocks within a virtual space interface according to user account behavior. For instance, the content block system 102 can reposition content blocks (or block sections) that receive higher numbers of (or more frequent) interactions (e.g., shares, views, clicks, scrolls, modifications, receipts, or other interactions) into more prominent locations (e.g., higher up within a virtual space interface). Thus, the content block system 102 can provide the same content blocks for the same virtual space with different appearances or arrangements within virtual space interfaces of different client devices.

As further illustrated in FIG. 11A, the content block system 102 generates and provides content blocks, such as a content block 1110, a communication thread block ("Notes"), and a task list block "Hello." As mentioned, the content block system 102 provides the communication thread block and the task list block as native blocks that do not require an application integration with an external application to facilitate presentation of, and/or interaction with, digital content. The content block system 102 can further provide block identifiers for the communication thread block and the task list block to all client devices with access to the virtual space corresponding to the virtual space interface 1104 for viewing/interacting with the communication thread/task list. In some cases, the content block system 102 can access a particular application integration for a calendar application to determine and present tasks within the task list block, as indicated by the calendar application (e.g., for cases where the task list block is non-native).

For the content block 1110, the content block system 102 can identify or determine an application integration for an external application, such as Dropbox Paper. Based on integrating the Dropbox Paper application (or a subset of functions from the application), the content block system 102 provides a visualization of a content item ("Cube Moments Paper") referenced by a source identifier linked to a block identifier of the content block 1110. As shown, the referenced content item includes more text and/or images than are visible within the content block 1110. Accordingly, to accompany the content block 1110, the content block system 102 generates and provides a block summarization element 1114 to generate a block summary for the content block 1110.

Indeed, in response to a user interaction selecting the block summarization element 1114, the content block system 102 generates a block summary for display within the content block 1110. In some cases, the content block system 102 provides the block summarization element 1114 only upon determining that the content block 1110 cannot present the entire contents of the referenced content item (e.g., according to its dimensions and position). Indeed, the content block system 102 can update or modify a block summary (or generate a new block summary) based on the dimensions of a content block, adjusting the length of the block summary to the size of the content block (e.g., where smaller blocks have shorter summaries than larger blocks).

In one or more embodiments, the content block system 102 also (or alternatively) provides a section summarization element 1112 and/or a space summarization element. Based on a user interaction selecting the section summarization element 1112, the content block system 102 can generate a section summary from multiple content blocks included within the "Design" block section. For instance, the content block system 102 can provide a selection menu for indicating which of the content blocks within the block section to include as part of a multi-block summary. Based on selecting a set of content blocks, the content block system 102 can thus generate a multi-block summary that concisely describes the content of the multiple content blocks. Similarly, the content block system 102 can generate a multi-block summary in the form of a space summary to summarize block sections and/or content blocks of a virtual space based on selection of specific content blocks to include.

To generate a multi-block summary, the content block system 102 can utilize a block summarization neural network (e.g., a large language model or a vision-language model). For instance, the content block system 102 can extract and combine the digital content from multiple content blocks into a single data input for a block summarization neural network. In some cases, the content block system 102 generates or extracts feature vectors from each of the individual content blocks and combines (e.g., concatenates or sums) the feature vectors into a multi-block feature vector (e.g., using an encoder layer or an encoder neural network of the block summarization neural network). Accordingly, the content block system 102 can utilize the block summarization neural network to generate a multi-block summary from the multi-block feature vector. In the case of a single block summary, the content block system 102 can extract a feature vector from a single content block and generate the block summary from the single block feature vector.

As just mentioned, the content block system 102 can generate a block summary for a content block based on a selection of the block summarization element 1114. FIG. 11B illustrates an example of modifying the virtual space interface 1104 to display a block summary in accordance with one or more embodiments. As illustrated in FIG. 11B, the content block system 102 modifies or updates the content block 1110 to generate the modified content block 1116. Indeed, the content block system 102 generates the modified content block 1116 to depict or present the block summary in place of the content item initially depicted within the content block 1110. As shown, the modified content block 1116 depicts a "Cube Summary" that concisely sums up the contents of the content block 1110.

Figure 12A:
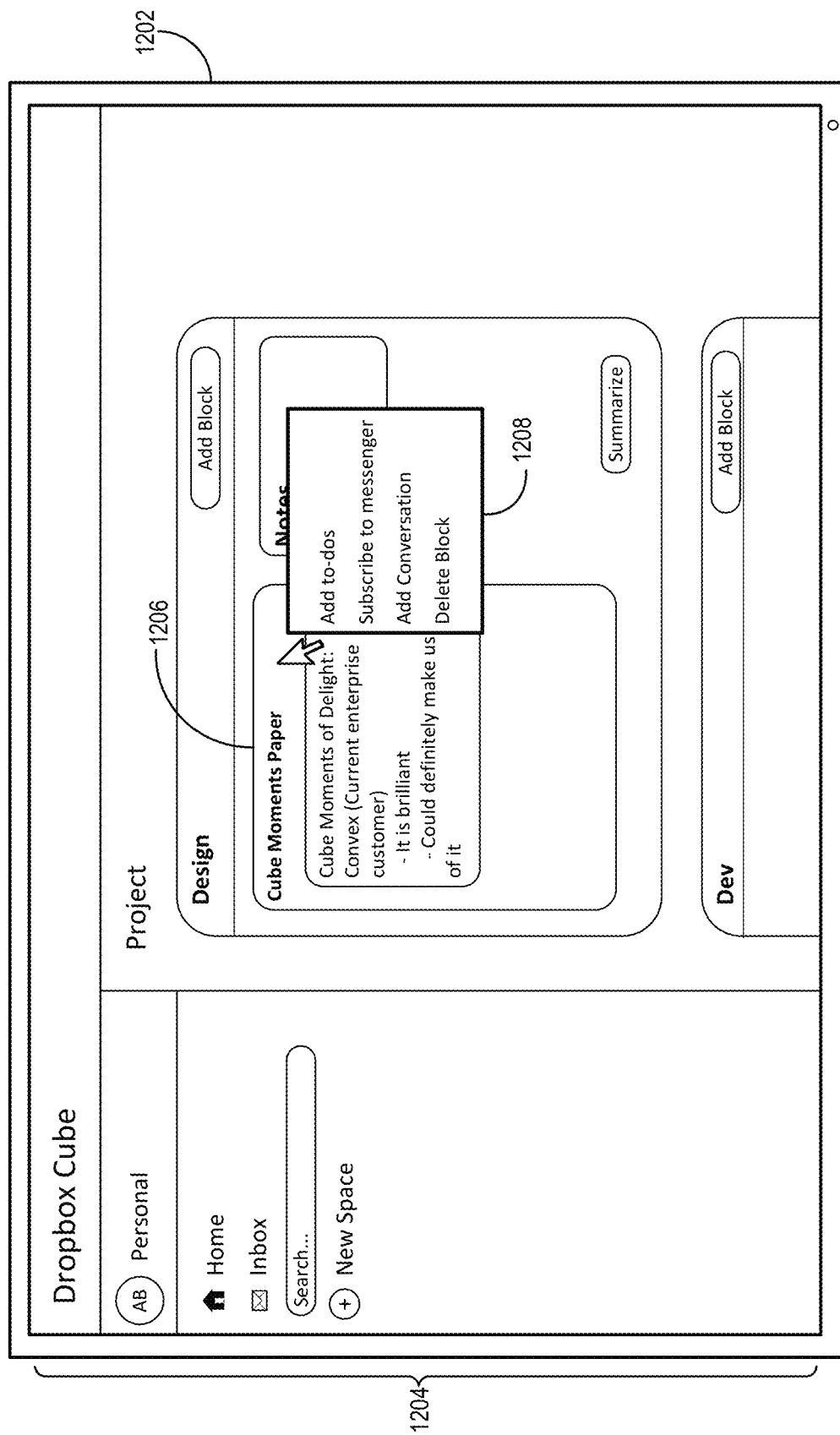
FIGS. 12A-12B illustrate example virtual space interfaces for adding task lists or communication threads to content blocks in accordance with one or more embodiments.
Figure 12B:
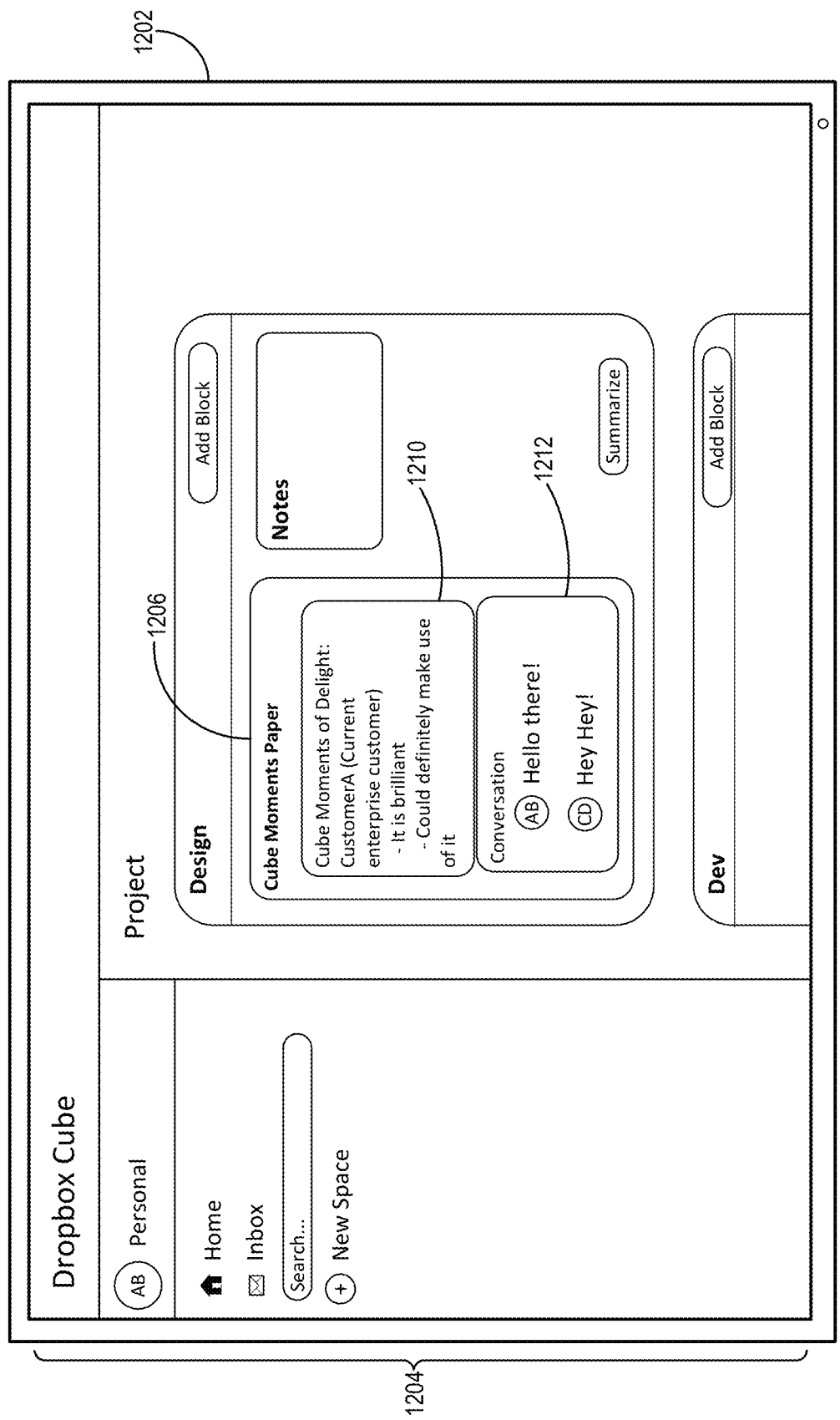

As mentioned above, in certain described embodiments, the content block system 102 can generate task lists and/or communication threads to include within content blocks. In particular, the content block system 102 can modify a content block to not only include a block identifier linked to a source identifier for a content item, but to further link the block identifier to a task list and/or a communication thread (which can be presented as part of the content block). FIGS. 12A-12B illustrate an example block augmentation menu for adding communication threads and/or tasks lists to a content block in accordance with one or more embodiments.

As illustrated in FIG. 12A, the content block system 102 generates and provides a virtual space interface 1204 for display on a client device 1202. In particular, the content block system 102 generates the virtual space interface 1204 to include a content block 1206 and a block augmentation menu 1208. Indeed, within the block augmentation menu 1208, the content block system 102 can provide selectable options or elements for augmenting the content block 1206 (and/or performing other actions). For example, the content block system 102 can provide selectable options to add a task list ("Add to-dos"), subscribe to a particular external application ("Subscribe to messenger"), add a communication thread ("Add Conversation"), and/or delete the content block 1206. Based on receiving an indication of a user interaction selecting an option to add a task list or a communication thread, the content block system 102 can modify the content block 1206 to include the task list or the communication thread.

Indeed, as illustrated in FIG. 12B, the content block system 102 modifies the content block 1206 to include a content item 1210 and to also include a communication thread 1212. To elaborate, based on a user interaction selecting the option to add a communication thread to the content block 1206, the content block system 102 modifies the content block 1206 to include the communication thread 1212. In some cases, the content block system 102 modifies the content block 1206 to include both the content item 1210 referenced by a source identifier and the communication thread 1212 referenced by a thread identifier. The content block system 102 can likewise add a task list to the content block 1206 as well. Thus, the content block system 102 can not only manage communication threads and task lists as native content blocks within a virtual space, but also as components or sub-blocks of content blocks as well.

Figure 13:
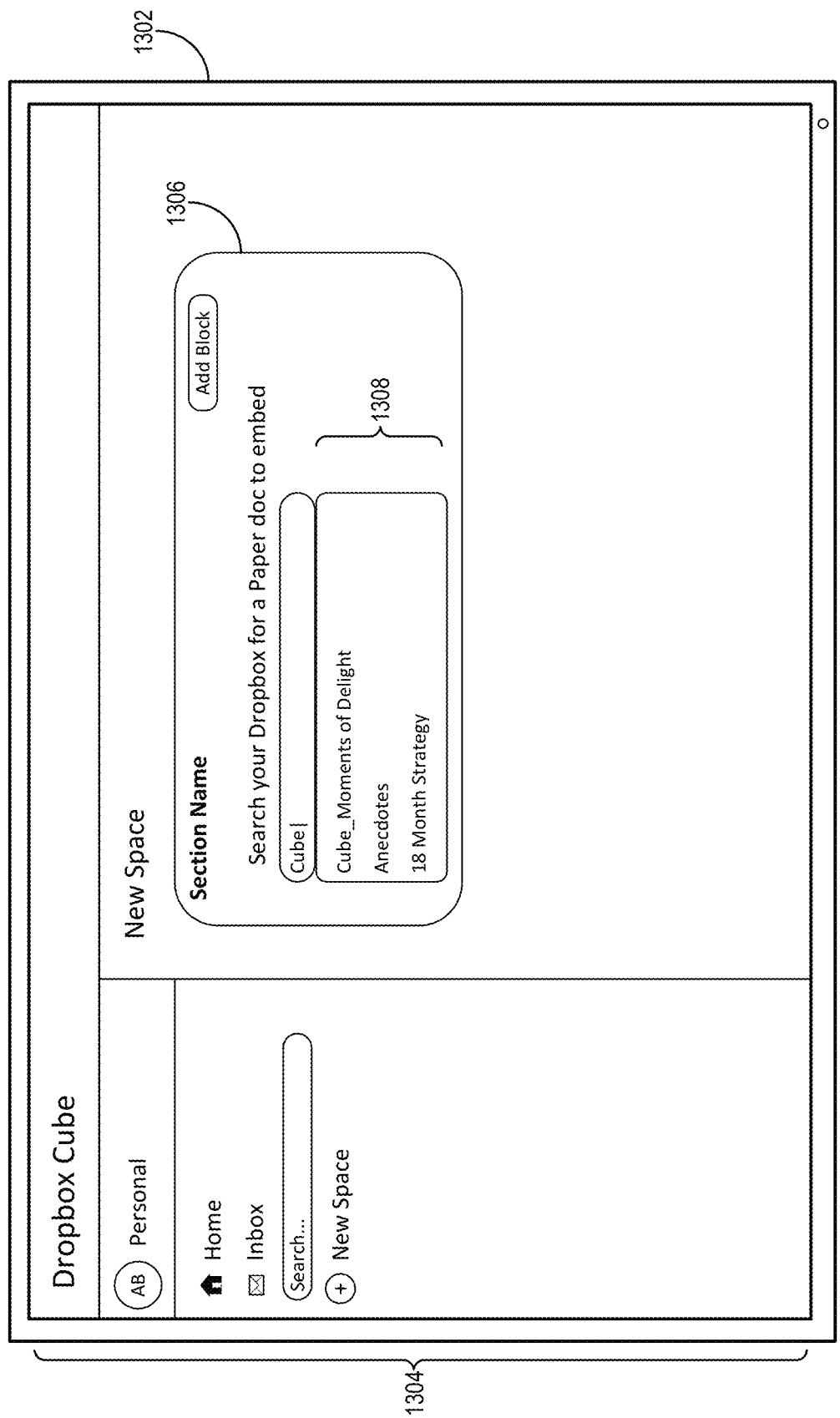
FIG. 13 illustrates an example virtual space interface for a content block search in accordance with one or more embodiments.

In certain described embodiments, the content block system 102 can provide a search function for searching content blocks and/or other content items. In particular, the content block system 102 can index content blocks and content items to embed within content blocks as part of a virtual space interface. FIG. 13 illustrates an example search option as part of a virtual space interface in accordance with one or more embodiments.

As illustrated in FIG. 13, the content block system 102 provides a virtual space interface 1304 for display on a client device 1302. In particular, the content block system 102 provides the virtual space interface 1304 to include a search element for adding a new content block. Indeed, based on a user interaction selecting an option to add a new content block, the content block system 102 can provide a search option for searching content items to embed within the new content block. As shown, the content block system 102 provides the search element within a block section 1306.

Based on receiving a search query (e.g., "Cube"), the content block system 102 identifies content items (e.g., Paper docs or other content items) that correspond to the search query and populates the search results 1308 with identified content items. In response to a selection of a content item from the search results 1308, the content block system 102 generates a source identifier to link to a block identifier of a content block, where the source identifier indicates a server location for the selected content item. In addition, the content block system 102 further determines a block type and accesses an application integration (e.g., a content renderer) based on the block type to render the content item within the content block.

In some embodiments, the content block system 102 further enables searching through content blocks. Indeed, the content block system 102 can provide a block search function within the virtual space interface 1304 (apart from a search function for a content item to include within a new content block) and/or within a space summary interface. For example, the content block system 102 can identify content blocks that correspond to a search query. In some cases, the content block system 102 searches through a single virtual space associated with a user account or multiple virtual spaces associated with a user account to identify content blocks. Accordingly, the content block system 102 can identify content blocks that correspond to a query and can provide access to the content blocks from the search results of the block search.

Figure 14:
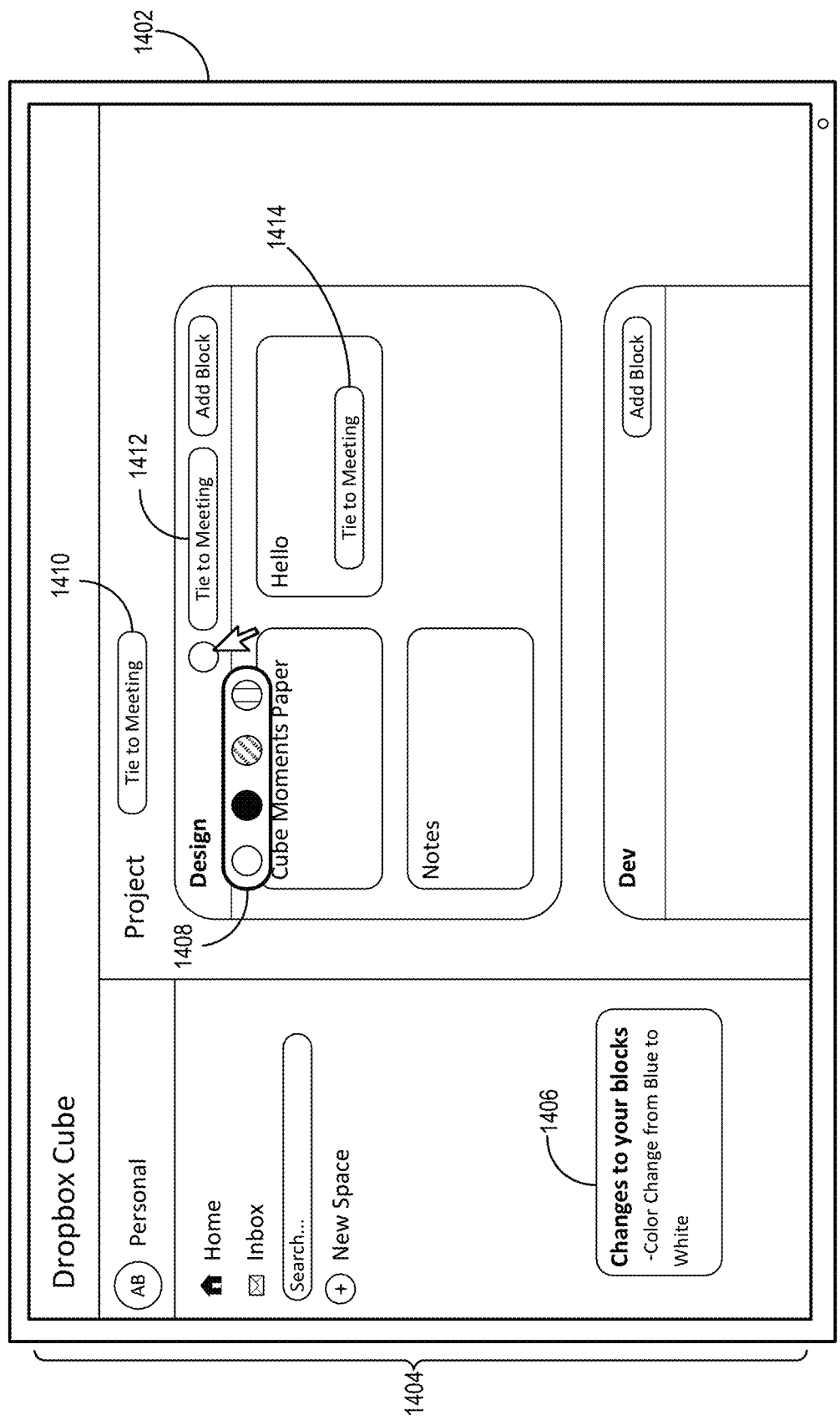
FIG. 14 illustrates an example virtual space interface for modifying visual characteristics of content blocks and tying content blocks to virtual meetings in accordance with one or more embodiments.

As mentioned above, in some embodiments, the content block system 102 can link or tie a content block to a virtual meeting. In particular, the content block system 102 can associate a content block, a block section, and/or an entire virtual space with a virtual meeting such as a video call or an audio call. FIG. 14 illustrates an example virtual space interface for associating a content block, a block section, or a virtual space to a virtual meeting in accordance with one or more embodiments.

As illustrated in FIG. 14, the content block system 102 generates and provides a virtual space interface 1404 for display on a client device 1402. Within the virtual space interface 1404, the content block system 102 can provide a meeting association option 1410 that is selectable to associate the "Project" virtual space with a virtual meeting. Similarly, the content block system 102 can provide a meeting association option 1412 for associating the "Design" block section with a virtual meeting and/or can provide a meeting association option 1414 for associating the "Hello" content block with a virtual meeting. Based on a user interaction selecting the meeting association option 1410, the content block system 102 can provide options for defining a virtual meeting to tie to the virtual space.

Based on associating the virtual space with a virtual meeting, the content block system 102 can generate a selectable option for joining the virtual meeting within the virtual space interface 1404. In some cases, the content block system 102 surfaces the join option upon detecting that the virtual meeting is within a threshold duration of time from beginning. In these or other cases, the content block system 102 generates the join option in the form of a virtual meeting content block with its own block identifier and block type. Based on the block type of a virtual meeting, the content block system 102 can identify an application integration for a corresponding virtual meeting application to integrate virtual meeting functions into the content block.

In some embodiments, the content block system 102 can tie a virtual meeting to a virtual space such that the content block system 102 provides the content blocks within the virtual space (or a subset of the content blocks that are relevant to the virtual meeting) based on detecting the virtual meeting. To elaborate, the content block system 102 can detect initiation of a virtual meeting and can identify content blocks that include digital content relevant to the virtual meeting. For instance, the content block system 102 can determine a topic associated with the virtual meeting (e.g., based on a meeting title and/or from transcripts of previous meetings in the cases with the virtual meeting is a recurring meeting). Indeed, the content block system 102 can detect recurrence of a virtual meeting and can provide content blocks for the virtual meeting for display. For example, the content block system 102 can further determine topics associated with content blocks and can compare the content block topics with the virtual meeting topic (e.g., by determining distances between topic vectors in a vector space) to identify content blocks within a threshold similarity of the virtual meeting topic. In some cases, the content block system 102 can also surface only relevant content blocks (or can rearrange the virtual space interface 1404 to place the relevant blocks above other content blocks).

Along these lines, the content block system 102 can tie a specific block section or a specific content block to a virtual meeting. For example, the content block system 102 can receive a user selection of the meeting association option 1412 to tie the "Design" block section with a virtual meeting. Thus, based on detecting that the virtual meeting is taking place, the content block system 102 can provide the block section for display within the virtual space interface 1404. Similarly, the content block system 102 can tie the "Hello" content block to a virtual meeting based on selection of the meeting association option 1414. The content block system 102 can thus provide the content block for display within the virtual space interface 1404 upon detecting the virtual meeting. In some embodiments, the content block system 102 can automatically tie content blocks with a virtual meeting (e.g., without user interaction with a meeting association option) based on historical user account behavior with the content blocks during previous instances of the virtual meeting.

As also illustrated in FIG. 14, the content block system 102 can modify visual characteristics such as color associated with content blocks, block sections, and/or virtual spaces. For example, the content block system 102 can provide a color palette 1408 for selecting a color (or a shading or some other design) associated with the "Design" block section. Similarly, the content block system 102 can provide a color palette for changing colors of individual content blocks and/or the entire virtual space.

As further illustrated in FIG. 14, the content block system 102 can generate and provide notifications based on detecting changes to content blocks. For example, the content block system 102 can provide the notification 1406 based on detecting that a collaborating user account or a collaborating client device has modified a content block (e.g., "Color Change from Blue to White"). Accordingly, the content block system 102 can provide customized notifications within different virtual space interfaces for different user accounts (even for user accounts accessing the same virtual space on respective devices).

Figure 15:
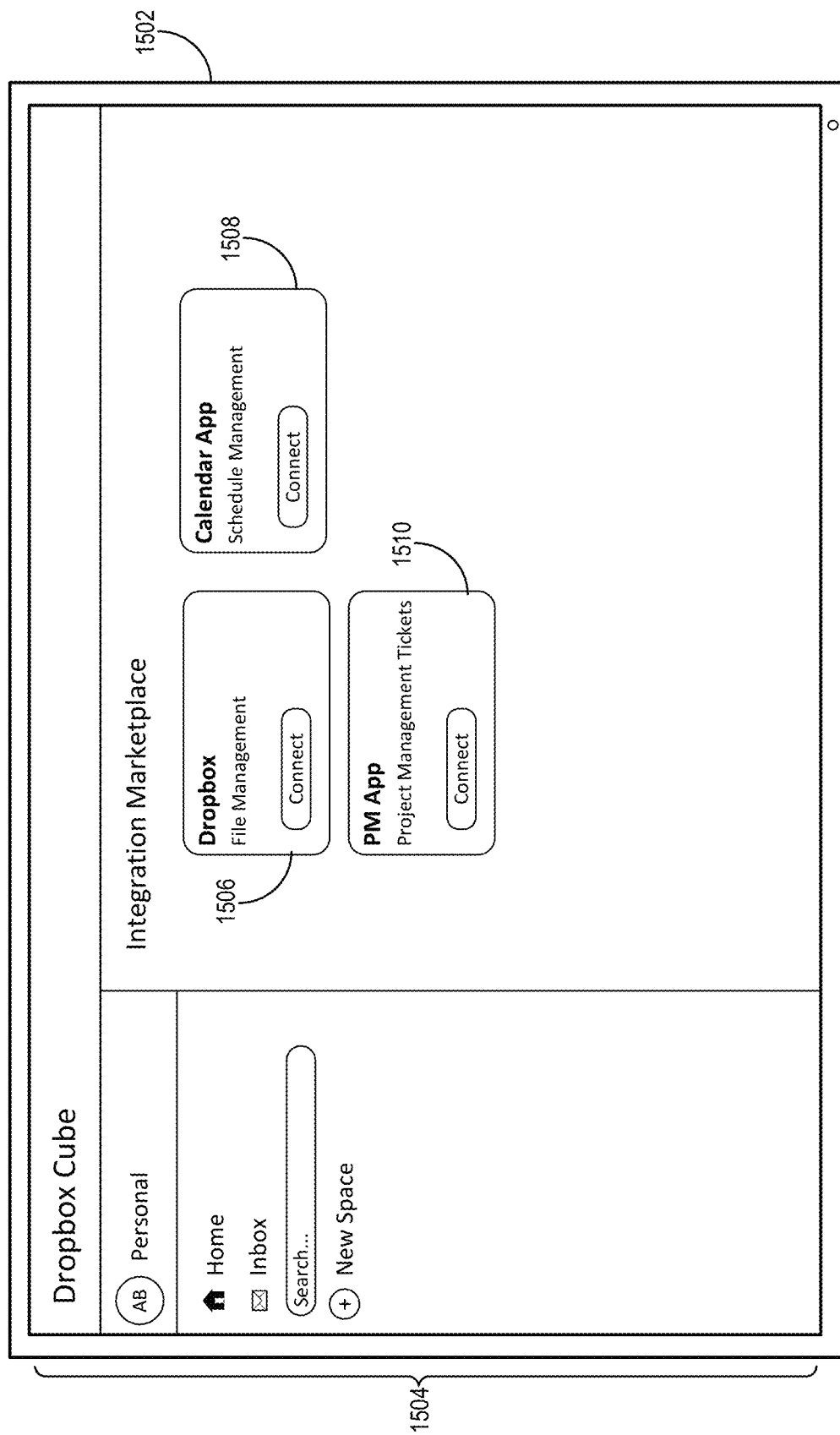
FIG. 15 illustrates an example application integration interface in accordance with one or more embodiments.

As mentioned above, in certain described embodiments, the content block system 102 can utilize application integrations for incorporating functions from external applications to view and interact with content blocks. In particular, the content block system 102 can install application integrations that include application functions for viewing and interacting with content blocks embedding content items associated with external applications. FIG. 15 illustrates an example application integration interface in accordance with one or more embodiments.

As illustrated in FIG. 15, the content block system 102 generates and provides an application integration interface 1504 for display on a client device 1502. Within the application integration interface 1504, the content block system 102 provides integration elements, such as the integration element 1506, the integration element 1508, and the integration element 1510. For instance, the content block system 102 identifies application integrations that are available within an integration marketplace for installation or integration with a virtual space platform.

As shown, the integration element 1506 is selectable to integrate functions of a Dropbox application with a virtual space platform. In addition, the integration element 1508 is selectable to integrate functions of a calendar application with a virtual space platform. Further, the integration element 1510 is selectable to integrate functions of a project management application with a virtual space platform. In some cases, the content block system 102 populates the application integration interface 1504 with integration elements that correspond to (or are referenced by block types of) one or more content blocks associated with a particular virtual space (or multiple virtual spaces) of a user account. In other cases, the content block system 102 populates the application integration interface 1504 with all available application integrations.

Based on receiving a selection to install or connect an application integration, the content block system 102 can enable the corresponding functions (and/or other data) within content blocks of block types tied to the application integration. For example, the content block system 102 can utilize a calendar application integration to incorporate calendar events of a user account and scheduling functions of the calendar application directly within a content block of a virtual space interface. Likewise, for content blocks of other block types, the content block system 102 can incorporate data and functions from external applications into the content blocks using the application integrations. In some cases, the content block system 102 can install application integrations for multiple user accounts (or multiple client devices) in collaboration based on a single request from an administrator account/device of a given virtual space accessible by the multiple accounts/devices. Thus, the content block system 102 enables all client devices with access to the virtual space to view and interact with the content blocks in the same way.

Figure 16:
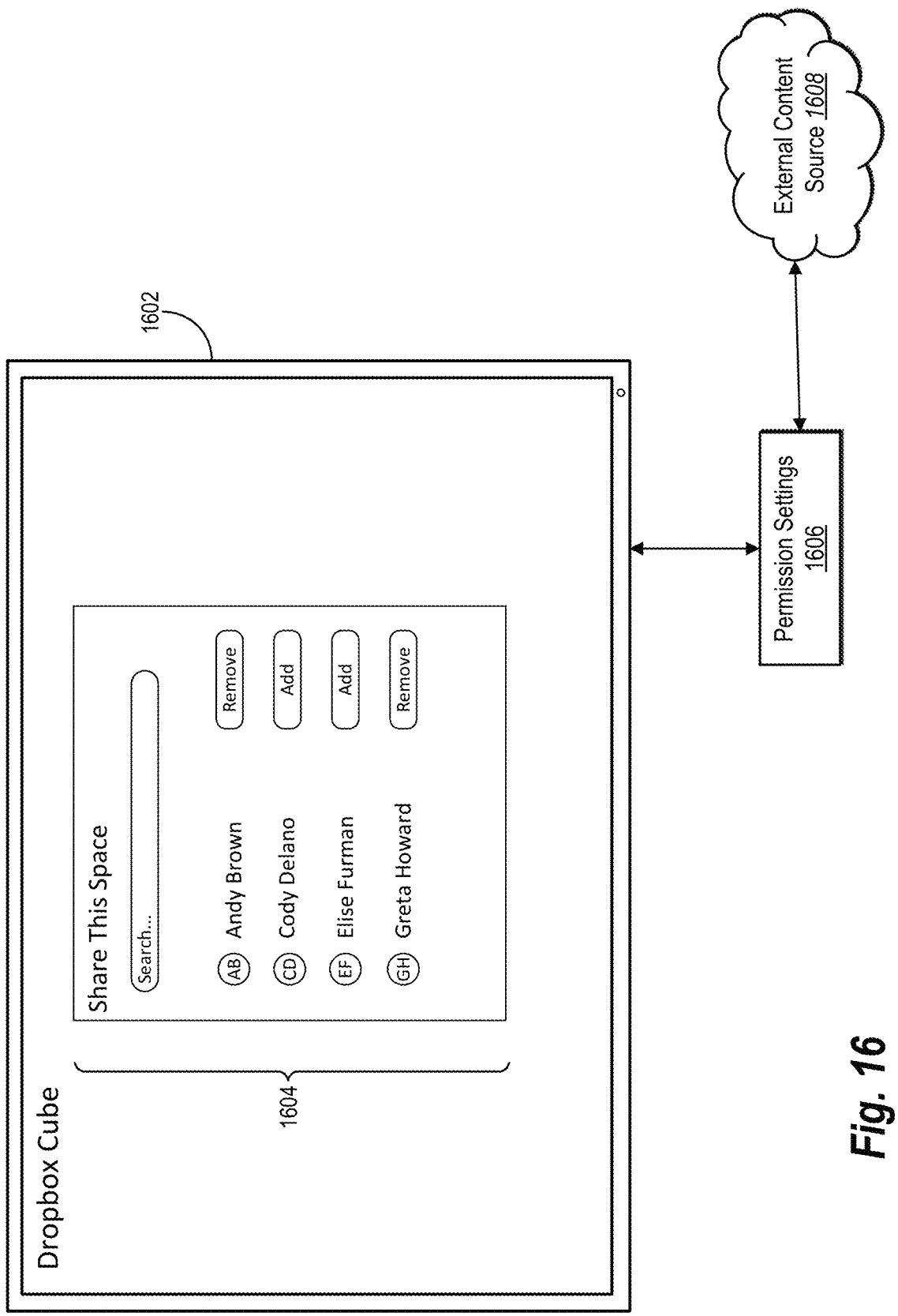
FIG. 16 illustrates an example diagram for modifying permission settings of content blocks in accordance with one or more embodiments.

As mentioned above, in certain embodiments, the content block system 102 can modify or utilize permissions associated with external applications to define privileges of content blocks. In particular, the content block system 102 can apply permission settings from external applications to content blocks, and/or the content block system 102 can modify permission settings of external applications based on permission changes to content blocks. FIG. 16 illustrates an example diagram for modifying or utilizing permission settings associated with an external content source in accordance with one or more embodiments.

As illustrated in FIG. 16, the content block system 102 provides a share option 1604 for display on a client device 1602. More specifically, the content block system 102 generates the share option 1604 to include account identifiers for adding or removing user accounts associated with a virtual space. In addition to adding and removing user accounts, the content block system 102 can further set account-specific settings for viewing permissions, editing permissions, or other levels of permission for interacting with content blocks. In some cases, the content block system 102 can define permission settings on a more granular level, such as determining which user accounts can access and/or interact with particular content blocks or block sections within a virtual space.

In some embodiments, the content block system 102 can apply the permission setting 1606 from the external content source 1608 to a virtual space or a content block. To elaborate, based on detecting that a content block utilizes an application integration for a particular external application, the content block system 102 can access the external application to determine the permission settings 1606 for a content item incorporated within the content block. Accordingly, the content block system 102 can apply the permission settings 1606 set by an external application to a content block within a virtual space to allow and/or prevent various interactions with the content block, such as views, modifications, shares, or other actions. Indeed, the permission settings 1606 can define account-specific permissions for user accounts with access to a virtual space at a content-block level, at a block-section level, and/or at a virtual-space level. Even for cases where the content block does not use an application integration, the content block system 102 can determine the permission settings 1606 from the external content source 1608 (e.g., a server location) hosting a content item presented within the content block.

In one or more embodiments, the content block system 102 can modify the permission settings 1606 based on interactions within a virtual space interface. For example, based on an interaction with the share option 1604 to add or remove a user account (and/or to change specific interaction settings) in relation to a content block, a block section, and/or a virtual space, the content block system 102 can update the permission settings 1606. In addition, the content block system 102 can provide or propagate the update to the permission settings 1606 to cause the external content source 1608 (e.g., a server location or an external application) to apply the update to the permission settings 1606. Thus, the content block system 102 can modify the permission settings 1606 for the external content source 1608 from interactions within a virtual space interface.

Figure 17:
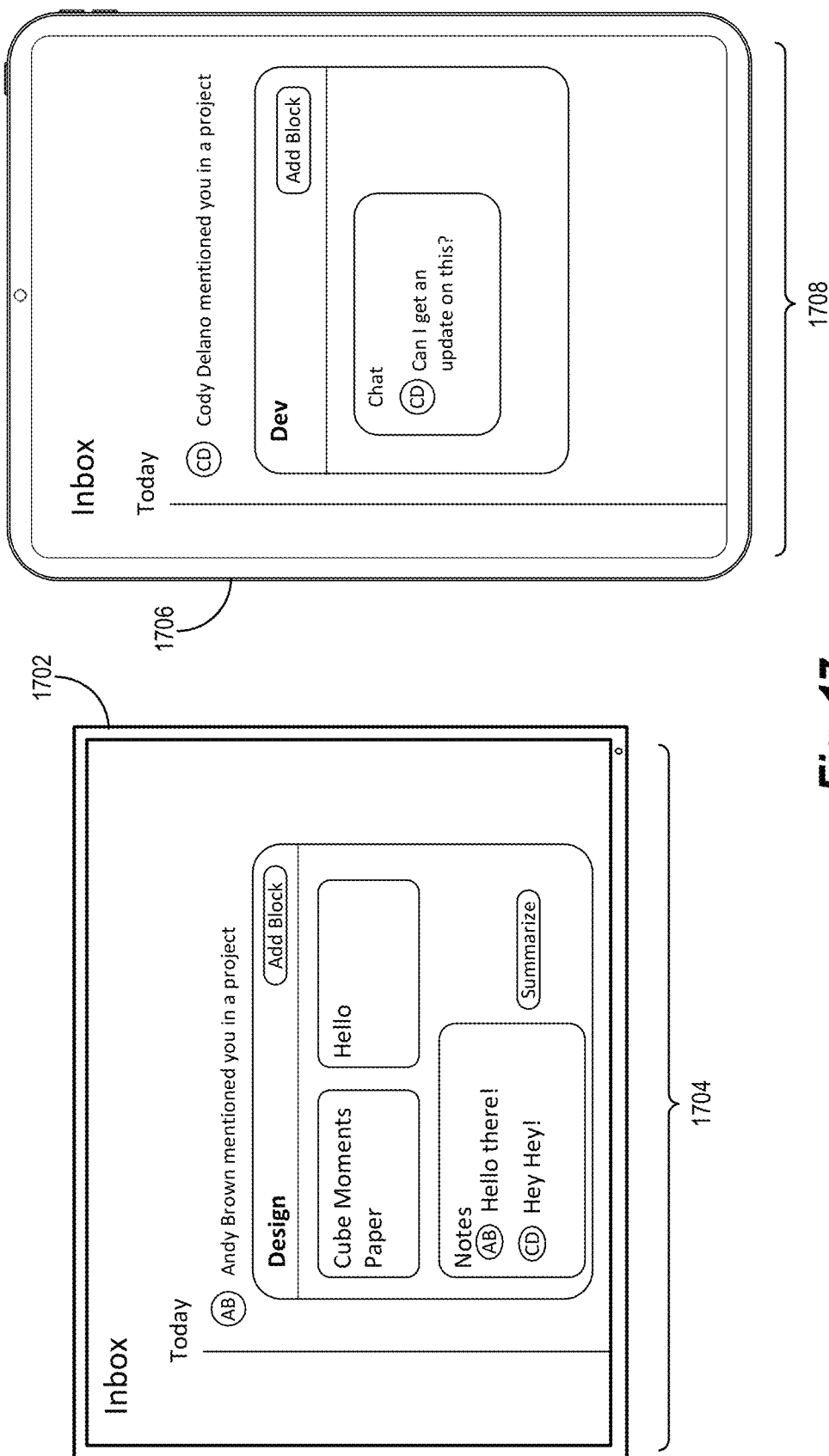
FIG. 17 illustrates an example comparison of space summary interfaces in accordance with one or more embodiments.

As mentioned above, in certain described embodiments, the content block system 102 generates and provides a space summary interface that is tailored or customized on an account-specific basis. In particular, the content block system 102 can generate a first space summary interface that includes content updates relevant to a first user account and can generate a second space summary interface that includes content updates relevant to a second user account. FIG. 17 illustrates an example depiction of different space summary interfaces for different devices (or different user accounts) in accordance with one or more embodiments.

As illustrated in FIG. 17, the content block system 102 generates and provides a space summary interface 1704 for display on a client device 1702. Indeed, the content block system 102 generates the space summary interface 1704 to summarize multiple virtual spaces by providing quick updates on relevant content in a hub for accessing the multiple virtual spaces. The content block system 102 can generate the space summary interface 1704 to include notifications, virtual spaces, and/or content blocks relevant to a user account of the client device 1702. For example, the content block system 102 determines relevant content blocks and/or virtual spaces for the user account based on historical behavior (e.g., views, clicks, modifications, scrolls, shares, receipts, and/or interaction times) with the content blocks and/or virtual spaces. The content block system 102 further customizes the space summary interface 1704 to include content blocks (from different virtual spaces) and/or notifications of content updates within content blocks based on the historical behavior.

As further illustrated in FIG. 17, the content block system 102 generates and provides a space summary interface 1706 for display on a client device 1708. More specifically, the content block system 102 generates the space summary interface 1706 to include content blocks and/or virtual spaces relevant to a user account of the client device 1708. Indeed, as shown, the content block system 102 determines different content blocks as relevant to the user account of the client device 1708 than those relevant to the user account of the client device 1702. Accordingly, the content block system 102 generates the space summary interface 1706 to include different content blocks (or block sections) and notifications, even for user accounts with access to the same virtual space(s). For instance, the content block system 102 can provide a first content block from a virtual space within the space summary interface 1704 and can provide a second content block from the same virtual space within the space summary interface 1706 based on historical interactions indicating content block relevance. In some cases, the content block system 102 can generate block summaries (or multi-block summaries or space summaries) to include within a space summary interface, where the block summaries are account-specific for the relevant content blocks.

FIGS. 8-17, the corresponding text, and the examples provide a number of different systems and methods for generating and maintaining virtual spaces in accordance with one or more embodiments. In addition to the foregoing, implementations can also be described in terms of flowcharts comprising acts steps in a method for accomplishing a particular result. For example, FIG. 18 illustrates an example series of acts for generating block summaries from content blocks of a virtual space interface in accordance with one or more embodiments.

Figure 18:
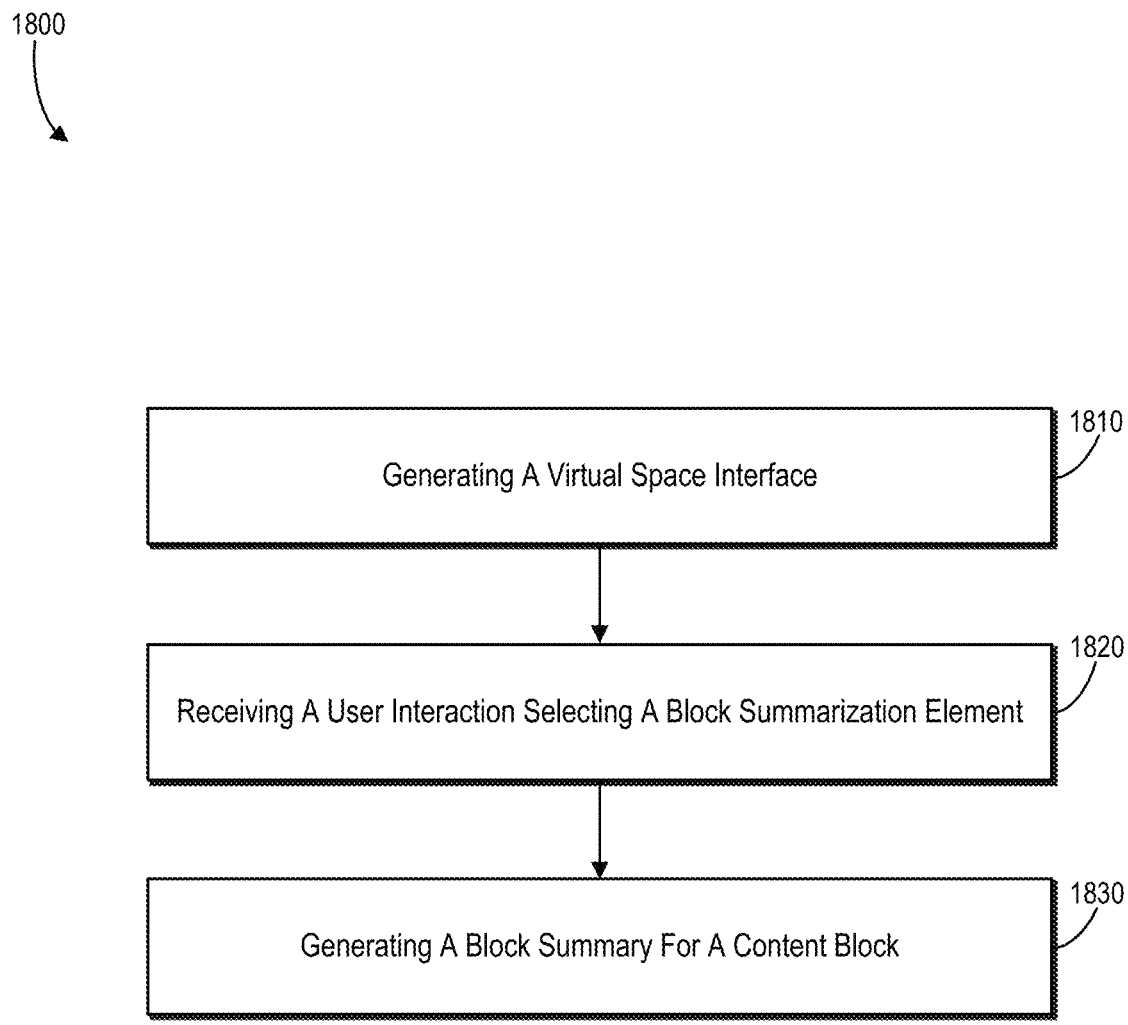
FIG. 18 illustrates an example flowchart of a series of acts for generating a block summary for a content block in accordance with one or more embodiments.

While FIG. 18 illustrates acts according to certain implementations, alternative implementations may omit, add to, reorder, and/or modify any of the acts shown in FIG. 18. The acts of FIG. 18 can be performed as part of a method. Alternatively, a non-transitory computer readable medium can comprise instructions, that when executed by one or more processors, cause a computing device to perform the acts of FIG. 18. In still further implementations, a system can perform the acts of FIG. 18.

As illustrated in FIG. 18, the series of acts 1800 may include an act 1810 generating a virtual space interface. For example, the act 1810 can involve generating, for display on a client device, a virtual space interface comprising a content block and a block summarization element, wherein the content block comprises a modifiable sub-window for presenting and modifying digital content (e.g., a content item hosted at a server location). As also shown, the series of acts 1800 can include an act 1820 of receiving a user interaction selecting a block summarization element. For example, the act 1820 can involve receiving an indication of a user interaction selecting the block summarization element within the virtual space interface. Further, the series of acts 1800 can include an act 1830 of generating a block summary for a content block. For example, the act 1830 can involve, based on the user interaction selecting the block summarization element, generating, using a block summarization neural network, a block summary from the digital content (e.g., the content item) of the content block (e.g., digital content embedded within the content block from a server location).

In some embodiments, the series of acts 1800 includes an act of generating the block summary by utilizing a large language model to summarize the digital content of the content block. In these or other embodiments, the series of acts 1800 includes an act of providing the content block for display within the virtual space interface to present the digital content embedded into the content block from an external server location. Further, the series of acts 1800 can include an act of modifying the content block to replace presentation of the digital content embedded from the external server location with the block summary generated in response to the user interaction selecting the block summarization element.

In one or more embodiments, the series of acts 1800 includes an act of generating a multi-block summary from digital content of a plurality of content blocks displayed within the virtual space interface by accessing and summarizing the digital content embedded from respective server locations. In addition, the series of acts 1800 can include an act of providing the multi-block summary for display on the client device.

In certain cases, the series of acts 1800 includes acts of identifying a communication thread associated with the content block, generating a thread summary for the communication thread, and providing the thread summary for display within the content block. Further, the series of acts 1800 can include acts of determining user interactions with content items for a user account associated with the client device, generating, for the user account utilizing a block suggestion machine learning model a block suggestion based on the user interactions of the user account, and providing the block suggestion as a selectable interface element for display within the virtual space interface.

In some embodiments, the series of acts 1800 includes an act of generating, for display on the client device, a space summary interface comprising a user-account-specific summary of digital content displayed within a plurality of content blocks included within the virtual space interface. In some cases, the series of acts 1800 includes an act of generating, for display on a different client device, an additional space summary interface comprising a different user-account-specific summary of the digital content displayed within the plurality of content blocks included within the virtual space interface.

In some cases, the series of acts 1800 includes an act of generating the block summary customized based on user interactions of a user account associated with the client device and an act of generating an additional block summary from the digital content of the content block, the additional block summary customized based on user interactions of a different user account. Additionally, the series of acts 1800 can include an act of determining user interactions with content items for a user account associated with the client device and an act of generating, based on the user interactions of the user account, a content update notification indicating one or more updates to digital content associated with content blocks displayed within the virtual space interface.

In one or more embodiments, the series of acts 1800 includes an act of determining permission settings set at an external content source for the digital content of the content block and an act of applying the permission settings from the external content source to the content block within the virtual space interface. In the same or other embodiments, the series of acts 1800 includes acts of receiving, from the client device, an indication of a user interaction modifying permission settings associated with the content block within the virtual space interface and, based on the user interaction modifying the permission settings for the content block, providing updated permission settings to an external content source hosting the digital content embedded within the content block.

In some embodiments, the series of acts 1800 includes an act of generating a block suggestion for display within the virtual space interface by identifying an open browser tab within a browser running on the client device as well as an act of receiving an indication of a user interaction to add an additional content block to the virtual space interface from the block suggestion, and an act of based on the user interaction to add the additional content block and an act of generating an additional block summary from digital content within the open browser tab for display within the additional content block. Further, the series of acts 1800 can include acts of receiving, from the client device, an indication of a user interaction to set permission settings for the content block within the virtual space interface, receiving, from the client device, an indication of an additional user interaction to set permission settings for an additional content block within the virtual space interface, and based on the user interaction and the additional user interaction, applying different permission settings for the content block and the additional content block.

In some embodiments, the series of acts 1800 includes an act of providing the block summary for display within the content block to replace the digital content within the content block. Further, the series of acts 1800 can include an act of associating the virtual space interface with a virtual meeting and an act of, based on detecting recurrence of the virtual meeting, providing a space element for display on the client device, wherein the space element is selectable to access the virtual space interface including content blocks manipulated during the virtual meeting.

In certain embodiments, the series of acts 1800 includes an act of receiving, from the client device, an indication of a user interaction selecting a block suggestion within the virtual space interface and an act of, in response to the indication of the user interaction selecting the block suggestion, identifying an application integration associated with the block suggestion and integrated for rendering block content within the virtual space interface. Further, the series of acts 1800 can include acts of accessing, utilizing the application integration, digital content from an external server location indicated by the block suggestion for embedding within a new content block and generate the new content block by embedding the digital content from the external server location for display within the new content block. The series of acts 1800 can also include an act of generating a new block summary for the digital content embedded within the new content block from the external server location.

Virtual Space Platform for a Content Block Browser

Figure 19:
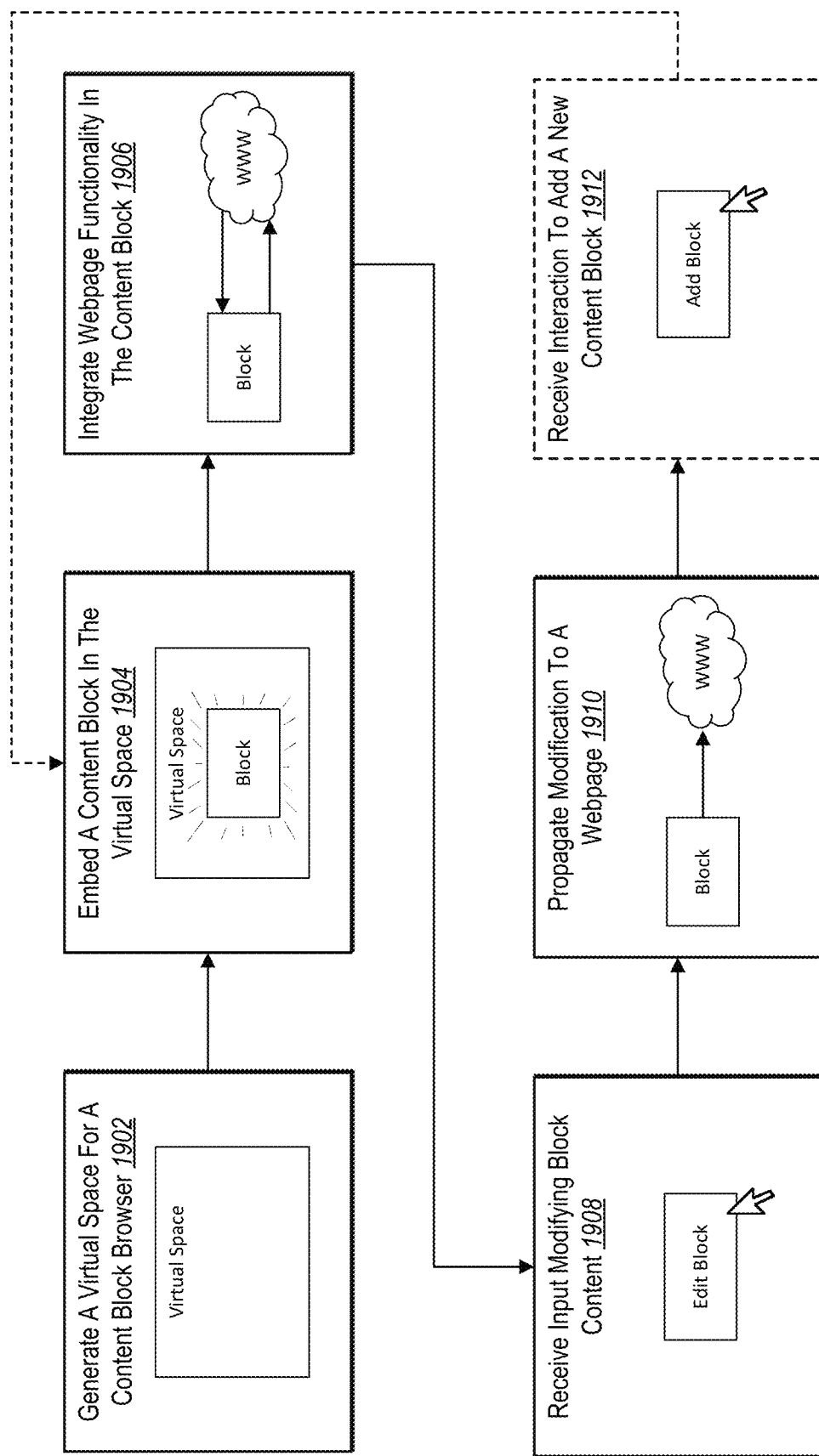
FIG. 19 illustrates an example overview of generating and managing a virtual space interface for a content block browser in accordance with one or more embodiments.

As mentioned above, in certain described embodiments, the content block system 102 can generate and provide a content block browser for integrating functionality of webpages within content blocks with a virtual space. In particular, the content block system 102 can utilize the virtual space platform as a web browser where each content block includes content and functions of a webpage. FIG. 19 illustrates an example overview for generating and providing a content-block-based web browser via a virtual space in accordance with one or more embodiments. Additional detail regarding the various acts of FIG. 19 is provided thereafter with reference to subsequent figures.

As illustrated in FIG. 19, the content block system 102 can perform an act 1902 to generate a virtual space for a content block browser. In particular, the content block system 102 can generate a virtual space that acts as a web browser by integrating webpage functionality into content blocks. For example, the content block system 102 can identify or access an application integration of a web browser application to install in, or integrate with, the virtual space platform. In some cases, the content block system 102 can thus generate a virtual space to behave like an instance of a web browser for accessing and interacting with content items across the internet and/or stored within the content management system 106.

As further illustrated in FIG. 19, the content block system 102 performs an act 1904 of embed a content block in the virtual space. To elaborate, the content block system 102 can embed a content block as described above. Indeed, the content block system 102 can generate a content block that includes (or is defined by) a block identifier tied to a source identifier that references a webpage. In some cases, the content block system 102 can further determine a block type for the content block as a web browser block based on the source identifier referencing a webpage.

In addition, the content block system 102 performs an act 1906 to integrate webpage functionality in the content block. More specifically, based on determining that the source identifier of the content block references a webpage (and/or based on determining that the content block is a web browser block), the content block system 102 can integrate webpage functionality into the content block. For example, the content block system 102 can utilize an installed application integration to facilitate webpage functions, such as navigational inputs via links, buttons, and search bars, as well as content modification functions, content creation functions, content sharing functions, and/or other functions available on various webpages. In some cases, the content block system 102 utilizes an installed application integration for a web browser to incorporate such functionality within a content block.

As also illustrated in FIG. 19, the content block system 102 performs an act 1908 to receive input modifying block content. In particular, the content block system 102 can receive an indication of a user interaction modifying webpage content depicted within a content block. For example, the content block system 102 receives an input to modify a spreadsheet, an image, a video, or some other content item from a webpage hosted at a server location. Indeed, the content block system 102 receives the modification input within the content block depicting the webpage, and the content block system 102 can render the modification within the content block as well.

As further shown, the content block system 102 performs an act 1910 to propagate a modification to a webpage. To elaborate, the content block system 102 applies the content block modification to the webpage. For example, in response to detecting a modification to webpage content depicted in the content block, the content block system 102 can generate computer code encoding the modification and can provide the computer code to a web server hosting the webpage, whereupon the web server executes the computer code to apply the modification to the webpage. Thus, the content block system 102 can cause a webpage server location to modify webpage content by propagating a modification made to a content block within a virtual space interface (e.g., a virtual space interface acting as a content block web browser).

Additionally, the content block system 102 performs an act 1912 to receive an interaction to add a new content block. For example, in some embodiments, the content block system 102 can receive an indication of a user interaction to add a new content block. Specifically, the content block system 102 can add a new content block to a virtual space (and a virtual space interface). In some cases, the content block system 102 adds a new content block to integrate webpage content and webpage functionality for a different webpage within a content block browser. As shown, the content block system 102 can further repeat one or more acts illustrated in FIG. 19 to embed the new content block, integrate the webpage functionality, receive a modification input, and modify the webpage for the new content block.

Figure 20:
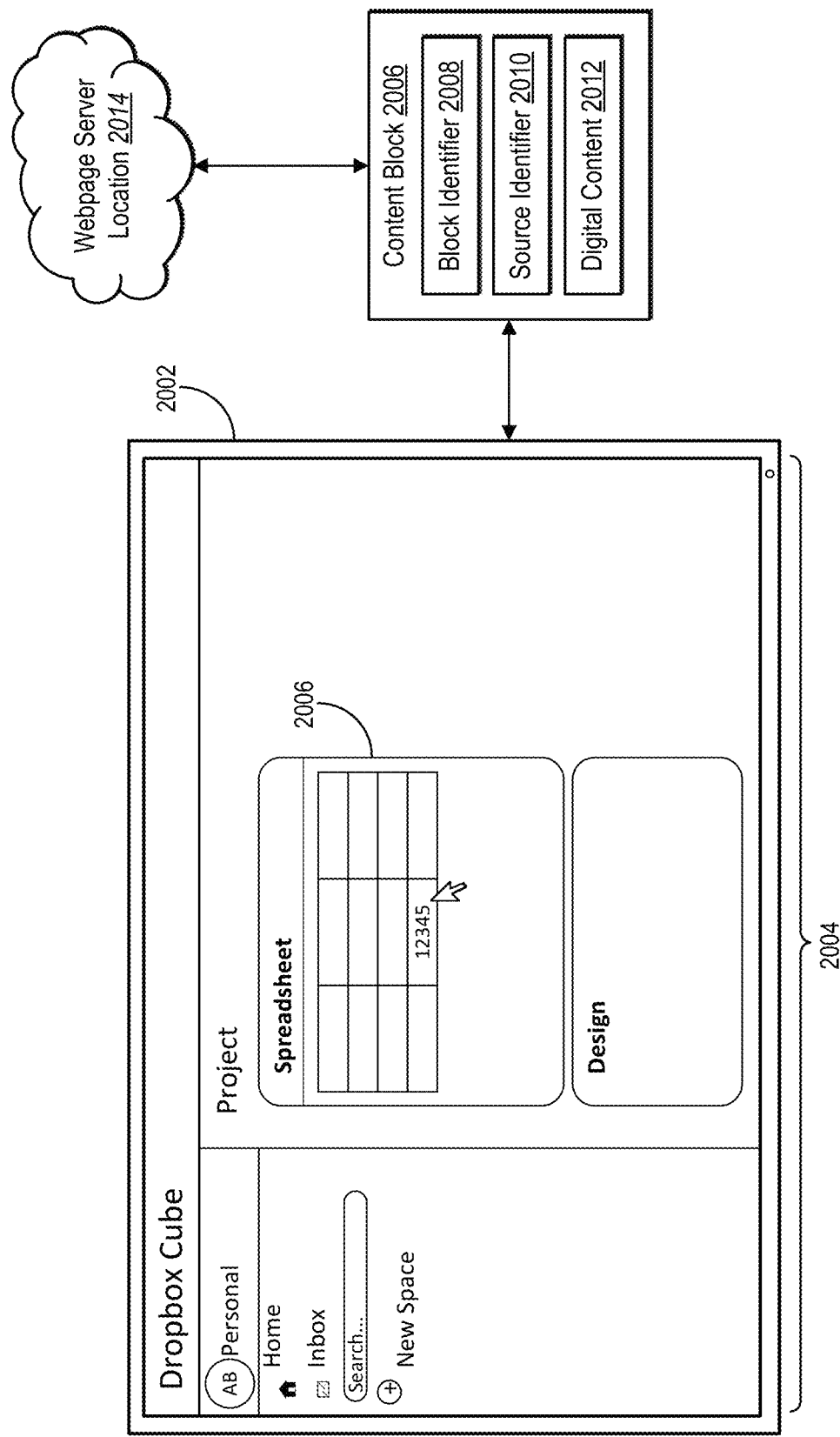
FIG. 20 illustrates an example diagram for modifying a webpage at a server location based on changes to a content block in accordance with one or more embodiments.

As just mentioned, the content block system 102 can generate a virtual space interface as an instance of a content-block-based web browser. In some cases, the content block system 102 can generate a hybrid virtual space interface to include content blocks for webpages and content blocks for non-webpage content items. FIG. 20 illustrates an example diagram for a hybrid virtual space interface that includes a webpage content block for modifying webpage content in accordance with one or more embodiments.

As illustrated in FIG. 20, the content block system 102 generates and provides a virtual space interface 2004 for display on a client device 2002. In particular, the content block system 102 generates the virtual space interface 2004 as a hybrid virtual space interface that includes a webpage content block 2006 for integrating and a non-webpage content block ("Design") for a content item other than a webpage. As shown, the content block system 102 generates the webpage content block 2006 for a web-based spreadsheet hosted at a webpage server location 2014. In some cases, a webpage content block refers to a content block that integrates functions and/or content from a web browser and that provides the added functions of content blocks within a virtual space. Conversely, a non-webpage content block can refer to a content block that incorporates content and/or functions from a different source, such as a private URL (e.g., a URL not for a publicly accessible webpage) for a content item stored for a user account within the content management system 106.

To integrate the webpage content block 2006, the content block system 102 generates a block identifier 2008 and a source identifier 2010. In particular, the content block system 102 generates the block identifier 2008 to indicate or define the webpage content block 2006, where the block identifier 2008 is transmittable to the client device 2002 (and to other client devices) for embedding the webpage content block 2006. In addition, the content block system 102 ties the block identifier 2008 to the source identifier 2010 which references the webpage server location 2014. Indeed, the content block system 102 integrates the digital content 2012 (e.g., the spreadsheet) and corresponding webpage functionality (e.g., functions for interacting with the spreadsheet and navigating between webpages) from the webpage server location 2014 by using the source identifier 2010. In some cases, the content block system 102 integrates the webpage functionality by accessing an application integration for an external web browser application (corresponding to the web browser block type of the webpage content block 2006) installed in the virtual space platform.

As further illustrated in FIG. 20, the content block system 102 can receive a user interaction to modify the webpage content block 2006. Specifically, the content block system 102 receives a user input for entering a string of characters ("12345") into a field of the spreadsheet shown in the webpage content block 2006. Based on the user input, the content block system 102 can propagate the modification of the webpage content block 2006 to the webpage hosted at the webpage server location 2014. Specifically, the content block system 102 can generate computer code for the modification to alter the digital content 2012. The content block system 102 can also provide the computer code to the webpage server location 2014. In turn, the webpage server location 2014 updates the webpage of the spreadsheet as stored and hosted at the webpage server location 2014 by executing the computer code.

As mentioned, the content block system 102 can integrate other webpage functionality (beyond interacting with and modifying webpage content), such as navigating between webpages. Based on receiving an interaction within the webpage content block 2006 to navigate away from the spreadsheet webpage and to access another webpage, the content block system 102 can update the webpage content block 2006 to display a new webpage accordingly. To elaborate, the content block system 102 can modify the webpage content block 2006 by generating a new source identifier to reference a server location hosting the new webpage and by updating the block identifier 2008 to tie to the new source identifier.

Figure 21:
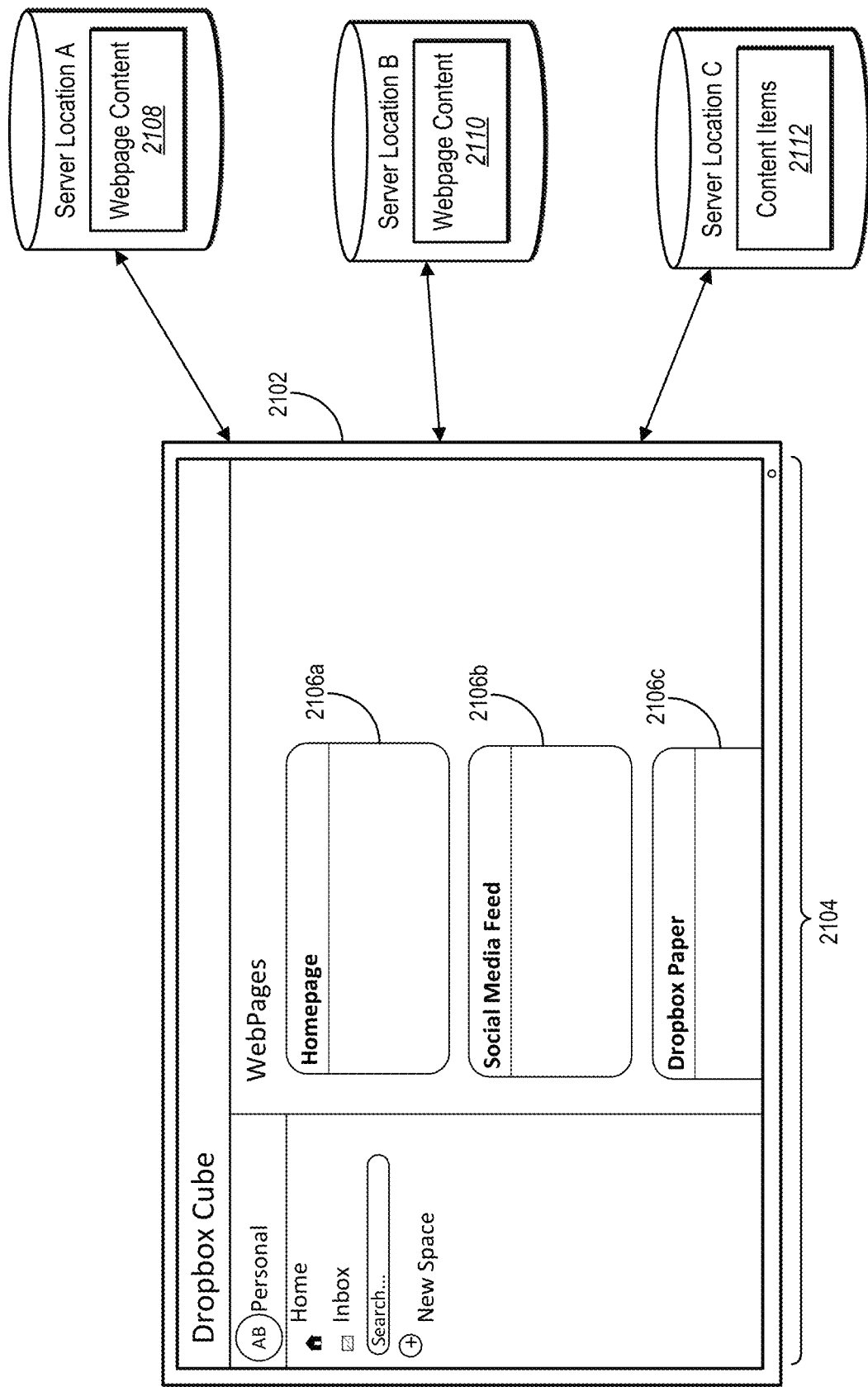
FIG. 21 illustrates an example diagram for embedding content items from different server locations into respective content blocks in accordance with one or more embodiments.

As mentioned above, in certain described embodiments, the content block system 102 generates a virtual space interface for a content-block-based web browser. In particular, the content block system 102 can generate a virtual space interface to include multiple webpage content blocks, each incorporating webpage content for different webpages hosted at different server locations. FIG. 21 illustrates an example diagram for embedding webpage content from different webpages into different webpage content blocks in accordance with one or more embodiments.

As illustrated in FIG. 21, the content block system 102 generates a virtual space interface 2104 for display on a client device 2102. In particular, the content block system 102 generates the virtual space interface 2104 to include webpage content blocks, including webpage content block 2106a, webpage content block 2106b, and to include a non-webpage content block 2106c. The content block system 102 further incorporates different webpage content and corresponding webpage functionality for each of the respective webpage content blocks. Indeed, as described above, the content block system 102 ties block identifiers for the webpage content blocks (and non-webpage content blocks) to server locations hosting the respective webpages.

To elaborate, the content block system 102 ties a block identifier for the webpage content block 2106a to a source identifier referencing Server Location A. Accordingly, the content block system 102 incorporates the webpage content 2108 into the webpage content block 2106a to display a "Homepage" webpage. In addition, the content block system 102 integrates webpage functionality of the Homepage webpage from Server Location A.

Within the same virtual space interface 2104, the content block system 102 further incorporates the webpage content 2110 into the webpage content block 2106b by tying a corresponding block identifier to Server Location B. Likewise, the content block system 102 also incorporates the content items 2112 (e.g., content items stored for a user account within the content management system 106) into the content block 2106c by tying a corresponding block identifier to Server Location C. Further, the content block system 102 can integrate webpage functionality from server locations into the webpage content blocks and can integrate other application functionality into non-webpage content blocks.

Figure 22:
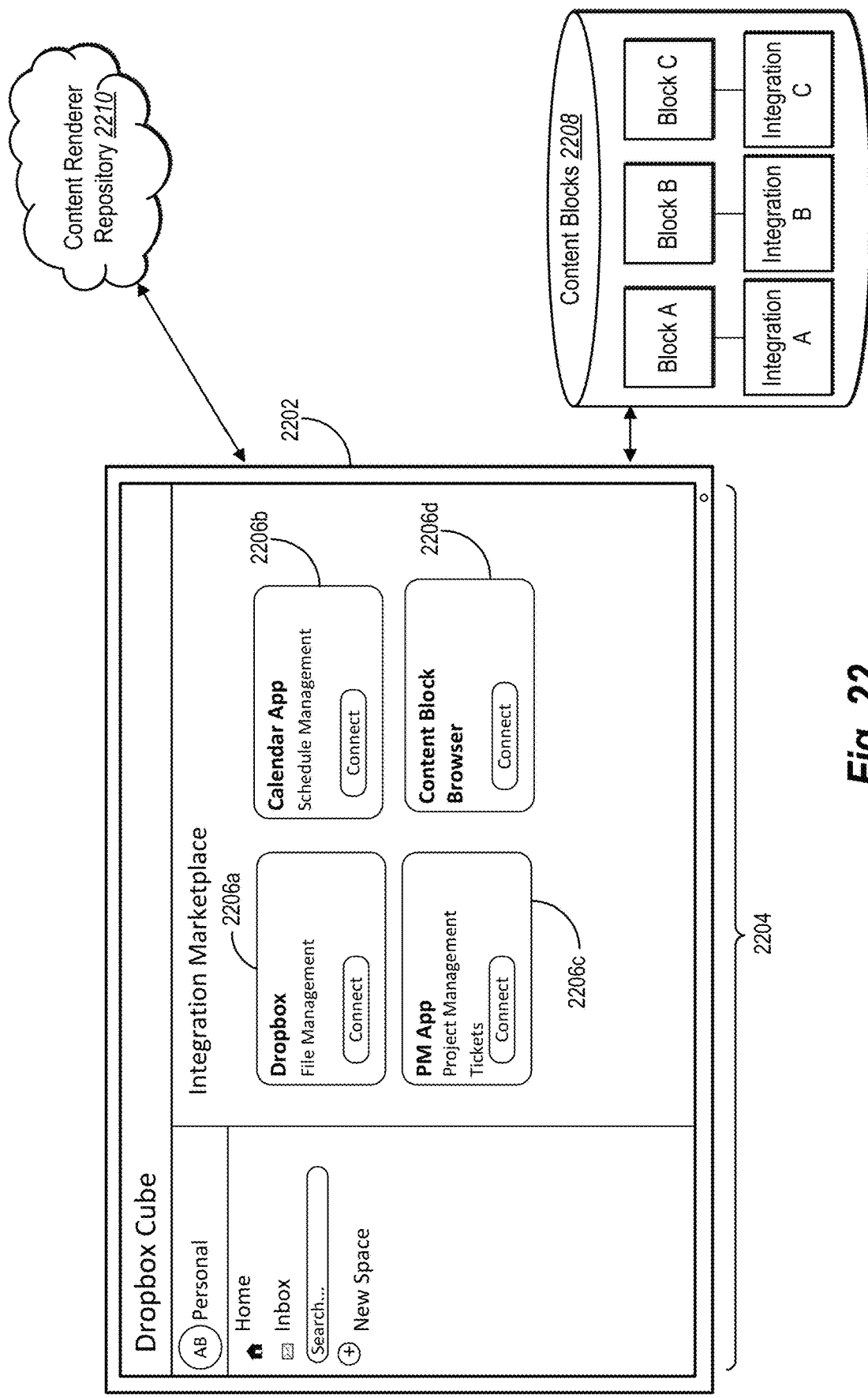
FIG. 22 illustrates an example diagram for determining application integrations and content renderers for content blocks in accordance with one or more embodiments.

As mentioned above, in certain described embodiments, the content block system 102 can integrate webpage functionality into webpage content blocks by utilizing application integrations. In particular, the content block system 102 can identify a web browser application integration that includes webpage functionality for interacting with webpage content and navigating between webpages using content blocks. FIG. 22 illustrates an example diagram for using application integrations for webpage content blocks and non-webpage content blocks (e.g., for a hybrid virtual space interface) in accordance with one or more embodiments.

As illustrated in FIG. 22, the content block system 102 generates an application integration interface 2204 for display on a client device 2202. In particular, the content block system 102 generates the application integration interface 2204 to include available application integrations to connect with, or install within, a virtual space platform. As shown, the application integration interface 2204 includes various integration elements corresponding to respective application integrations. For example, the application integration interface 2204 includes an integration element 2206a for integrating with a Dropbox application, an integration element 2206b for integrating with a calendar application, an integration element 2206c for integrating with a project management application, and an integration element 2206c for integrating with a web browser application ("Content Block Browser").

In some embodiments, the content block system 102 integrates webpage functionality for one or more webpage content blocks by using an application integration corresponding to integration element 2206d. In addition, the content block system 102 can embed content blocks 2208 for non-webpage content. For instance, the content block system 102 can integrate including content items within the content management system 106 by utilizing Integration A for Block A corresponding to the integration element 2206a. Likewise, the content block system 102 can integrate a digital calendar in Block B by utilizing Integration B corresponding to integration element 2206b. Further, the content block system 102 can integrate a project management content item into Block C by utilizing Integration C corresponding to the integration element 2206c.

As part of utilizing the application integrations for the respective content items, the content block system 102 can access the content renderer repository 2210 to render content items within content blocks, including webpage content and other digital content. Indeed, the content block system 102 can access content renderers corresponding to block types and/or application integrations associated with content blocks. Accordingly, the content block system 102 can render content items within content blocks as described herein.

Figure 23:
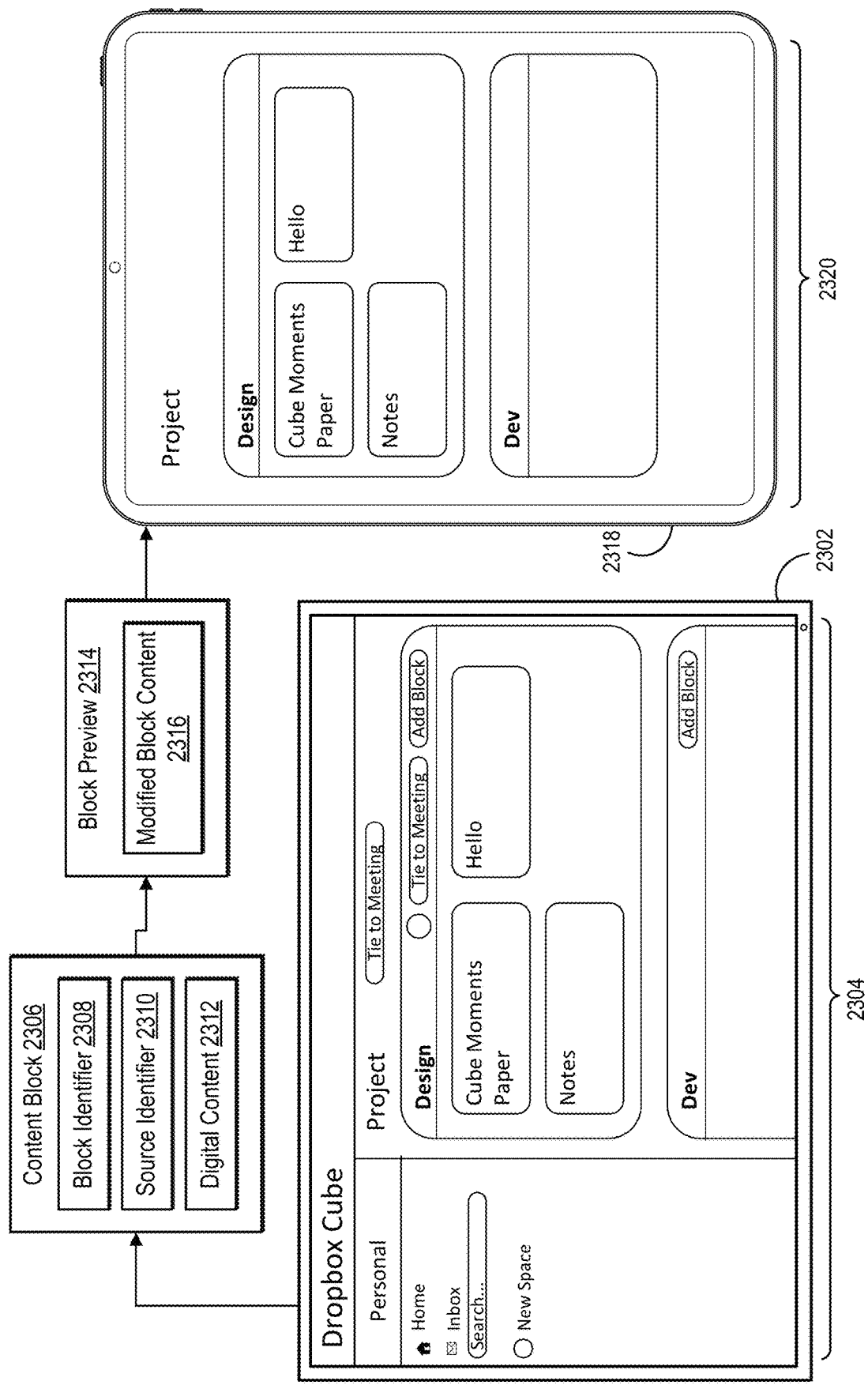
FIG. 23 illustrates an example diagram for generating and providing a block preview in accordance with one or more embodiments.

In certain embodiments, the content block system 102 can generate and provide block previews from content blocks of a virtual space. In particular, the content block system 102 can generate a block preview for providing a limited version of a content block to a client device without full permissions to interact with the content block (e.g., a third-party client device). FIG. 23 illustrates an example diagram for generating and providing a block preview in accordance with one or more embodiments.

As illustrated in FIG. 23, the content block system 102 generates a virtual space interface 2304 for display on a client device 2302. In particular, the content block system 102 generates the virtual space interface 2304 including content blocks within block sections, and further including various interface elements for interacting with the virtual space interface 2304. For instance, the content block system 102 generates a content block 2306 to include within the virtual space interface 2304, where the content block 2306 includes a block identifier 2308 and a source identifier 2310, and digital content 2312 (from a location referenced by source identifier 2310 but not copied into the data of the content block 2306).

In some cases, the content block 2306 further generates a block preview 2314 from the content block 2306. To elaborate, the content block system 102 generates the block preview 2314 to include a modified block content 2316 that simplifies or removes some of the digital content 2312 and/or various block functions available within the virtual space interface 2304. For example, the content block system 102 generates the block preview 2314 to include a modified version of the digital content 2312 by removing sensitive information and/or user-selected information. In addition, the content block system 102 generates the block preview 2314 by removing certain interactive functions of the content block 2306, including the ability to modify the digital content 2312 and/or the visual characteristics of the content block 2306.

In some cases, the content block system 102 generates the block preview 2314 in a format or file type that is accessible by a third-party client device 2318 without needing a virtual space platform installed. The content block system 102 can also provide the block preview 2314 for display within a web browser of the third-party client device 2318. As shown, the content block system 102 generates a space preview 2320 for display on the third-party client device 2318. Within the space preview 2320, the content block system 102 provides the block preview 2314 within a modified version of the virtual space interface 2304 that does not include selectable options for adding content blocks or tying a content block to a virtual meeting. In some cases, the content block system 102 can also provide the block preview 2314 to include only a block summary (as described above), or some other form of the modified block content 2316 appropriate for access by the third-party client device 2318, and not the digital content 2312. Indeed, the content block system 102 can generate the space preview 2320 and/or the block preview 2314 for limited interactivity with content of content blocks.

FIGS. 19-23, the corresponding text, and the examples provide a number of different systems and methods for generating and managing a virtual space platform for a content block browser. In addition to the foregoing, implementations can also be described in terms of flowcharts comprising acts steps in a method for accomplishing a particular result. For example, FIG. 24 illustrates an example series of acts for generating and managing a virtual space platform for a content block browser.

Figure 24:
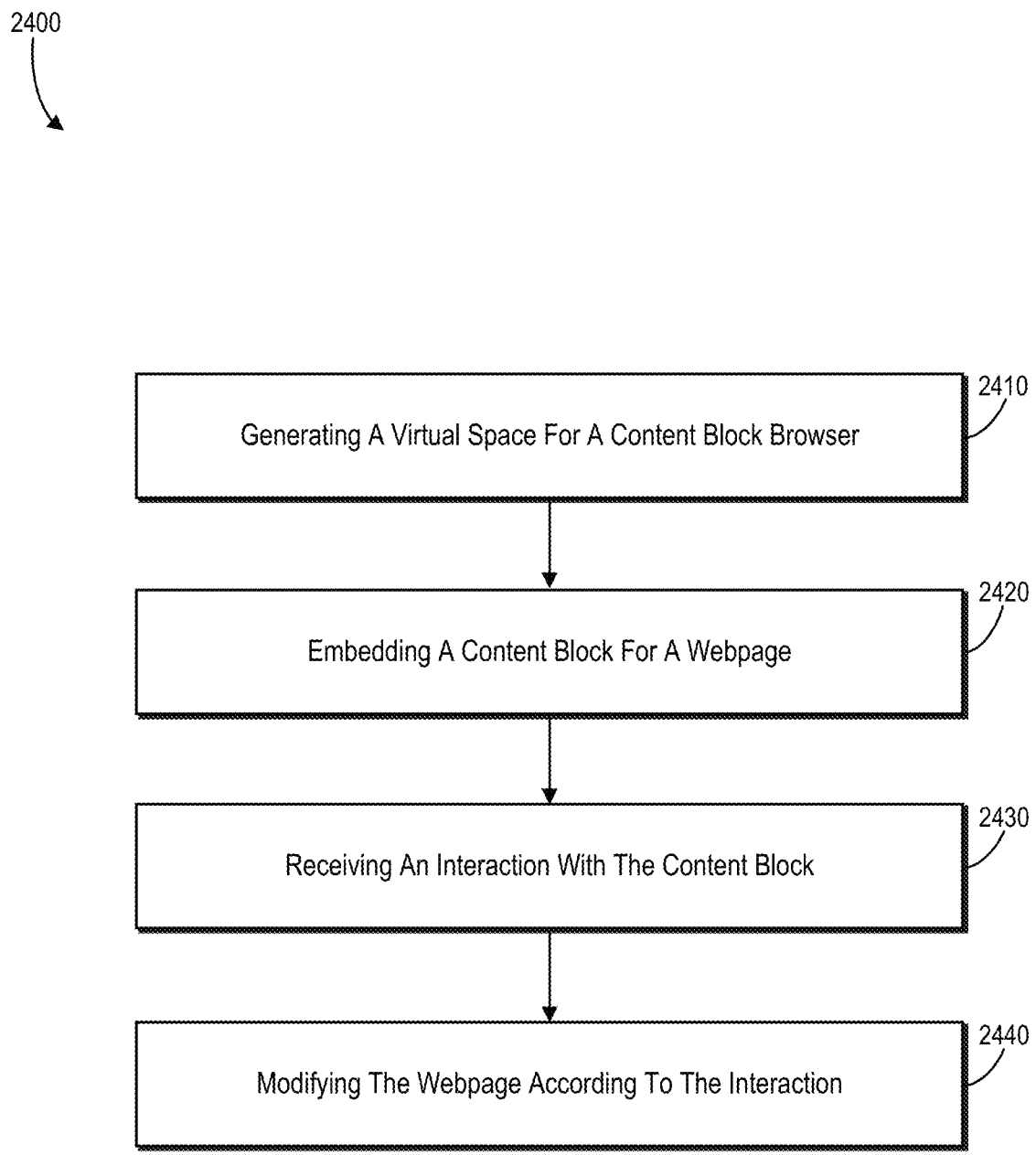
FIG. 24 illustrates an example flowchart of a series of acts for generating and managing a virtual space interface for a content block browser in accordance with one or more embodiments.

While FIG. 24 illustrates acts according to certain implementations, alternative implementations may omit, add to, reorder, and/or modify any of the acts shown in FIG. 24. The acts of FIG. 24 can be performed as part of a method. Alternatively, a non-transitory computer readable medium can comprise instructions, that when executed by one or more processors, cause a computing device to perform the acts of FIG. 24. In still further implementations, a system can perform the acts of FIG. 24.

As illustrated in FIG. 24, the series of acts 2400 may include an act 2410 of generating a virtual space for a content block browser. For example, the act 2410 involves generating a virtual space including one or more content blocks comprising block identifiers tied to source identifiers that reference respective webpages. In addition, the series of acts 2400 includes an act 2420 of embedding a content block for a webpage. For example, the act 2420 involves embedding, within the virtual space, a content block that integrates (digital content and) functionality of a webpage referenced by a source identifier of the content block. Further, the series of acts 2400 includes an act 2430 of receiving an interaction with the content block. For example, the act 2430 involves receiving an indication of a user interaction with (e.g., to modify the digital content within) the content block. Additionally, the series of acts 2400 includes an act 2440 of modifying the webpage according to the interaction. For example, the act 2440 involves modifying the webpage according to the user interaction with the content block.

In some embodiments, the series of acts 2400 includes an act of embedding the content block by: accessing, using the source identifier of the content block, a server location hosting digital content associated with the webpage and integrating the digital content associated with the webpage within the content block. In addition, the series of acts 2400 includes an act of generating the virtual space comprises generating an instance of a content-block-based web browser that presents the one or more content blocks arranged within the virtual space as individual interface elements modifiable in size and location within the virtual space.

In certain embodiments, the series of acts 2400 includes an act of receiving the indication of the user interaction with the content block by receiving an indication to modify digital content stored at a server location associated with the webpage. Additionally, the series of acts 2400 includes an act of modifying the webpage according to the user interaction by modifying the digital content stored at the server location associated with the webpage in response to the user interaction with the content block. Further, the series of acts 2400 includes an act of embedding the content block that integrates functionality of the webpage by identifying an application integration for the virtual space that integrates functionality of a web browser application into the virtual space.

In one or more embodiments, the series of acts 2400 includes an act of generating the virtual space by generating an additional content block for display within the virtual space, wherein the additional content block comprises a block identifier tied to a source identifier that references digital content associated with an external application other than a web browser. Further, the series of acts 2400 includes an act of embedding the content block by: accessing, using the source identifier of the content block, a server location hosting digital content associated with the webpage and adapting the functionality of the webpage for the content block to facilitate interacting with the digital content at the server location via the content block.

In some embodiments, the series of acts 2400 includes an act of generating a space preview for the virtual space by modifying accessibility of functionality for the one or more content blocks for providing the space preview to client devices external to a system associated with the virtual space. In addition, the series of acts 2400 includes an act of embedding, within the virtual space, an additional content block that integrates functionality of an additional webpage, wherein the content block and the additional content block are displayed concurrently within the virtual space. Further, the series of acts 2400 can include acts of generating a communication thread associated with the content block and/or providing the communication thread for display within the content block together with digital content from the webpage referenced by the source identifier.

In certain embodiments, the series of acts 2400 includes an act of generating the virtual space by generating an instance of a content-block-based web browser that presents the one or more content blocks arranged within the virtual space as individual interface elements with modifiable visual characteristics. Additionally, the series of acts 2400 includes an act of embedding the content block by: accessing, using the source identifier of the content block, a server location hosting digital content associated with the webpage and integrating the digital content associated with the webpage within the content block. Further, the series of acts 2400 includes an act of receiving the indication of the user interaction with the content block by receiving an indication to modify the digital content as presented within the content block and/or an act of modifying the webpage according to the user interaction by, based on the user interaction, propagating a modification made to the digital content as presented within the content block to the webpage referenced by the source identifier.

In some embodiments, the series of acts 2400 includes an act of generating a block preview for the content block by modifying the functionality of the content block for providing the block preview to client devices with different permission settings. In addition, the series of acts 2400 includes an act of embedding the content block that integrates functionality of the webpage by identifying an application integration for the virtual space that integrates functionality of a web browser application into the virtual space. In some cases, the series of acts 2400 includes an act of generating the virtual space by generating an additional content block for display within the virtual space, wherein the additional content block comprises a block identifier tied to a source identifier that references digital content stored within a content management system.

The components of the content block system 102 can include software, hardware, or both. For example, the components of the content block system 102 can include one or more instructions stored on a computer-readable storage medium and executable by processors of one or more computing devices. When executed by one or more processors, the computer-executable instructions of the content block system 102 can cause a computing device to perform the methods described herein. Alternatively, the components of the content block system 102 can comprise hardware, such as a special purpose processing device to perform a certain function or group of functions. Additionally or alternatively, the components of the content block system 102 can include a combination of computer-executable instructions and hardware.

Furthermore, the components of the content block system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the content block system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 25:
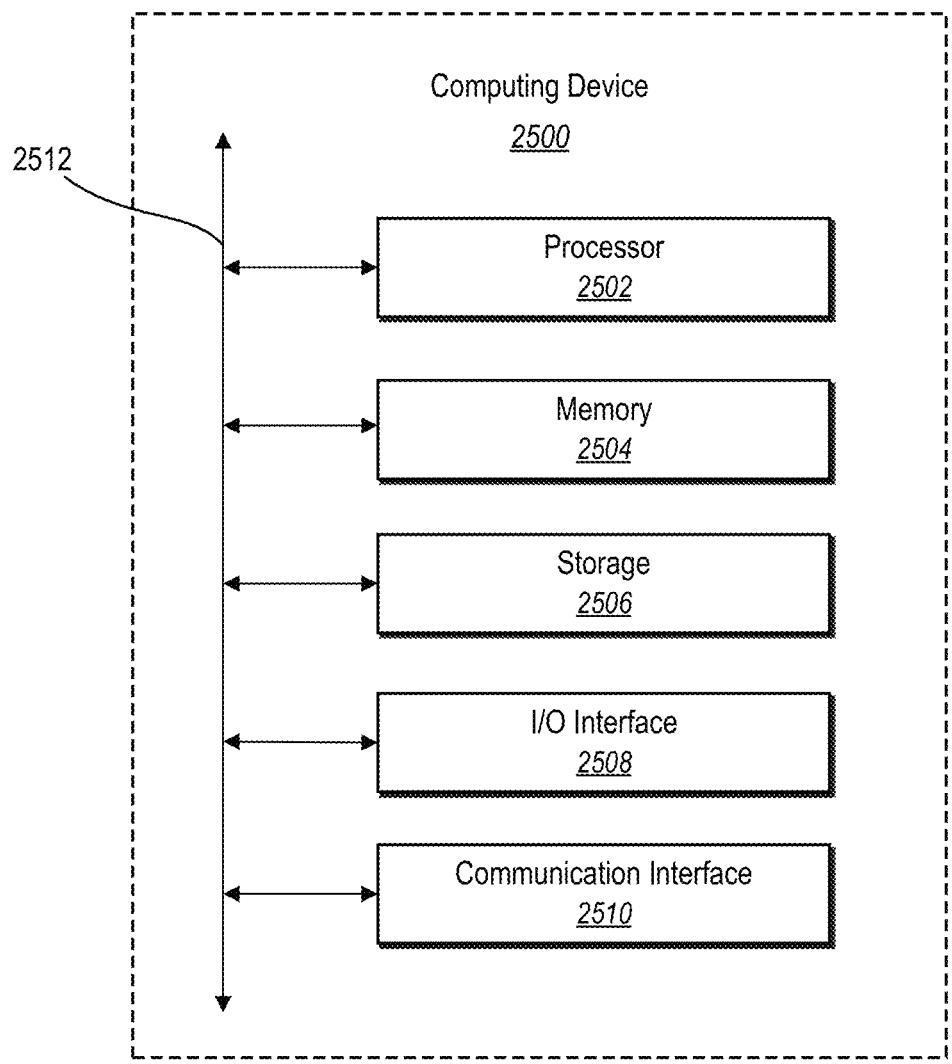
FIG. 25 illustrates a block diagram of an exemplary computing device in accordance with one or more embodiments.

FIG. 25 illustrates a block diagram of exemplary computing device 2500 (e.g., the server(s) 104 and/or the client devices 108a-108n) that may be configured to perform one or more of the processes described above. One will appreciate that server(s) 104 and/or the client devices 108a-108n may comprise one or more computing devices such as computing device 2500. As shown by FIG. 25, computing device 2500 can comprise processor 2502, memory 2504, storage device 2506, I/O interface 2508, and communication interface 2510, which may be communicatively coupled by way of communication infrastructure 2512. While an exemplary computing device 2500 is shown in FIG. 25, the components illustrated in FIG. 25 are not intended to be limiting. Additional or alternative components may be used in other implementations. Furthermore, in certain implementations, computing device 2500 can include fewer components than those shown in FIG. 25. Components of computing device 2500 shown in FIG. 25 will now be described in additional detail.

In particular implementations, processor 2502 includes hardware for executing instructions, such as those making up a computer program. As an example and not by way of limitation, to execute instructions, processor 2502 may retrieve (or fetch) the instructions from an internal register, an internal cache, memory 2504, or storage device 2506 and decode and execute them. In particular implementations, processor 2502 may include one or more internal caches for data, instructions, or addresses. As an example and not by way of limitation, processor 2502 may include one or more instruction caches, one or more data caches, and one or more translation lookaside buffers (TLBs). Instructions in the instruction caches may be copies of instructions in memory 2504 or storage device 2506.

Memory 2504 may be used for storing data, metadata, and programs for execution by the processor(s). Memory 2504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 2504 may be internal or distributed memory.

Storage device 2506 includes storage for storing data or instructions. As an example and not by way of limitation, storage device 2506 can comprise a non-transitory storage medium described above. Storage device 2506 may include a hard disk drive (HDD), a floppy disk drive, flash memory, an optical disc, a magneto-optical disc, magnetic tape, or a Universal Serial Bus (USB) drive or a combination of two or more of these. Storage device 2506 may include removable or non-removable (or fixed) media, where appropriate. Storage device 2506 may be internal or external to computing device 2500. In particular implementations, storage device 2506 is non-volatile, solid-state memory. In other implementations, Storage device 2506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 2508 allows a user to provide input to, receive output from, and otherwise transfer data to and receive data from computing device 2500. I/O interface 2508 may include a mouse, a keypad or a keyboard, a touch screen, a camera, an optical scanner, network interface, modem, other known I/O devices or a combination of such I/O interfaces. I/O interface 2508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 2508 is configured to provide graphical data to a display for presentation to a user. The graphical data may be representative of one or more graphical user interfaces and/or any other graphical content as may serve a particular implementation.

Communication interface 2510 can include hardware, software, or both. In any event, communication interface 2510 can provide one or more interfaces for communication (such as, for example, packet-based communication) between computing device 2500 and one or more other computing devices or networks. As an example and not by way of limitation, communication interface 2510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 2510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 2510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 2510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 2512 may include hardware, software, or both that couples components of computing device 2500 to each other. As an example and not by way of limitation, communication infrastructure 2512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 26:
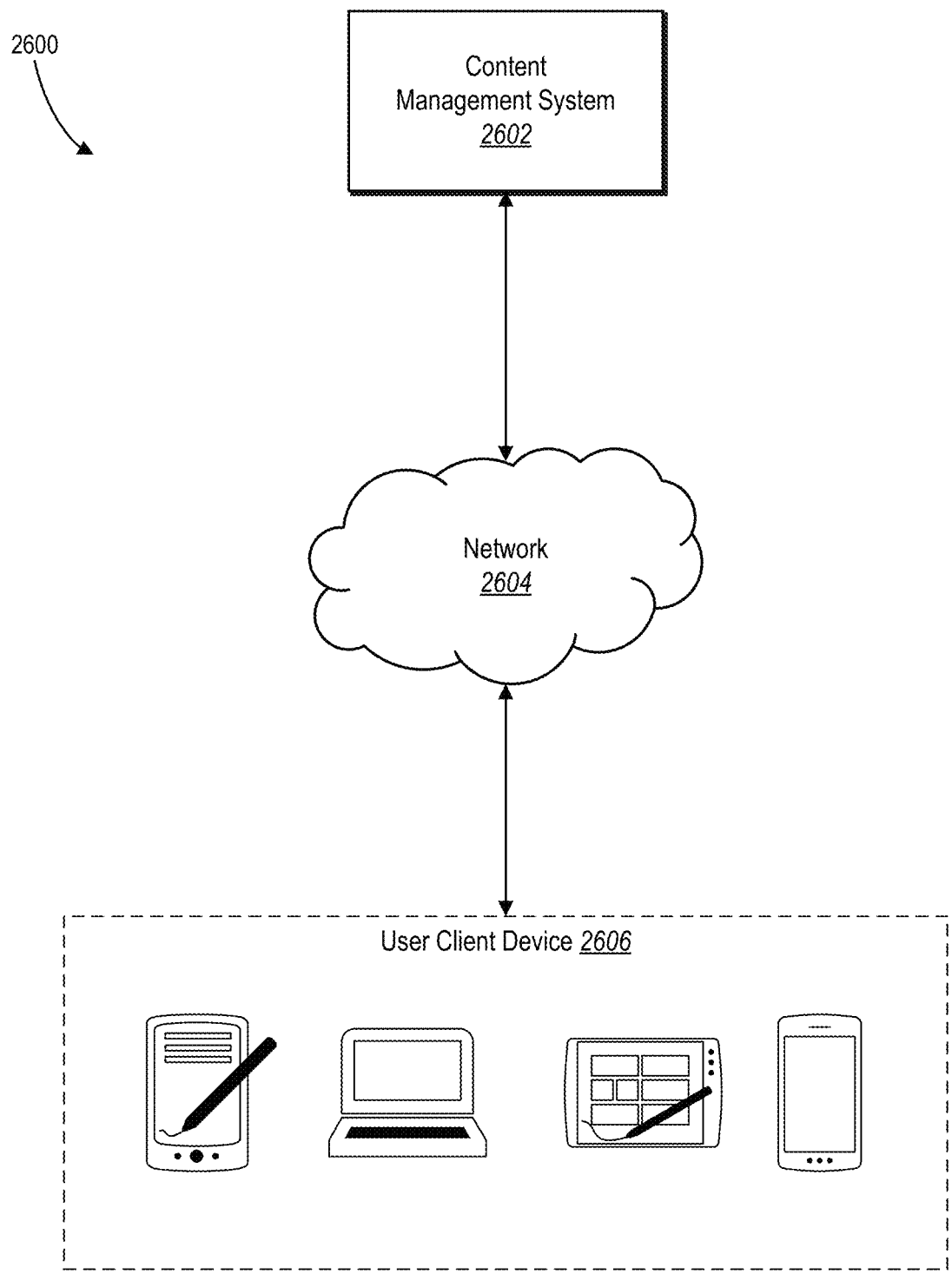
FIG. 26 illustrates an example environment of a networking system having the content block system in accordance with one or more embodiments.

FIG. 26 is a schematic diagram illustrating environment 2600 within which one or more implementations of the content block system 102 can be implemented. For example, the content block system 102 may be part of a content management system 2602 (e.g., the content management system 106). Content management system 2602 may generate, store, manage, receive, and send digital content (such as digital content items). For example, content management system 2602 may send and receive digital content to and from client devices 2606 by way of network 2604. In particular, content management system 2602 can store and manage a collection of digital content. Content management system 2602 can manage the sharing of digital content between computing devices associated with a plurality of users. For instance, content management system 2602 can facilitate a user sharing a digital content with another user of content management system 2602.

In particular, content management system 2602 can manage synchronizing digital content across multiple client devices 2606 associated with one or more users. For example, a user may edit digital content using client device 2606. The content management system 2602 can cause client device 2606 to send the edited digital content to content management system 2602. Content management system 2602 then synchronizes the edited digital content on one or more additional computing devices.

In addition to synchronizing digital content across multiple devices, one or more implementations of content management system 2602 can provide an efficient storage option for users that have large collections of digital content. For example, content management system 2602 can store a collection of digital content on content management system 2602, while the client device 2606 only stores reduced-sized versions of the digital content. A user can navigate and browse the reduced-sized versions (e.g., a thumbnail of a digital image) of the digital content on client device 2606. In particular, one way in which a user can experience digital content is to browse the reduced-sized versions of the digital content on client device 2606.

Another way in which a user can experience digital content is to select a reduced-size version of digital content to request the full- or high-resolution version of digital content from content management system 2602. In particular, upon a user selecting a reduced-sized version of digital content, client device 2606 sends a request to content management system 2602 requesting the digital content associated with the reduced-sized version of the digital content. Content management system 2602 can respond to the request by sending the digital content to client device 2606. Client device 2606, upon receiving the digital content, can then present the digital content to the user. In this way, a user can have access to large collections of digital content while minimizing the amount of resources used on client device 2606.

Client device 2606 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 2606 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2604.

Network 2604 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 2606 may access content management system 2602.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
generating a virtual space including one or more multilocational data blocks visualized by one or more content blocks comprising block identifiers tied to source identifiers that reference respective webpages;
embedding, within the virtual space, a content block visualizing a multilocational data block that integrates functionality of a webpage referenced by a source identifier of the multilocational data block;
integrating digital content of the webpage within the content block;
receiving an indication of a user interaction to modify the digital content within the content block; and
modifying the webpage according to the user interaction with the content block.

2. The method of claim 1, wherein embedding the content block comprises:
accessing, using the source identifier of the multilocational data block, a server location hosting digital content associated with the webpage; and
integrating the digital content associated with the webpage within the content block.

3. The method of claim 1, wherein generating the virtual space comprises generating an instance of a content-block-based web browser that presents the one or more content blocks arranged within the virtual space as individual interface elements modifiable in size and location within the virtual space.

4. The method of claim 1, wherein receiving the indication of the user interaction with the content block comprises receiving an indication to modify digital content stored at a server location associated with the webpage.

5. The method of claim 4, wherein modifying the webpage according to the user interaction comprises modifying the digital content stored at the server location associated with the webpage in response to the user interaction with the content block.

6. The method of claim 1, wherein embedding the content block visualizing the multilocational data block that integrates functionality of the webpage comprises identifying an application integration for the virtual space that integrates functionality of a web browser application into the virtual space.

7. The method of claim 1, wherein generating the virtual space comprises generating an additional content block for display within the virtual space, wherein the additional content block visualizing an additional multilocational data block comprises a block identifier tied to an additional source identifier of the additional multilocational data block that references digital content associated with an external application other than a web browser.

8. A system comprising:
at least one processor; and
a non-transitory computer readable medium comprising instructions that, when executed by the at least one processor, cause the system to:
generate a virtual space including one or more multilocational data blocks visualized by one or more content blocks comprising block identifiers tied to source identifiers that reference respective webpages;
embed, within the virtual space, a content block visualizing a multilocational data block that integrates functionality of a webpage referenced by a source identifier of the multilocational data block;
integrating digital content of the webpage within the content block;
receive an indication of a user interaction to modify the digital content within the content block; and
modify the webpage according to the user interaction to modify the digital content within the content block.

9. The system of claim 8, further comprising instructions that, when executed by the at least one processor, cause the system to embed the content block by:
access, using the source identifier of the multilocational data block, a server location hosting digital content associated with the webpage; and
adapt the functionality of the webpage for the content block to facilitate interacting with the digital content at the server location via the content block.

10. The system of claim 8, further comprising instructions that, when executed by the at least one processor, cause the system to generate a space preview for the virtual space by modifying accessibility of functionality for the one or more content blocks for providing the space preview to client devices external to a system associated with the virtual space.

11. The system of claim 8, further comprising instructions that, when executed by the at least one processor, cause the system to embed, within the virtual space, an additional content block visualizing an additional multilocational data block that integrates functionality of an additional webpage, wherein the content block and the additional content block are displayed concurrently within the virtual space.

12. The system of claim 8, further comprising instructions that, when executed by the at least one processor, cause the system to:
generate a communication thread associated with the content block; and
provide the communication thread for display within the content block together with digital content from the webpage referenced by the source identifier.

13. The system of claim 8, further comprising instructions that, when executed by the at least one processor, cause the system to generate the virtual space by generating an instance of a content-block-based web browser that presents the one or more content blocks arranged within the virtual space as individual interface elements with modifiable visual characteristics.

14. The system of claim 8, further comprising instructions that, when executed by the at least one processor, cause the system to embed the content block by:
accessing, using the source identifier of the multilocational data block, a server location hosting digital content associated with the webpage; and integrating the digital content associated with the webpage within the content block.

15. A non-transitory computer readable medium comprising instructions that, when executed by at least one processor, cause the at least one processor to:
generate a virtual space including one or more multilocational data blocks visualized by one or more content blocks comprising block identifiers tied to source identifiers that reference respective webpages;
embed, within the virtual space, a content block visualizing a multilocational data block that integrates digital content and functionality of a webpage referenced by a source identifier of the multilocational data block;
integrating digital content of the webpage within the content block;
receive an indication of a user interaction to modify the digital content with the content block; and
modify the webpage according to the user interaction with the content block.

16. The non-transitory computer readable medium of claim 15, further comprising instructions that, when executed by the at least one processor, cause the at least one processor to
modify the webpage according to the user interaction by, based on the user interaction, propagating a modification made to the digital content as presented within the content block to the webpage referenced by the source identifier.

17. The non-transitory computer readable medium of claim 15, further comprising instructions that, when executed by the at least one processor, cause the at least one processor to generate a block preview for the content block by modifying the functionality of the content block for providing the block preview to client devices with different permission settings.

18. The non-transitory computer readable medium of claim 15, further comprising instructions that, when executed by the at least one processor, cause the at least one processor to embed the content block visualizing the multilocational data block that integrates functionality of the webpage by identifying an application integration for the virtual space that integrates functionality of a web browser application into the virtual space.

19. The non-transitory computer readable medium of claim 15, further comprising instructions that, when executed by the at least one processor, cause the at least one processor to generate the virtual space by generating an additional content block visualizing an additional multilocational data block within the virtual space, wherein the additional content block comprises a block identifier tied to a source identifier for an additional multilocational data block that references digital content stored within a content management system.

20. The non-transitory computer readable medium of claim 15, further comprising instructions that, when executed by the at least one processor, cause the at least one processor to embed the content block by:
accessing, using the source identifier of the multilocational data block, a server location hosting the digital content associated with the webpage; and
integrating the digital content from the server location within the content block.

* * * * *